United States Patent
Joset et al.

(10) Patent No.: US 9,338,450 B2
(45) Date of Patent: May 10, 2016

(54) METHOD AND APPARATUS FOR SIGNAL ENCODING PRODUCING ENCODED SIGNALS OF HIGH FIDELITY AT MINIMAL SIZES

(71) Applicant: ECOLE DE TECHNOLOGIE SUPERIEURE, Montreal (CA)

(72) Inventors: Didier Joset, Rannée (FR); Stéphane Coulombe, Brossard (CA); Maged E. Beshai, Maberly (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 154 days.

(21) Appl. No.: 14/216,886

(22) Filed: Mar. 17, 2014

(65) Prior Publication Data

US 2014/0270718 A1    Sep. 18, 2014

Related U.S. Application Data

(63) Continuation-in-part of application No. 14/188,537, filed on Feb. 24, 2014, now abandoned, and a continuation-in-part of application No. 14/192,682, filed on Feb. 27, 2014, now abandoned.

(60) Provisional application No. 61/802,782, filed on Mar. 18, 2013.

(30) Foreign Application Priority Data

Mar. 18, 2013    (CA) ..................................... 2809731

(51) Int. Cl.
*H04N 19/196*    (2014.01)
*H04N 19/40*    (2014.01)
(Continued)

(52) U.S. Cl.
CPC ....... *H04N 19/00472* (2013.01); *H04N 19/102* (2014.11); *H04N 19/124* (2014.11);
(Continued)

(58) Field of Classification Search
None
See application file for complete search history.

(56) References Cited

U.S. PATENT DOCUMENTS 6,011,868 A    1/2000    van den Branden et al.
6,154,572 A    11/2000    Chaddha
(Continued)

FOREIGN PATENT DOCUMENTS

EP    1615447 A1    1/2006
WO    0169936 A2    9/2001
(Continued)

OTHER PUBLICATIONS

Sanchez, Juana, et al, Search on Audio-Visual Content Using Peer-to-Peer Information Retrieval, Implementation and test of transcoding engine, Sixth Framework Programme "Information Society Technologies", Jan. 30, 2008, pp. 1-27.
(Continued)

*Primary Examiner* — Eileen Adams
(74) *Attorney, Agent, or Firm* — Victoria Donnelly; IP-MEX Inc.

(57) ABSTRACT

Methods and apparatus for determining encoding parameters of an encoder or a transcoder which yield an encoded signal of optimal measurable properties are disclosed. For a video signal, the encoding parameters may include quantization granularity, a measure of display resolution, and a frame rate. The measurable properties of an encoded signal may include a fidelity index, a relative size, and a relative flow rate. Reference data records quantifying properties of sample signals encoded according to experimental sets of encoding parameters are used to define parameters of conjectured analytical functions characterizing the encoding or transcoding functions. The analytical functions are then used to generate granular tables of estimated measures of encoded-signal properties. A fast search mechanism relies on the granular tables, together with sorted arrangements of the granular tables, to determine, in real-time, preferred encoding parameters for multimedia data streams received at an encoder or a transcoder.

24 Claims, 31 Drawing Sheets

(51) Int. Cl.
*H04N 19/102* (2014.01)
*H04N 19/124* (2014.01)
*H04N 19/132* (2014.01)
*H04N 19/136* (2014.01)
*H04N 19/146* (2014.01)
*H04N 19/189* (2014.01)
*H04N 19/154* (2014.01)
*H04N 19/164* (2014.01)
*H04N 19/85* (2014.01)

(52) U.S. Cl.
CPC ........... *H04N19/132* (2014.11); *H04N 19/136* (2014.11); *H04N 19/146* (2014.11); *H04N 19/189* (2014.11); *H04N 19/196* (2014.11); *H04N 19/154* (2014.11); *H04N 19/164* (2014.11); *H04N 19/40* (2014.11); *H04N 19/85* (2014.11)

(56) References Cited

U.S. PATENT DOCUMENTS

| | | | |
|---|---|---|---|
| 6,233,359 | B1 | 5/2001 | Ratnakar et al. |
| 6,421,467 | B1 | 7/2002 | Mitra |
| 6,490,320 | B1 | 12/2002 | Vetro et al. |
| 6,563,517 | B1 | 5/2003 | Bhagwat et al. |
| 6,990,146 | B2 | 1/2006 | Chen |
| 6,992,686 | B2 | 1/2006 | Nagarajan |
| 7,142,601 | B2 | 11/2006 | Kong et al. |
| 7,177,356 | B2 | 2/2007 | Moni et al. |
| 7,245,842 | B2 | 7/2007 | Hino |
| 7,440,626 | B2 | 10/2008 | Kong et al. |
| 7,583,844 | B2 | 9/2009 | Fehmi et al. |
| 7,668,397 | B2 | 2/2010 | Le Dinh |
| 7,805,292 | B2 | 9/2010 | Huo et al. |
| 8,073,275 | B2 | 12/2011 | Shatz et al. |
| 8,300,961 | B2 | 10/2012 | Coulombe et al. |
| 2003/0161541 | A1 | 8/2003 | Ridge |
| 2003/0227977 | A1 | 12/2003 | Henocq |
| 2004/0220891 | A1 | 11/2004 | Dodgson |
| 2005/0074174 | A1* | 4/2005 | Ishikawa ........ H04N 21/234327 382/232 |
| 2006/0210145 | A1* | 9/2006 | Lee ................. G01B 11/2513 382/154 |
| 2007/0160133 | A1 | 7/2007 | Bao et al. |
| 2007/0239634 | A1 | 10/2007 | Tian |
| 2008/0123741 | A1 | 5/2008 | Li et al. |
| 2008/0279275 | A1 | 11/2008 | Suzuki |
| 2009/0016434 | A1 | 1/2009 | Amonou et al. |
| 2009/0086816 | A1 | 4/2009 | Leontaris et al. |
| 2009/0141990 | A1 | 6/2009 | Pigeon et al. |
| 2009/0141992 | A1 | 6/2009 | Coulombe et al. |
| 2010/0150459 | A1 | 6/2010 | Coulombe et al. |
| 2012/0259983 | A1* | 10/2012 | Nakadai ............ H04L 67/1002 709/226 |
| 2012/0275512 | A1 | 11/2012 | Bouton et al. |
| 2013/0107948 | A1 | 5/2013 | DeForest et al. |
| 2013/0208787 | A1* | 8/2013 | Zheng ............ H04N 19/00036 375/240.02 |
| 2014/0119437 | A1* | 5/2014 | Chen ................. H04N 19/597 375/240.12 |

FOREIGN PATENT DOCUMENTS

| | | |
|---|---|---|
| WO | WO 2006/085301 | 8/2006 |
| WO | WO 2006085301 | 8/2006 |
| WO | WO 2006/097144 | 9/2006 |
| WO | WO 2006094000 | 9/2006 |
| WO | WO 2006110975 | 10/2006 |
| WO | 2009055899 A1 | 5/2009 |

OTHER PUBLICATIONS

Schwenke, Derek, et al, Dynamic Rate Control for JPEG 2000 Transcoding, Mitsubishi Electric Research Laboratories, Inc., Jul. 2006, pp. 1-6, Cambridge, MA, USA.

Han, Richard, et al, Dynamic Adaptation in an Image Transcoding Proxy for Mobile Web Browsing, IEEE Personal Communications Magazine, Dec. 1998, pp. 1-22.

http://en.wikipedia.org/wiki/transcoding; Transcoding form Wikipedia, Jan. 13, 2013, pp. 1-4.

Wang, Y. et al: "Utility-Based Video Adaptation for Universal Multimedia Access (UMA) and Content-Based Utility Function Prediction for Real-Time Video Transcoding", IEEE Transactions on Multimedia, IEEE Service Center, Piscataway, NJ, U.S. vol. 9, No. 2, Feb. 1, 2007, pp. 213-220, XP011346385, ISSN: 1520-9210, DOI: 10.1109/TMM.2006.886253.

Coulombe S. et al: "Low-Complexity Transcoding of JPEG Images With Near-Optimal Quality Using a Predictive Quality Factor and Scaling Parameters", IEEE Transactions on Image Processing, IEEE Service Center, Piscataway, NJ, US. vol. 18, No. 3, Mar. 1, 2010, pp. 712-721, XP011297927, ISSN: 1057-7149.

Reed E C et al, "Optimal multidimensional bit-rate control for video communication", IEEE Transactions on Image Processing, vol. 11, No. 8, Aug. 1, 2002, pp. 873-885.

Ta-Peng Tan et al, "On the methods and application of arbitrarily downsizing video transcoding", Multimedia and Expo, 2002. ICME '02. Proceedings. 2002 IEEE International Conference on Lausanne, Switzerland Aug. 26-29, 2002, Piscataway, NJ, USA. IEEE US vol. 1, Aug. 26, 2002, pp. 609-612.

Haiyan Shu et al, "Frame Size Selection in Video Downsizing Transcoding Application", Conference Proceedings/IEEE International Symposium on Circuits and Systems (ISCAS): May 23-26, 2005, pp. 896-899.

Haiwei Sun et al, "Fast motion vector and bitrate re-estimation for arbitrary downsizing video transcoding", Proceedings of the 2003 International Symposium on Circuits and Systems (ISCAS), 2003. vol. 2, Jan. 1, 2003, pp. II-856.

Shu H et al, "The Realization of Arbitrary Downsizing Video Transcoding", IEEE Transaction on Circuits and Systems for Video Technology, IEEE Service Center, vol. 16, No. 4, Apr. 1, 2006, pp. 540-546.

Bruckstein A M et al, "Down-scaling for better transform compression", IEEE Transactions on Image Processing, vol. 12, No. 9, Sep. 1, 2003, pp. 1132-1144.

Wang D et al, "Towards Optimal Rate Control: A Study of the Impact of Spatial Resolution, Frame Rate, and Quantization on Subjective Video Quality and Bit Rate", Visual Communications and Image Processing, 2003, In Proceedings of SPIE, vol. 5150, Jul. 8, 2003, pp. 198-209.

Herman et al, "Nonlinearity Modelling of QoE for Video Streaming over Wireless and Mobile Network", Intelligent Systems, Modelling and Simulation (ISMS), 2011 Second International Conference on, IEEE, Jan. 25, 2011, pp. 313-317.

Avcibas, Ismail; Sankur, Bulent and Sayood, Khalid "Statistical Evaluation of Image Quality Measures" Journal of Electronic Imaging, vol. 11, No. 2, pp. 206-223, Apr. 2002.

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

Multimedia Messaging Service, Media formats and codecs 3GPP TS 26.140, V 7.1.0, http://www.3gpp.org/ftp/specs/html-info/26140.htm, Jun. 2007.

"The independent JPEG Group" ftp.uu.net/graphics/jpeg/jpegsrc.v6b.tar.gz, Aug. 3, 2007.

S. Coulombe and G. Grassel, "Multimedia adaptation for the multimedia messaging service," IEEE Communications Magazine, vol. 42, No. 7, pp. 120-126, Jul. 2004.

Z. Lei and N.D. Georganas, "Accurate bit allocation and rate control for DCT domain video transcoding," in IEEE CCECE 2002. Canadian Conference on Electrical and Computer Engineering, vol. 2, pp. 968-973, 2002.

J. Ridge, "Efficient transform-domain size and resolution reduction of images," Signal Processing: Image Communication, vol. 18, No. 8, pp. 621-639, Sep. 2003.

(56) References Cited

OTHER PUBLICATIONS

Pigeon, S., Coulombe, S. "Very Low Cost Algorithms for Predicting the File Size of JPEG Images Subject to Changes of Quality Factor and Scaling" Data Compression Conference p. 528, 2008.

Pigeon, S., Coulombe, S. "Computationally Efficient Algorithms for Predicting the File Size of JPEG Images Subject to Changes of Quality Factor and Scaling" Proceedings of the 24th Queen"s Biennial Symposium on Communications, Queen's University, Kingston, Canada, 2008.

S. Chandra and C. S. Ellis "JPEG Compression Metric as a Quality Aware Image Transcoding" Proceedings of USITS' 99: The 2nd USENIX Symposium on Internet Technologies and Systems, Boulder, Colorado, USA, Oct. 11-14, 1999.

A. Vetro, C. Christopoulos, and H. Sun, "Video transcoding architectures and techniques: an overview," IEEE Signal Processing Magazine, vol. 20, No. 2, pp. 18-29, Mar. 2003.

S. Grgi'c, M. Grgi'c, and M. Mrak, "Reliability of objective picture quality measures," Journal of Electrical Engineering, vol. 55, No. 1-2, pp. 3-10, 2004.

OMA Multimedia Messaging Service, Architecture Overview, Approved Version 1.2 01, published by Open Mobile Alliance, available from http://www.openmobilealliance.org/release_program/mms_v1_2.html Mar. 2005.

Wang, Z., Bovic, A., Rahim, H., Sheikh, Simoncelli, E. "Image Quality Assessment: From Error Visibility to Structural Similarity" IEEE Transactions on Image Processing, vol. 13, No. 4, pp. 600-612, Apr. 2004.

Lane, T., Gladstone, P., Ortiz, L., Boucher, J., Crocker L., Minguillon, J., Phillips, G., Rossi, D., Weijers, G., "The Independent JPEG Group Software Release 6b" 1998.

JPEG—Wikipedia, the free encyclopedia, http://en.wikipedia.org/wiki/JPEG, Aug. 5, 2007.

\* cited by examiner

| Parameter set | $q=Q_{min}/Q$ | $r=R/R_{max}$ | $\phi=F/F_{max}$ |
|---|---|---|---|
| 0 | 0.25 | 0.0625 | 0.25 |
| 1 | 0.25 | 0.25 | 0.25 |
| 2 | 0.25 | 1.0 | 0.25 |
| 3 | 1.0 | 0.0625 | 0.25 |
| 4 | 1.0 | 0.25 | 0.25 |
| 5 | 1.0 | 1.0 | 0.25 |
| 6 | 0.25 | 0.0625 | 0.5 |
| 7 | 0.25 | 0.25 | 0.5 |
| 8 | 0.25 | 1.0 | 0.5 |
| 9 | 1.0 | 0.0625 | 0.5 |
| 10 | 1.0 | 0.25 | 0.5 |
| 11 | 1.0 | 1.0 | 0.5 |
| 12 | 0.25 | 0.0625 | 1.0 |
| 13 | 0.25 | 0.25 | 1.0 |
| 14 | 0.25 | 1.0 | 1.0 |
| 15 | 1.0 | 0.0625 | 1.0 |
| 16 | 1.0 | 0.25 | 1.0 |
| 17 | 1.0 | 1.0 | 1.0 |

FIG. 26

METHOD AND APPARATUS FOR SIGNAL ENCODING PRODUCING ENCODED SIGNALS OF HIGH FIDELITY AT MINIMAL SIZES

CROSS-REFERENCE TO RELATED APPLICATIONS

This application is a continuation in part of U.S. patent application Ser. No. 14/188,537 and U.S. patent application Ser. No. 14/192,682, the entire contents of which are incorporated herein by reference. The application claims the benefit of provisional application 61/802,782, filed on Mar. 18, 2013, the content of which is incorporated herein by reference in its entirety. The application also claims priority to Canadian Application 2,809,731, filed on Mar. 18, 2013, the content of which is incorporated herein by reference in its entirety.

FIELD OF THE INVENTION

The present invention relates to signal encoding and transcoding in a multimedia system. In particular, the invention is directed to methods and apparatus for realizing optimum encoding or transcoding.

BACKGROUND

Multimedia Messaging Services (MMS) allow users with heterogeneous terminals to exchange structured messages composed of text, audio, images, and video. The rapid development of the mobile-communications technology contributes to the rapid proliferation of mobile terminals of different types, thus creating interoperability problems. Consequently, signals may need adaptations to be compatible with target terminal's characteristics while maximizing visual quality. Such problems also arise in video streaming where content needs to be adapted to support various terminals operating over numerous wired and wireless networks.

There is a need to develop signal adaptation techniques which optimize performance while taking into account constraints relevant to encoding as well as constraints relevant to storage and transfer of encoded signals.

SUMMARY

The application discloses methods and apparatus for determining encoding parameters of an encoder or a transcoder which yield an encoded signal of optimal measurable properties, with emphasis on video-signal components of multimedia data streams. For a video signal, the encoding parameters may include quantization granularity, a measure of display resolution, and a frame rate. The measurable properties of an encoded signal may include a fidelity index, a relative size, and a relative flow rate (bit rate). Several options of applying the teaching of the present application may be considered.

In one implementation, it may be desirable to determine encoding parameters which result in an encoded signal of the highest attainable fidelity index while observing either a constraint pertinent to the size of the produced encoded signal, a constraint pertinent to the flow rate, or constraints pertinent to both the size and flow rate.

In another implementation, it may be desirable to determine encoding parameters which result in an encoded signal of the least size while observing either a requisite lower bound of a fidelity index, a constraint pertinent to the flow rate, or both constraints pertinent to fidelity and flow rate.

In a further implementation, it may be desirable to determine encoding parameters which result in an encoded signal of the least flow rate while observing either a requisite lower bound of a fidelity index, a constraint pertinent to size, or both constraints pertinent to fidelity and size of an encoded signal.

The method of the invention relies on acquiring reference data records each quantifying properties of a sample signal encoded according to one of experimental sets of encoding parameters. For example, the fidelity index may be based on human perception, using a mean opinion score. The acquired reference data records are used to define parameters (constants) of conjectured analytical functions characterizing the encoding or transcoding functions. Predictive regression-analysis techniques are used to determine parameters (constants) of the analytical functions resulting in a minimum value of a positive-definite function of deviation of predicted values from reference values. The analytical functions are then used to generate Granular tables of estimated measures of encoded-signal properties.

Three analytical functions are considered for quantifying the properties of encoded signals. A first analytical function relates a fidelity index to the encoding parameters. A second analytical function relates a relative size of an encoded signal to the encoding parameters. The relative size is the ratio of a size determined for an arbitrary set of encoding parameters to the size corresponding to the boundary set of encoding parameters which corresponds to the finest quantization granularity, the finest display resolution, and the highest frame rate. A third analytical function relates a relative flow rate of an encoded signal to the encoding parameters. The relative flow rate is the ratio of a flow determined for an arbitrary set of encoding parameters to the flow rate corresponding to the boundary set of encoding parameters.

The invention provides a fast search mechanism which uses the granular tables, together with sorted arrangements of the granular tables, to determine preferred encoding parameters for multimedia data streams received at an encoder or a transcoder. Determining the preferred encoding parameters need be computationally efficient to be suitable for real-time implementation.

In accordance with one aspect, the present invention provides a method, implemented in an encoder having a processor assembly and memory devices for storing data and processor-executable instructions. The method starts with determining descriptors of a received signal, identifying a destination of the received signal, and acquiring characteristics of the destination receiver. The characteristics may include limitations relevant to quantization, display resolution, and/or frame rate. A preferred set of encoding parameters compatible with the descriptors and the receiver characteristics is selected for encoding the received signal to produce an encoded signal of a requisite fidelity index. The preferred set of encoding parameters is then submitted to the encoder.

The received signal is generally a multimedia signal having components of different types such as a video signal, an audio signal, images, and texts. Considering the video signal, the set of encoding parameters considered herein includes a quantization step, a display resolution, and a frame rate.

In order to facilitate accurate and fast computation and to gain an opportunity to produce an optimally encoded signal, a large number of reference data records would be needed. The reference data records are, however, determined on the basis of actual experimentation and producing a sufficiently large number of such records would be quite costly. A viable alternative, according to the present invention is to generate analytical expressions characterizing the encoding or transcoding process based on a relatively small number of experimentally determined reference data records.

Thus, according to one embodiment, two analytical functions are formulated. The first quantifies dependence of a fidelity index of the encoded signal on encoding parameters including the quantization step, the display resolution, and the frame rate and the second quantifies dependence of a relative size of the second signal on the same encoding parameters.

A number of reference data records is acquired, with each reference data record indicating a fidelity index and a relative signal size corresponding to a respective set of experimental encoding parameters. Regression analysis is then applied to define parameters of the two analytical functions.

It is plausible that the effects of the encoding parameters of quantization, resolution, and frame rate be mutually uncorrelated. This valuable property may be exploited to simplify the synthesis of the analytical functions. A method of separation of variables, well known in the art of applied mathematics, may be applied to express each of the analytical functions as a multiplication of a respective one-dimensional function of quantization step, a respective one-dimensional function of display resolution, and a respective one-dimensional function of frame rate.

A first granular table is generated, based on the first analytical function, to indicate fidelity indices corresponding to a relatively large number of sets of encoding parameters. Likewise, second granular table is generated, based on the second analytical function, to indicate relative file sizes (normalized file sizes) corresponding to a relatively large number of sets of encoding parameters.

An exhaustive search approach may be adopted according to which each set of encoding parameters considered in generating the granular tables is examined to determine compatibility with characteristics setting boundaries of encoding parameters acceptable to a target receiver. For each set of compatible encoding parameters, corresponding entry of the first granular table and a corresponding entry of the second granular table are examined.

In one implementation, a requisite fidelity index is a constraint and a least file size is an objective. In this case, the entry of the first granular table is examined to determine its compatibility with the objective value. If the entry indicates a fidelity index larger than, or equal to, the objective, the corresponding set of encoding parameter is a candidate and is retained together with the entry of the first granular table and the entry of the second granular table. The process is repeated for each encoding parameter and the set of encoding parameters corresponding to the least value of normalized encoded-signal size is selected as a preferred set.

In another implementation, a requisite upper bound of encoded-signal size is a constraint and a highest fidelity index is an objective. In this case, the entry of the second granular table is examined to determine its compatibility with the objective size. If the entry indicates a normalized size less than, or equal to, the objective, the corresponding set of encoding parameter is a candidate and is retained together with the entry of the first granular table and the entry of the second granular table. The process is repeated for each encoding parameter and the set of encoding parameters corresponding to the highest value of the fidelity index is selected as a preferred set.

Exhaustive search is suitable for granular tables generated for a relatively small number, such as 100, of sets of encoding parameters. However, for encoders or transcoders devised for high performance, where a granular table may have a significantly larger number of entries, exhaustive search may not be suitable for real-time applications.

In an alternative search method according to the present invention, the first granular table is sorted in an ascending order of fidelity indices to produce a sorted table. Conventional bisecting search is then applied to determine a first entry of the sorted table corresponding to a fidelity index nearest to and not less than a requisite fidelity index. Each entry of the sorted table succeeding the first entry has a fidelity index larger than, or equal to, the requisite fidelity index. Thus, sets of encoding parameters corresponding to the first entry and succeeding entries, which are also compatible with the characteristics of the target receiver, are candidate sets. A number of successive candidate sets may be selected and corresponding relative signal sizes of the second table may be examined to select a preferred set of encoding parameter as one of the candidate set of encoding parameters corresponding to a least relative signal size.

The second granular table may be based on the third analytical function, to indicate relative flow rates (normalized flow rates) corresponding to a relatively large number of sets of encoding parameters. The processes described above for determining the least encoded-signal size may be applied mutatis mutandis with the normalized encoded-signal sizes replaced with normalized flow rates in order to determine a preferred set of encoding parameters which yield the least flow rate given an objective fidelity index.

In accordance with another aspect, the present invention provides a method implemented in an encoder having a processor for determining optimal encoding parameters under a constraint of a permissible flow rate over a path from the encoder to a target receiver. A received signal is analysed to determine descriptors such as classification with respect to temporal rate of variation. Characteristics of the target receiver are then acquired either through communication with the receiver or through consulting a database maintaining information relevant to receiver types.

A preferred set of encoding parameters compatible with the descriptors of the received signal and the receiver characteristics is determined for encoding the received signal to produce an encoded signal of a requisite fidelity index while observing the permissible flow rate.

In accordance with a further aspect, the present invention provides an apparatus for signal encoding comprising at least one processor and multiple memory devices for storing reference data records, produced granular tables, and processor-executable instructions.

Reference data records, each indicating a fidelity index and a relative signal size corresponding to one of a collection of experimental sets of encoding parameters are stored in a memory device coupled to a processor.

The processor-executable instructions may be stored in multiple more memory devices. The instructions may be organized into modules. A first module may be devised to define a first analytical model for determining fidelity indices and a second analytical model for determining relative signal sizes based on the reference data records. A second module may be devised to generate two tables of fidelity indices and relative signal sizes corresponding to a number of sets of encoding parameters exceeding a number of the reference data records. A third module may be devised to determine characteristics of a target receiver of a video recording. A fourth module may be devised to examine the granular tables and the corresponding data structures to identify a set of encoding parameters compatible with the characteristics of the target receiver and corresponding to a least relative signal size at a fidelity index at least equal to a specified lower bound.

The processor-executable instructions further include a module for rearranging and sorting the contents of the tables into respective data structures and implementing bisecting search to identify entries of requisite values.

The apparatus includes a network interface for receiving signals to be encoded or transcoded and for acquiring the reference data records, where each reference data record indicates a fidelity index and a relative signal size corresponding to a respective set of encoding parameters.

The processor-executable instructions further include a module for determining a permissible flow rate over a path from the apparatus to the target receiver.

The processor-executable instructions further include a module implementing a predictive regression method for determining parameters defining the first analytical model and the second analytical model.

In accordance with a further aspect, the present invention provides a method, implemented in an encoder having a processor. The method comprises determining descriptors of a first signal to be transcoded, and acquiring characteristics of a target receiver of the transcoded signal. A preferred set of encoding parameters compatible with the descriptors and the characteristics of the receiver is selected for encoding the first signal to produce a second signal of a file size not exceeding a specified upper bound. The first signal is encoded according to the preferred set of encoding parameters.

Where the first signal is a video signal, the set of encoding parameters comprises a quantization step, a display resolution, and a frame rate. A first number of reference data records is acquired, each reference data record indicating file size corresponding to a respective set of encoding parameters and a table indicating file sizes corresponding to a relatively large number of sets of encoding parameters is generated. The table may be based on an analytical function relating file size to encoding parameters. The table may be examined to identify at least one set of encoding parameters compatible with the receiver characteristics and corresponding to a file size not exceeding the specified maximum file size.

According to one embodiment, a first granular table relating fidelity indices to encoding parameters and a second granular table indicating file sizes corresponding to the encoding parameters may be generated based on synthesized analytical functions. The second table may be examined to identify candidate sets of encoding parameters each corresponding to a file size not exceeding the specified maximum file size and compatible with the receiver characteristics. The first table is then examined to determine fidelity indices corresponding to the candidate encoding parameters. The candidate set of encoding parameters corresponding to a highest fidelity index is then selected for encoding the first signal.

The second table may be sorted in an ascending order of file sizes to produce a sorted table and bisecting search may be applied to determine a first entry of the sorted table corresponding to a file size nearest to and not exceeding the specified maximum file size. Consecutive entries of the sorted table may be examined, starting with the first entry, to select an entry corresponding to the highest fidelity index.

In accordance with a further aspect, the invention provides a method implemented in a transcoder having a processor for transcoding a first signal to produce a second signal of different encoding parameters. The method comprises determining descriptors of the first signal, acquiring characteristics of a receiver, and determining a permissible flow rate over a path from the encoder to the receiver. A preferred set of encoding parameters compatible with the first-signal descriptors and the receiver characteristics is selected for encoding the first signal to produce the second signal taking into account the permissible flow rate of the second signal. The first signal is encoded according to the selected encoding parameters.

Where the first signal is a video signal, the set of encoding parameters comprises a quantization step, a display resolution, and a frame rate. Predetermined data records, each indicating a flow rate corresponding to one of a collection of sets of encoding parameters, are acquired and used to identify candidate data records each corresponding to a flow rate not exceeding the permissible flow rate. The candidate data records correspond to a set of encoding parameters compatible with the signal descriptors and the characteristics of the receiver. The candidate data record corresponding to the highest fidelity index is selected.

The method further comprises generating a first table, based on a first analytical function indicating fidelity indices corresponding to a preselected number of sets of encoding parameters, and a second table, based on a second analytical function, indicating relative flow rates corresponding to the preselected number of sets of encoding parameters.

The second table may be examined to identify candidate sets of encoding parameters compatible with the receiver characteristics and corresponding to a flow rate not exceeding the permissible flow rate. The first table is examined to determine fidelity indices corresponding to the candidate encoding parameters. A preferred set of encoding parameters is determined as one of the candidate sets of encoding parameters having a highest fidelity index.

Preferably, the second table is sorted in either an ascending or a descending order of relative flow rates to produce a sorted table. Conventional bisecting search may then be used to determine a first entry of the sorted table corresponding to a relative flow rate nearest to and not exceeding the permissible flow rate. Entries of the sorted table adjacent to the first entry may be examined to select more candidate sets of encoding parameters. Where more than one candidate set is found, the first table is examined to determine fidelity indices corresponding to the candidate sets of encoding parameters and determine a preferred set of encoding parameters as one of the candidate sets of encoding parameters corresponding to a highest fidelity index.

In accordance with a further aspect, the present invention provides an apparatus for signal encoding comprising a processor and at least one memory device. The memory devices store data records as well as processor-executable instructions. Reference data records, each indicating a fidelity index and a file size corresponding to one of a collection of sets of encoding parameters, are stored in a memory device. Other memory devices store processor-executable instructions devised to define a first analytical model for determining fidelity indices and a second analytical model for determining file sizes based on the reference data records. Two tables of fidelity indices and file sizes corresponding to a relatively large number of sets of encoding parameters, exceeding a number of the reference data records, are generated and stored in one of the memory devices. A module of processor-executable instructions is devised to cause the processor to examine the tables to identify a set of encoding parameters compatible with the desired characteristics and corresponding to a highest fidelity index and a file size not exceeding a specified upper bound.

BRIEF DESCRIPTION OF THE DRAWINGS

Embodiments of the present invention will be further described with reference to the accompanying exemplary drawings, in which:

FIG. 26 illustrates exemplary parameter sets, for use in an embodiment of the present invention;

TERMINOLOGY

Figure 1:
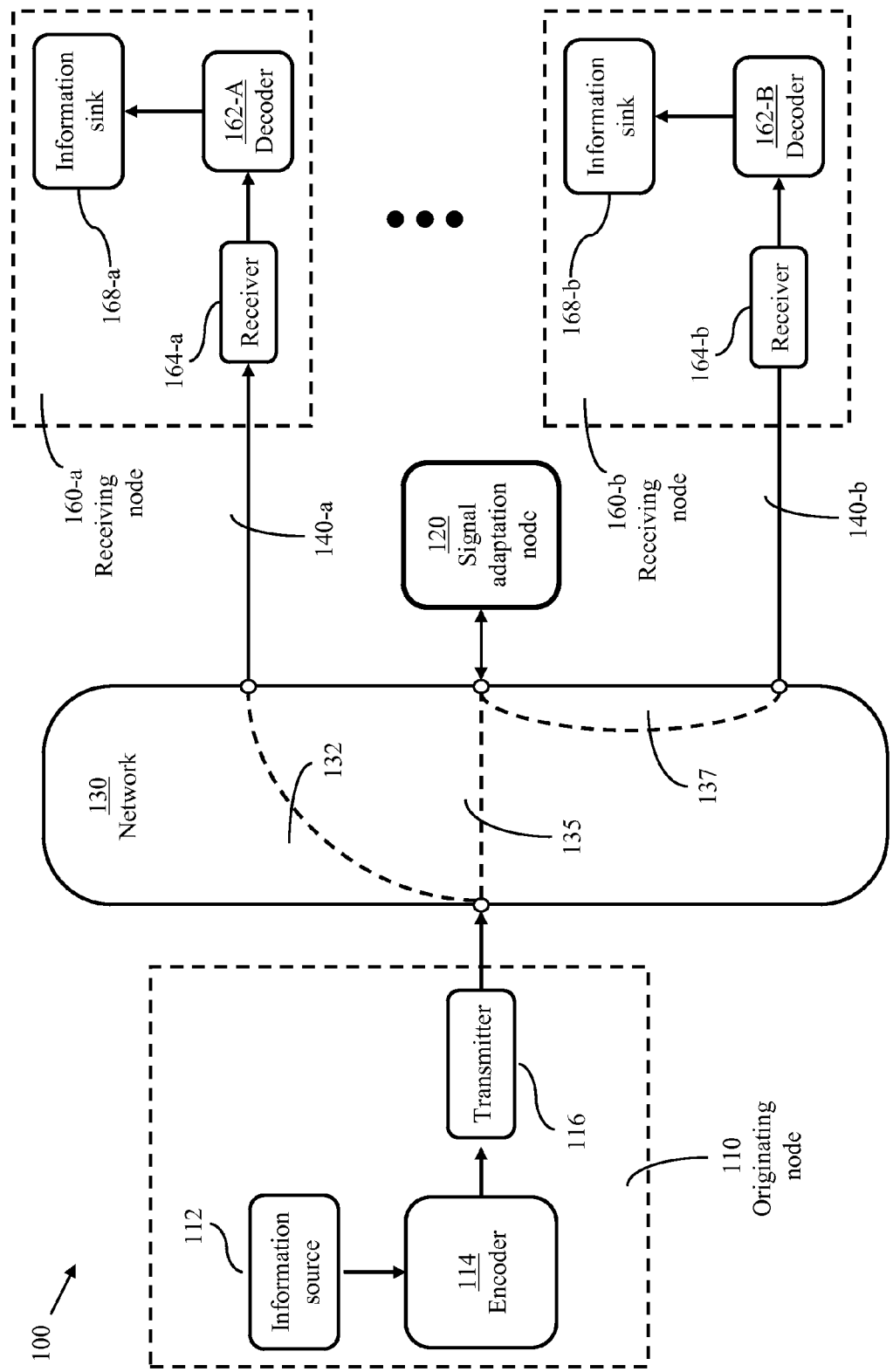
FIG. 1 illustrates a communications system implementing the method of the invention.

Signal: A data stream occupying a time window is herein referenced as a "signal". The duration of the time window may vary from a few microseconds to several hours.

Encoding parameters: Encoding a signal produced by a signal source into a digital encoded format entails selecting several parameters to represent the signal in the encoded format. The encoding process entails two successive stages: signal representation modification and signal compression. In the first stage, the signal's representation is modified if it is required or desired. In the second, the resulting signal is compressed to reduce its size or bit rate. The parameters used in the first stage are called signal representation parameters while the ones used in the second stage are called compression parameters. Together, they form the encoding parameters. The signal representation parameters affect the signal's intrinsic characteristics before compression such as sampling rate for audio or display resolution and frame rate for video. The compression parameters affect how the compression stage is performed and include the quantization step. A video signal is encoded in a format suitable for display on a screen as a succession of images (frames).

Quantization: the term refers to a process of converting a signal, which can take $N_1$ possible values, to a signal which can take $N_2$ possible values with $N_2<N_1$. The set of possible values are called levels. This conversion, or mapping, can, for instance, be performed by rounding the input values to the nearest available output values or by truncating them. For instance the process of taking 16 bit samples and converting them to 8 bit samples represents a quantization operation. Quantization reduces the fidelity of a signal but also the size to represent it.

Quantization step: the quantization step or quantization step size is defined as the difference between two adjacent quantization levels. The quantization step is only defined when the quantization is uniform, i.e. when the possible values or levels are equidistant.

Fidelity: A source signal, i.e., a signal generated at a signal source, is encoded into an "encoded signal". An encoded signal is decoded at a decoder to produce a "detected signal". The degree of resemblance of the detected signal to the source signal, herein called "fidelity", is a measure of encoding quality. Fidelity may be determined based on human perception or by some automated means. The highest realizable fidelity corresponds to the boundary values of encoding parameters.

Fidelity index: The ratio of a measure of fidelity for a given set of encoding parameters to a measure of fidelity corresponding to the maximum realizable value is herein called a "fidelity index". A fidelity index is less than or equal to 1.0 but greater than zero. The terms "fidelity index", relative fidelity index", and "normalized fidelity index" may be used synonymously.

File size: The size of an encoded signal depends heavily on the encoding method and, of course, the size of the source signal. The largest size corresponds to reference values of encoding parameters. The ratio of the size of the encoded signal for a given set of encoded parameters to the maximum size is herein referenced as a "file size". A file size is less than or equal to 1.0 but greater than zero. The terms "file size", "relative file size", and "normalised file size" may be used synonymously.

Flow rate: A signal may be encoded (or transcoded) in segments and transmitted to a receiver for storage or display in real time. The highest bit rate of the produced encoded signal corresponds to reference values of the encoding parameters. The ratio of the bit rate for a given set of encoding parameters to the maximum bit rate is herein referenced as a "flow rate". A flow rate is less than or equal to 1.0 but greater than zero. The terms "flow rate", "relative flow rate", and "normalised flow rate" may be used synonymously.

Properties of encoded signal: The fidelity index, the file size, and flow rate constitute properties of an encoded (or transcoded) signal. According to the present invention, the properties are modeled as parametric functions $\Gamma(q, r, \phi)$, $S(q, r, \phi)$, and $B(q, r, \phi)$, representing the fidelity index, the file size, and the flow rate respectively, where q is the ratio of the minimum quantization step to the quantization step used, r is the ratio of the used display resolution to the maximum display resolution, and $\phi$ is the ratio of the frame rate used to the maximum frame rate; $0<q\le1$, $0<r\le1$, and $0<\phi\le1$.

Parametric constraints: The values of q, r, and $\phi$ may be limited to decoder-specific values which may vary from one decoder to another. The decoder-specific values are parametric constraints.

System constraints: As far as the encoder or transcoder is concerned, the parametric functions $\Gamma(q, r, \phi)$, $S(q, r, \phi)$, and $B(q, r, \phi)$ are independent of each other, each being uniquely determined according to the selected values of q, r, and $\phi$. However, the encoder or transcoder belongs to a communications system which is subject to further constraints which are either dictated by technological limitations, or regulated for other considerations. Thus, it may be desirable to impose a constraint, unrelated to the encoder or transcoder, regarding the file size or flow rate. It may also be desirable to impose a constraint regarding a lower bound of an acceptable fidelity index.

Constraint function: The parametric function corresponding to a constrained property is herein called a "constraint function". Thus, if the file size is subject to constraints, the parametric function $S(q, r, \phi)$ becomes a constraint function. If the flow rate is subject to constraints, the parametric function $B(q, r, \phi)$ becomes a constraint function. If the fidelity index is subject to constraints, the parametric function $\Gamma(q, r, \phi)$ becomes a constraint function.

Objective function: The parametric function corresponding to a property to be optimized is herein called an objective function. There may more than one constraint functions, but there is one, and only one, objective function. Thus, if $\Gamma(q, r, \phi)$ is selected as an objective function with the objective of maximizing the fidelity index, then either or both of the parametric functions $S(q, r, \phi)$ and $B(q, r, \phi)$ may serve as constraint function(s) pertinent to limitations of file size and flow rate, respectively. If $S(q, r, \phi)$ is selected as an objective function with the objective of minimizing the file size, then either or both of the parametric functions $\Gamma(q, r, \phi)$ and $B(q, r, \phi)$ may serve as constraint function(s) pertinent to a requisite lower bound of the fidelity index and/or limitations imposed on the flow rate, respectively. If $B(q, r, \phi)$ is selected as an objective function with the objective of minimizing the flow rate, then either or both of the parametric functions $\Gamma(q, r, \phi)$ and $S(q, r, \phi)$ may serve as constraint function(s) pertinent to a requisite lower bound of the fidelity index and/or limitations imposed on the file size, respectively.

DETAILED DESCRIPTION

FIG. 1 illustrates a communications system where an originating node 110 distributes multimedia signals to a number of receiving nodes 160 through a network 130. The originating node has an encoder 114 for encoding signals acquired from an information source 112. Naturally, a receiver and other rudimentary elements of a communications node precede the encoder and are not illustrated in FIG. 1. The information source 112 may represent a plurality of information sources any of which may be collocated with the encoder or accessed through a dedicated communications path or a path through a network, including the illustrated network 130. A transmitter 116 transmits encoded signals produced by encoder 116 over a channel to network 130. The originating node may have multiple encoders 114 and multiple transmitters 116 and may connect to network 130 through multiple channels directed to multiple network ports.

A receiving node 160 (individually 160-a, 160-b, etc.) has a receiver 164 for demodulating received signal and submitting the information content to a decoder 162 which delivers decoded information content to a respective information sink 168 where the decoded information may be stored or presented (e.g., displayed) in real time.

The originating node 110 may have access to data indicating characteristics of a target receiving node, in which case encoder 112 would select encoding parameters compatible with the characteristics and deliver the encoded signals to the target receiving node 160 over a path 132 through network 130 and a channel 140-*a* from a network port to the receiving node 160-*a*. Alternatively, the communications system may provide a signal adaptation node 120 storing sufficient information pertinent to a multiplicity of receiving nodes, or configured to communicate with receiving nodes to acquire requisite characterizing data. Various methods of obtaining characterizing data are presented in a paper entitled "Multimedia Adaptation for the Multimedia Messaging Service", Coulombe, Stephane, and Guido, Grassel, 2004. *IEEE Communications Magazine* 42 (7) (July): 120-126.

An originating node 110 accesses the signal adaptation node 120 through a network path 135. The signal adaptation node 120 transcodes signals according to characteristics of respective receiving nodes. A transcoded signal is transmitted to a target receiving node 160-*b* through a network path 137 and a path 140-*b* from a network port to the receiving node 140-*b*. A signal adaptation node 120 may be shared by many originating nodes 110. While in this embodiment they are performed by a same node, the functionalities of transcoding and obtaining characterizing data may also be performed by different nodes.

Encoding Options

In transforming an analogue signal into a digital signal, the analogue signal is sampled at an adequate sampling rate. The magnitude of each sample, or the value of a predefined function of each sample, is approximated by one of a number of discrete levels, often referenced as quantization levels. The larger the number of quantization levels, or equivalently the smaller a quantization step, the more accurate the digital representation. A video signal transformed into digital format is further organized into a succession of sets of samples, where each set of samples, often called a frame, may be displayed as an image using a display device. Each image is defined by a number of "picture elements" (pixels), often called display resolution.

Naturally the higher the pixels spatial density, the closer the image to the original picture it represents. A displayed image persists until replaced by a succeeding image. Thus, the higher the rate of changes of displayed images, the higher the image rate, also called frame rate. Each video frame is compressed by exploiting spatiotemporal redundancies. In the encoding process, spatiotemporal predictions are performed to reduce redundancies and differences from these predictions (also called residual information) are transformed (often using a discrete cosine transform or a similar transform), quantized, entropy coded, and transmitted. A good overview of the compression tools used in the context of H.264/AVC video coding standard is presented in: Wiegand, T., G. J. Sullivan, G. Bjontegaard, and a. Luthra. 2003. "Overview of the H.264/AVC Video Coding Standard." *IEEE Transactions on Circuits and Systems for Video Technology* 13 (7) (July): 560-576. As in the quantization of analogue signals, the quantization of transformed residual information affects the fidelity (visual quality) as well as the bit rate of the encoded signal. A smaller quantization step leads to a better signal fidelity and to a higher bit rate. The three above parameters (display resolution, frame rate and quantization (or quantization step)) affect the flow rate (bit rate) or file size, as well as the fidelity, of a video sequence. The higher the display resolution, the higher the flow rate (or size) and fidelity. The lower the quantization step, the higher the flow rate (or size) and fidelity. The higher the frame rate, the higher the flow rate (or size) and fidelity (for time-varying sequences). There are several methods of encoding video signals which aim at reducing the size of an encoded video recording and/or the flow rate of an encoded video signal.

An encoder of a video signal may encode the signal according to a specific quantization step, a specific display resolution, and a specific frame rate compatible with a target receiving node 160. Alternatively, an encoder of a video signal may encode the signal according to a nominal quantization step, a nominal display resolution, and a nominal frame rate to be further transcoded into a different quantization step, a different display resolution, and/or a different frame rate. The transcoding may be necessitated by the capability of a receiving node 160, the capacity of a communication path to a receiving node, or both. Several originating nodes 110, each having a respective encoder, may direct initially encoded video signals to a shared signal adaptation node to be individually re-encoded (transcoded) and directed to respective receiving nodes 160.

Encoding a video signal, or transcoding an already encoded video signal, for delivery to a target receiving node requires initial processes of acquiring characteristics of the receiving node to determine an upper bound of display resolution, and an upper bound of frame rate. It is also desirable to determine descriptors of the video signals, such as a classification according to rate of temporal image variation which may influence the selection of the encoding parameters. Classification of a video signal may be based on a representative rate of temporal variation, a quantifier of spectral content in terms of bandwidth occupied by the signal, or some indicator of scene variation rate.

A degree of resemblance of a visual display of the encoded signal to a display of a respective original signal (i.e., the signal before it is encoded) is a measure of fidelity of the encoded signal. Likewise, resemblance of a visual display of a transcoded video signal to a display of a respective already encoded video signal is a measure of fidelity of the transcoded video signal. The fidelity of an encoded or transcoded video signal may be quantified according to some means and represented as a normalized "fidelity index" which may vary between 0 and 1.0 (where a value near 0 indicates poor quality and a value near 1 indicates high quality).

Naturally, encoding a video signal at the bounds of encoding parameters (i.e. smallest allowable quantization step, highest allowable display resolution and highest allowable frame rate) yields the highest resemblance of a visual display of the encoded signal to a display of a respective original analogue signal. Likewise, transcoding an already encoded video signal at the bounds of encoding parameters yields the highest resemblance of a visual display of the transcoded signal to a display of already encoded video signal. However, encoding (or transcoding) at the bounds of encoding parameters would normally yield a video recording of a larger size in comparison with a size of a recording produced according to other encoding parameters. Likewise, encoding (or transcoding) at the bounds of encoding parameters would normally yield an encoded signal of a higher flow rate in comparison with a flow rate of an encoded signal produced according to other encoding parameters. Thus, the encoding or transcoding process may be based on satisfying a requisite fidelity index while minimizing a resulting recording size or a flow rate of an encoded or transcoded signal delivered to a receiving node 160. Alternatively, the encoding or transcoding process may be based on satisfying a requisite upper bound of encoded-signal size or upper bound of flow rate while maximizing a corresponding fidelity index of an encoded or transcoded signal delivered to a receiving node 160.

Selecting appropriate encoding parameters requires means for relating properties of the outcome of encoding or transcoding to the encoding parameters. Determining the fidelity index, file size, or flow rate corresponding to a set of encoding parameters depends heavily on the nature of the scenes captured by the video signal and the method of encoding, which may vary significantly from one encoding standard to another. Thus, it may be difficult to express the fidelity index, file size, or flow rate as a function of encoding parameters and/or descriptors of the video signal. An alternate approach is to exploit known data records of evaluations of properties of outputs of encoders or transcoders corresponding to selected experimental sets of encoding parameters. The known data records may be used as reference points to guide processes of evaluation of outputs of encoders and transcoders for arbitrary values of encoding parameters.

Considering the unavoidable random fluctuations in measuring or estimating properties of such outputs, use of interpolation, linear or otherwise, may falsify the result or complicate the prediction models. A more reliable method, in accordance with the present invention, is to conjecture appropriate individual analytical functional relationships of the fidelity index, the file size, and the flow rate to the encoding parameters and adjust parameters (constants) of the functions to minimize a positive definite function of deviation of reference data from corresponding values computed according to the functional relationship. The analytical functions may then be used directly for selecting appropriate encoding parameters or, preferably, used to produce tables of fine granularity indicating fidelity indices, file sizes, and flow rates for a large number of encoding parameters. For example, while the number of the reference data records may be of the order of 50, the computed granular tables may store fidelity indices, file sizes, and flow rates for 64 quantization steps, 64 display-resolution values, and 64 frame rates, to a total of 262144 records.

The analytical functions used for modeling the dependence of encoding properties on encoding parameters may have different forms. Thus, a first analytical function is formulated for quantifying dependence of a fidelity index of the encoded (transcoded) signal on the quantization step, the display resolution, and the frame rate. A second analytical function is formulated to quantify dependence of a relative size of the encoded/transcoded signal on the quantization step, the display resolution, and the frame rate. A third analytical function is formulated to quantify dependence of a relative flow rate of the encoded/transcoded signal on the quantization step, the display resolution, and the frame rate.

The analytical functions used for modeling the dependence of the fidelity index on encoding parameters are preferably selected based on separation of the variables representing the quantization step, the display-resolution, and the frame rate. Thus, first analytical function may be expressed as a multiplication of a respective one-dimensional function of quantization step, a respective one-dimensional function of display resolution, and a respective one-dimensional function of frame rate. Likewise each of the second function relating file size to encoding parameters and the third function relating flow rate to encoding parameters may be expressed as multiplications of respective one-dimensional functions.

To select a set of encoding parameters yielding a fidelity index at least equal to a specified value, the granular table of fidelity indices is examined to identify a number of candidate records each corresponding to a fidelity index at least equal to the specified value and a set of encoding parameters compatible with descriptors of the video signal and characteristics of a target receiver. If the number of candidate records exceeds one, the granular table of file sizes may be indexed using the indices of the candidate records in order to determine corresponding file sizes. The set of encoding parameters of the candidate record corresponding to the minimum file size is then selected as a preferred set of encoding parameters. Likewise, if the number of candidate records exceeds one, the granular table of flow rates may be indexed using the indices of the candidate records in order to determine corresponding flow rates. The set of encoding parameters of the candidate record corresponding to the minimum flow rate is then selected as a preferred set of encoding parameters.

To select a set of encoding parameters yielding a file size not exceeding a specified value, the granular table of file sizes is examined to identify a number of candidate records each corresponding to a file size not exceeding the specified value and a set of encoding parameters compatible with descriptors of the video signal and characteristics of a target receiver. If the number of candidate records exceeds one, the granular table of fidelity indices is indexed using the indices of the candidate records in order to determine corresponding fidelity indices. The set of encoding parameters of the candidate record corresponding to the highest fidelity index is then selected as a preferred set of encoding parameters.

To select a set of encoding parameters yielding a flow rate not exceeding a specified upper bound, the granular table of flow rates is examined to identify a number of candidate records each corresponding to a flow rate not exceeding the specified upper bound and a set of encoding parameters compatible with descriptors of the video signal and characteristics of a target receiver. If the number of candidate records exceeds one, the granular table of fidelity indices is indexed using the indices of the candidate records in order to determine corresponding fidelity indices. The set of encoding parameters of the candidate record corresponding to the highest fidelity index is then selected as a preferred set of encoding parameters.

It may be required that the selection of a set of encoding parameters used for encoding or transcoding take into consideration specified upper bounds of both the file size and the flow rate of an encoded signal. In such case, both granular tables of files sizes and flow rates may be examined to identify at least one candidate set of encoding parameters yielding a file size and a flow rate not exceeding their respective specified upper bounds while being compatible with descriptors of the video signal and characteristics of a target receiver. If the number of candidate records exceeds one, the granular table of fidelity indices is indexed using the indices of the candidate records in order to determine corresponding fidelity indices. The set of encoding parameters of the candidate record corresponding to the highest fidelity index is then selected as a preferred set of encoding parameters.

It is well known in the art of analytical or numerical optimization that an objective function representing some desirable property can only be optimized with respect to one, and only one, property. Thus, with the three properties of fidelity, size, and flow rate, one may opt to maximize fidelity while observing upper bound constraints relevant to the file size, the flow rate, or both. Alternatively, one may opt to minimize the file size of an encoded signal while observing a lower bound constraint relevant to a predefined fidelity index and/or an upper size constraint relevant to flow rate. Likewise, one may opt to minimize the flow rate of an encoded signal while observing a lower bound constraint relevant to a predefined fidelity index and/or an upper size constraint relevant to file size.

Figure 2:
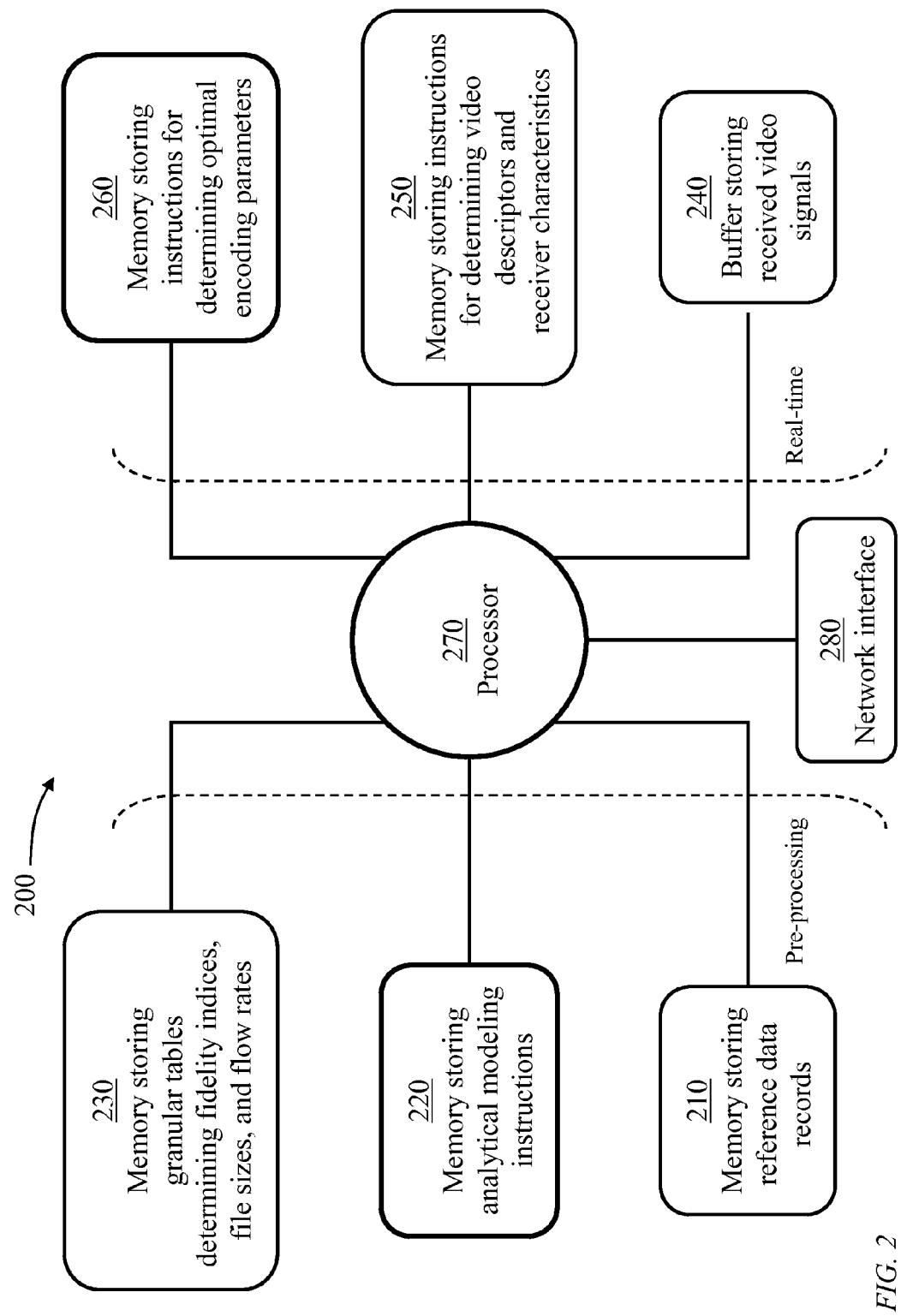
FIG. 2 illustrates an apparatus for encoding or transcoding signals to produce encoded signals of specified properties, in accordance with an embodiment of the present invention.

FIG. 2 illustrates an apparatus 200 for determining signal encoding parameters. The apparatus comprises a processor 270, a number of memory devices, and an interface 280 with a communications network. A memory device 210 stores reference data records indicating properties of encoded signals at selected encoding parameters. Each reference data record indicates a fidelity index, a relative signal size, and/or a relative flow rate corresponding to one of a collection of sets of encoding parameters.

A memory device 220 stores processor-executable instructions representing analytical functions relating properties of encoded signals to values of encoding parameters. The properties include a fidelity index, an encoded-signal size, and a flow rate of an encoded signal.

The processor-executable instructions are devised to define a first analytical model for determining fidelity indices and a second analytical model for determining relative signal sizes based on the reference data records. The instructions may also be devised to define a third analytical model for determining a flow rate of an encoded signal. The instructions also cause the processor 270 to generate a granular table of fidelity indices, a granular table of relative sizes of encoded signals, and a granular table of flow rates of encoded signals corresponding to predefined sets of encoding parameters. The number of the predefined sets of encoding parameters is preferably significantly larger than the number of reference data records in order to facilitate selecting a preferred set of encoding parameters yielding a value of an objective property close to a sought optimum value.

A memory 230 stores granular tables storing fidelity indices, file sizes, and flow rates corresponding to the predefined set of encoding parameters. The contents of memory devices 210, 220, and 230 are relevant to processes executed before engaging the apparatus 200 in time-critical processes of determining appropriate encoding parameters and encoding or transcoding signals accordingly.

A buffer 240 stores video signals, or video recordings, directed to a target receiving node 160. A memory device 250 stores processor-executable instructions for determining characteristics of the target receiving node 160. The characteristics of the receiving node may be acquired through exchange of messages with the target receiving node 160, or through accessing a relevant database (not illustrated).

A memory device 260 stores processor-executable instructions which cause processor 270 to examine the granular tables to identify a preferred set of encoding parameters compatible with the characteristics of the target receiving node and corresponding to a least relative signal size at a fidelity index at least equal to a specified lower bound. Alternatively, the preferred set of encoding parameters may be selected to correspond to a highest fidelity index under the constraint of a relative encoded-signal size not exceeding a specified upper bound. The processor-executable instructions may also be devised to cause processor 270 to examine the granular tables to identify a preferred set of encoding parameters compatible with the characteristics of the target receiving node and corresponding to a least relative flow rate at a fidelity index at least equal to a specified lower bound. Alternatively, the preferred set of encoding parameters may be selected to correspond to a highest fidelity index under the constraint of a relative encoded-signal flow rate not exceeding a specified upper bound.

Thus, memory devices 240, 250, and 260 hold data used for real-time processes. It may be desirable to employ different processors to separately execute the pre-processing functions and the time-critical functions.

Figure 3:
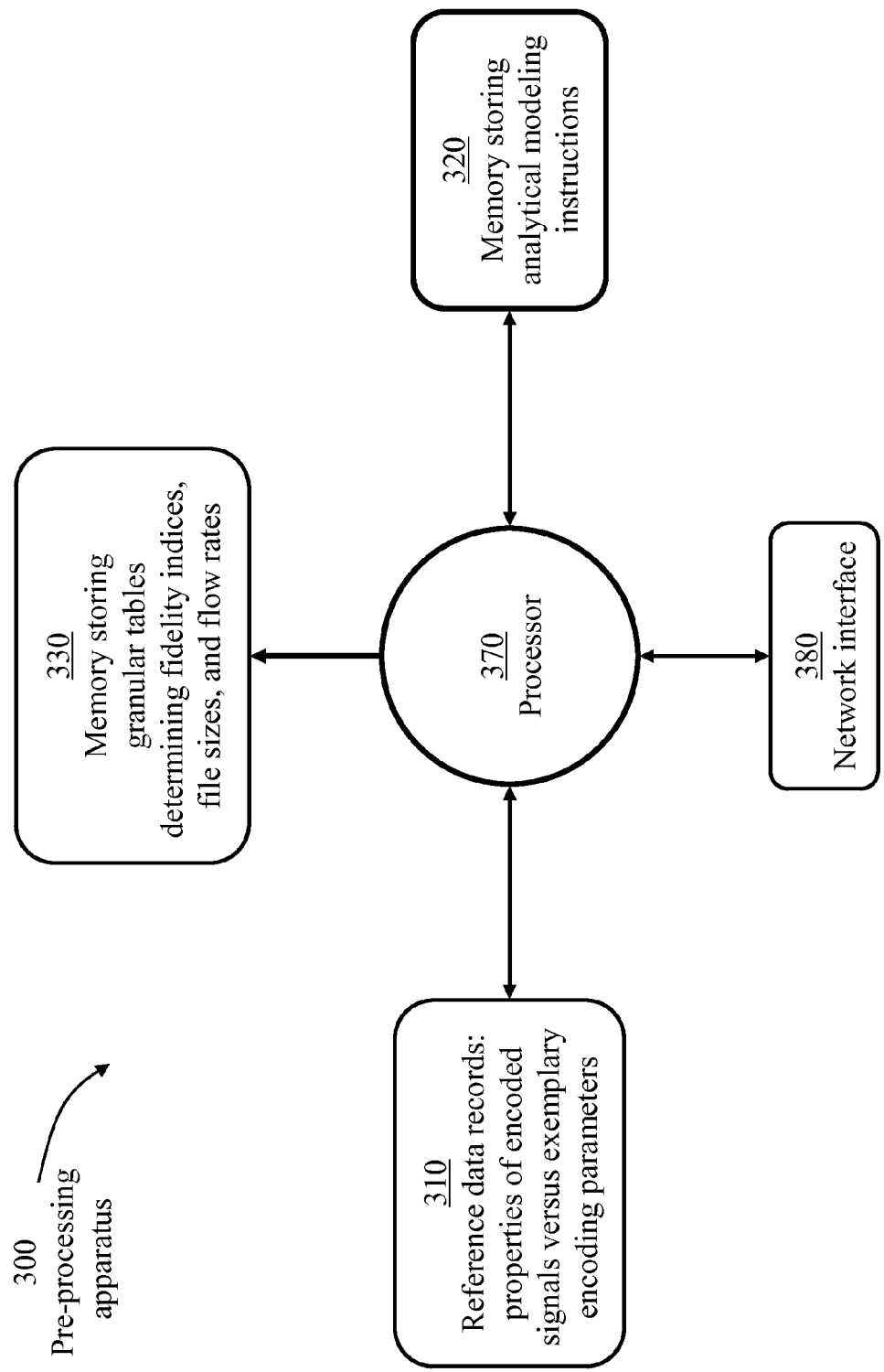
FIG. 3 illustrates an apparatus for pre-processing data to expedite real-time execution of the methods of the invention.

FIG. 3 illustrates a pre-processing apparatus 300 for generating granular tables relating encoded-signal properties to encoding parameters. The apparatus comprises a processor 370, a memory device 310, a memory device 320, a memory device 330, and a network interface 380. Memory device 320 stores processor-executable instructions similar to the instructions stored in memory device 220 of apparatus 200. Memory device 310 stores reference data records and memory device 330 stores granular tables as described above with reference to memory devices 210 and 230, respectively. The reference data records may be acquired from external databases through network interface 380.

Figure 4:
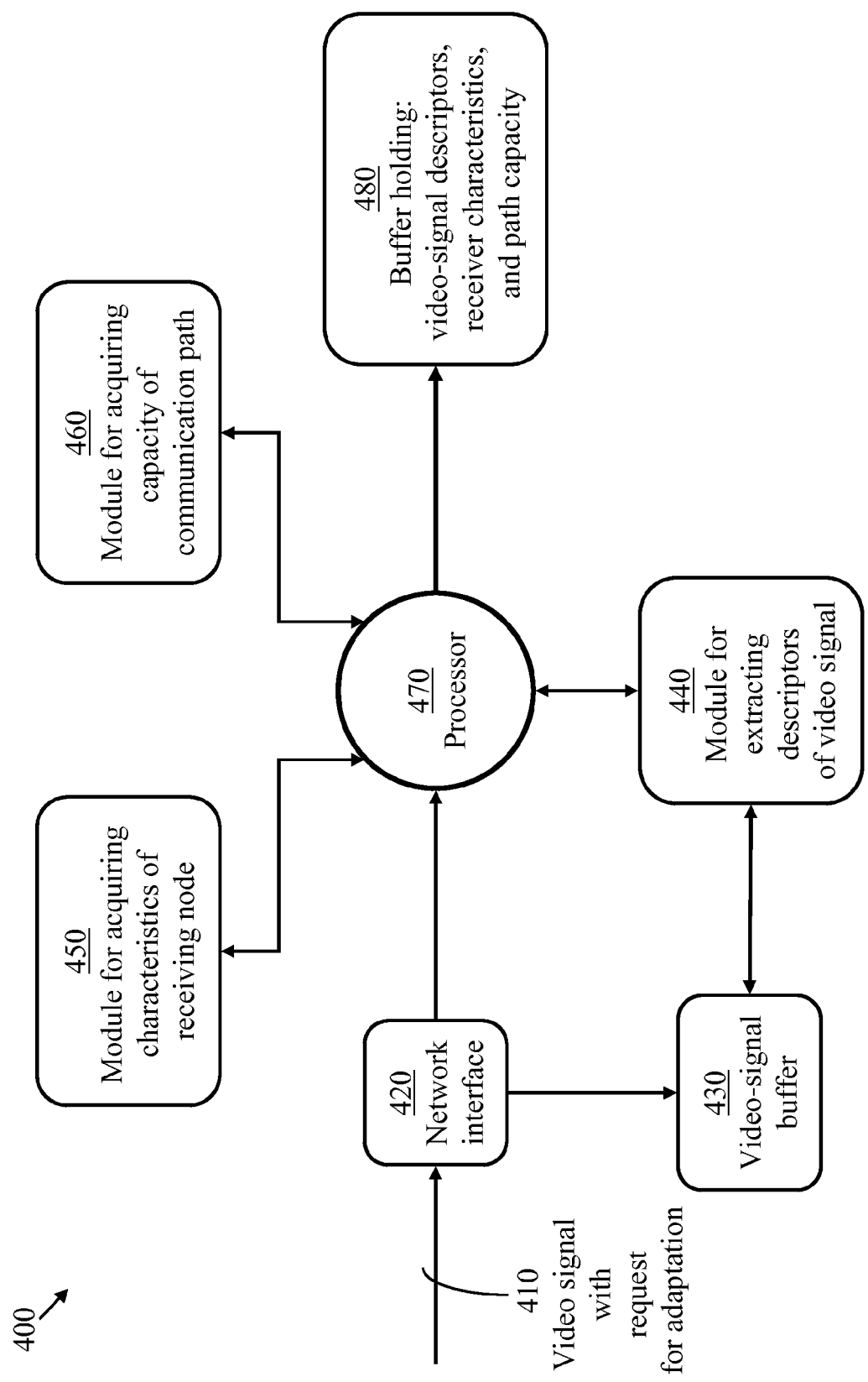
FIG. 4 illustrates an apparatus for determining video signal descriptors, receiving node characteristics, and capacity of a path from the apparatus to a receiving node, in accordance with an embodiment of the present invention.

FIG. 4 illustrates an apparatus 400 for determining descriptors of a video signal, characteristics of a target receiving node, and capacity of a path from the apparatus to the target receiving node. A video signal may be received over a communication channel 410 and directed, through a network interface 420, to a video-signal buffer 430 which may store segments of a video stream, or an entire video recording, to be transcoded and directed to a target receiving node 160. The apparatus has a processor 470 coupled to a memory device 440 storing processor-executable instructions forming a module which causes the processor to extract descriptors of a video signal held in the video-signal buffer 430. A memory device 450 stores processor-executable instructions forming a module for determining characteristics of a target receiving node 160. The characteristics of the target receiving node may be acquired through exchange of messages with the target receiving node 160. The characteristics of receiving nodes may also be retrieved from a relevant database (not illustrated) which may be collocated with the apparatus or accessed through a communication path. A memory device 460 stores processor-executable instructions, forming a module, for acquiring capacity (permissible bit rate) of a communication path from an originating node 110 or a signal adaptation node 120 supporting the apparatus to a target receiving node. A buffer 480 holds descriptors (determined in module 440) of the video signal, characteristics (determined in module 450) of the target receiving node, and the capacity (determined in module 460) of the communication path to the target receiving node.

Figure 5:
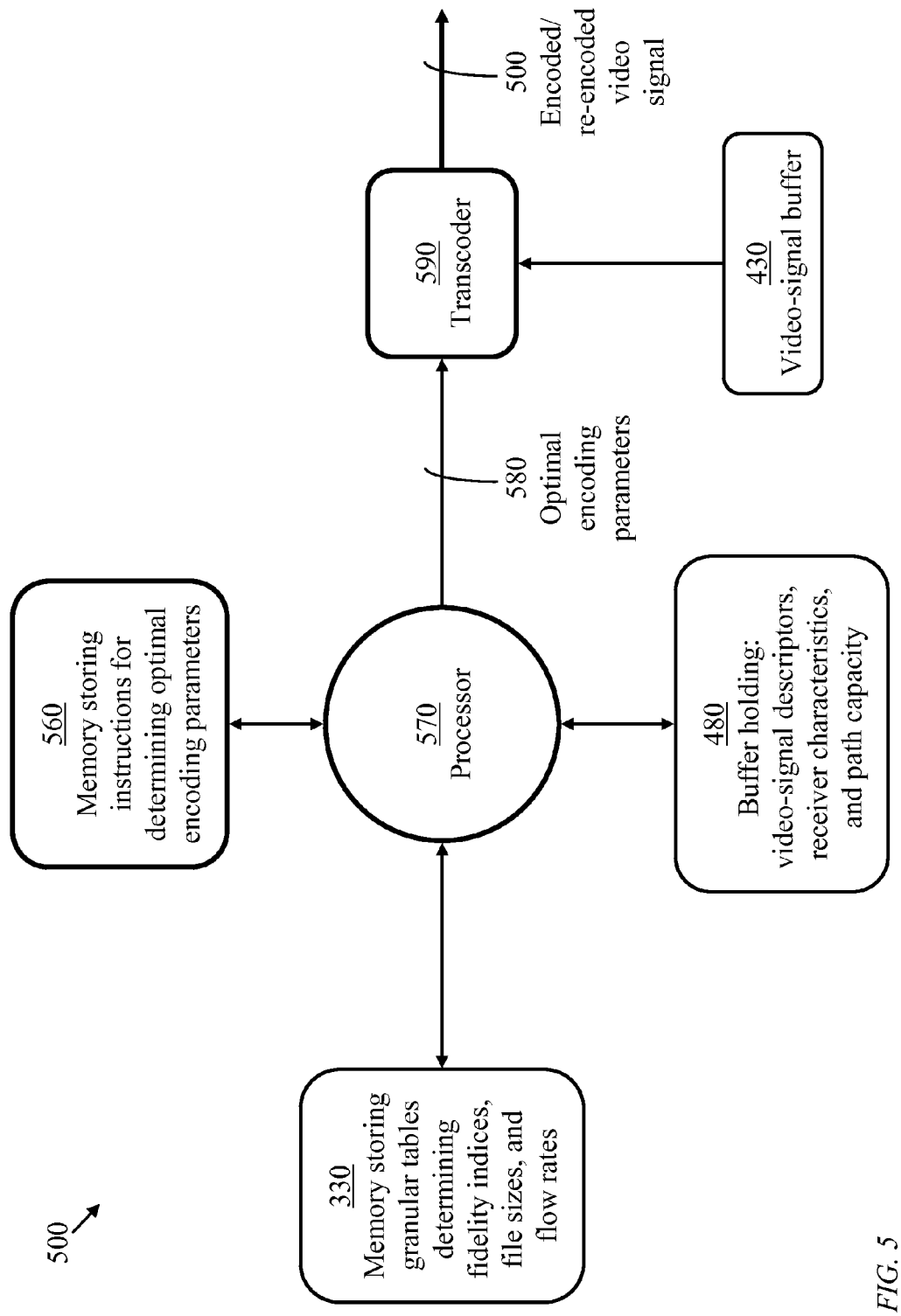
FIG. 5 illustrates an apparatus for encoding or transcoding signals to produce encoded signals of specified properties, employing outputs of the apparatus of FIG. 3 and FIG. 4, in accordance with an embodiment of the present invention.

FIG. 5 illustrates an apparatus 500 for encoding or transcoding signals to produce encoded signals of specified properties, employing outputs of apparatus 300 of FIG. 3 and apparatus 400 of FIG. 4. A processor 570 is coupled to buffer 480 which holds descriptors of a video signal, characteristics of a target receiving node, and capacity of a communication path to a target receiving node as determined by apparatus 400. Processor 570 is coupled to memory device 330 which stores granular tables determining fidelity indices, file sizes, and flow rates corresponding to a large number of sets of encoding parameters as determined by apparatus 300. A memory device 560, coupled to processor 570, stores processor-executable instructions, similar to the instructions stored in memory device 260 of apparatus 200, which cause processor 570 to examine the granular tables to identify a set of preferred encoding parameters compatible with the characteristics of the target receiving node and corresponding to an optimum value of a selected property of an encoded signal under a variety of constraints. A transcoder (or an encoder) 590 extracts segments of a video stream stored in video-signal buffer 430, transcodes (or encodes) the segments according to the optimal encoding parameters 580, and submits the encoded or transcoded video signal to a network interface to be directed to a target receiving node.

The operations of processors 470 and 570 may be pipelined. Processors 470 and 570 may also be operated according to some other load-sharing discipline.

Figure 6:
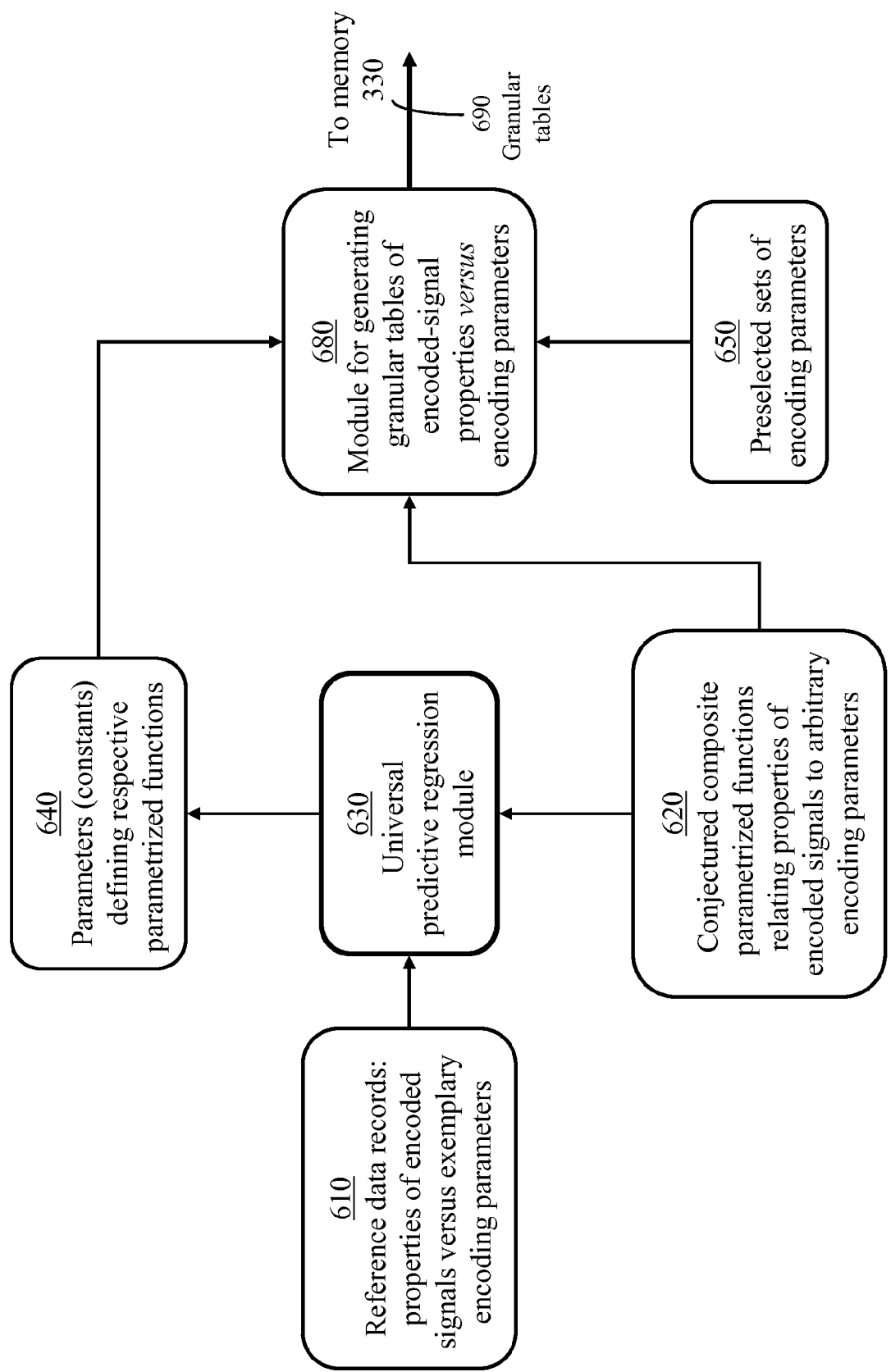
FIG. 6 illustrates a method of generating parametrized functions for determining properties of encoded signals corresponding to arbitrary values of encoding parameters, in accordance with an embodiment of the present invention.

FIG. 6 illustrates a method implemented at the pre-processing apparatus 300 for generating parametrized functions for determining properties of encoded signals corresponding to arbitrary values of encoding parameters. Memory device 310 of apparatus 300 stores a number of reference data records where each reference data record includes a fidelity index, a file size, and a flow rate corresponding to a respective experimental set of encoding parameters. The analytical modeling instructions stored in memory device 320 of apparatus 300 include software instructions relevant to conjectured analytical functions 620 determining properties of an encoded signal corresponding to any set of encoding parameters. The properties include a fidelity index, a file size, and a flow rate. The encoding parameters include a quantization step, a display resolution, and frame rate. The conjectured functions are defined by parameters (constants) which may be selected according to information extracted from the reference data records. For clarity, the parameters defining a function are referenced hereinafter as "constants" since the term "parameters" has been associated with the process of encoding and transcoding. The independent variables of each function are a normalized quantization step "q", a normalized display resolution "r", and a normalized frame rate "$\phi$". A universal predictive regression module 630 is used to determine the constants defining each function based on the reference property data and corresponding encoding parameters. The constants are stored in a memory 640. The software instructions 620 defining the analytical functions and the constants determined from the regression module are used in module 680 for generating granular tables of encoded signal properties corresponding to a relatively large number of preselected sets of encoding parameters 650.

The analytical function relating any of the properties to encoding parameters is based on the concept of separation of variables and is formulated as a composite function combining a respective one-dimensional function of quantization step, a respective one-dimensional function of display resolution, and a respective one-dimensional function of frame rate. A preferred composite function used herein is a multiplication of one-dimensional functions.

With the normalized independent variables of: the ratio of a minimum quantization step to a candidate quantization step; the ratio of a candidate display resolution to a maximum display resolution; and the ratio of a candidate frame rate to a maximum frame rate; denoted q, r, and $\phi$, respectively, a composite function relating fidelity to encoding parameters may be expressed as:

$$\Gamma(q,r,\phi) = \Gamma_1(q) \times \Gamma_2(r) \times \Gamma_3(\phi).$$

Likewise, a composite function relating the size of an encoded video signal to encoding parameters may be expressed as:

$$S(q,r,\phi) = S_1(q) \times S_2(r) \times S_3(\phi), \text{ and}$$

a composite function relating the flow rate of an encoded video signal to encoding parameters may be expressed as:

$$B(q,r,\phi) = B_1(q) \times B_2(r) \times B_3(\phi).$$

Each of the one-dimensional functions $\Gamma_1(q)$, $\Gamma_2(r)$, $\Gamma_3(\phi)$, $S_1(q)$, $S_2(r)$, $S_3(\phi)$, $B_1(q)$, $B_2(r)$, and $B_3(\phi)$ is a function defined according to respective constants.

As mentioned above, the independent variables are normalized: q is a ratio of a minimum quantization step to a candidate quantization step; r is a ratio of a candidate display resolution to a maximum display resolution; and $\phi$ is a ratio of a candidate frame rate to a maximum frame rate.

Figure 7:
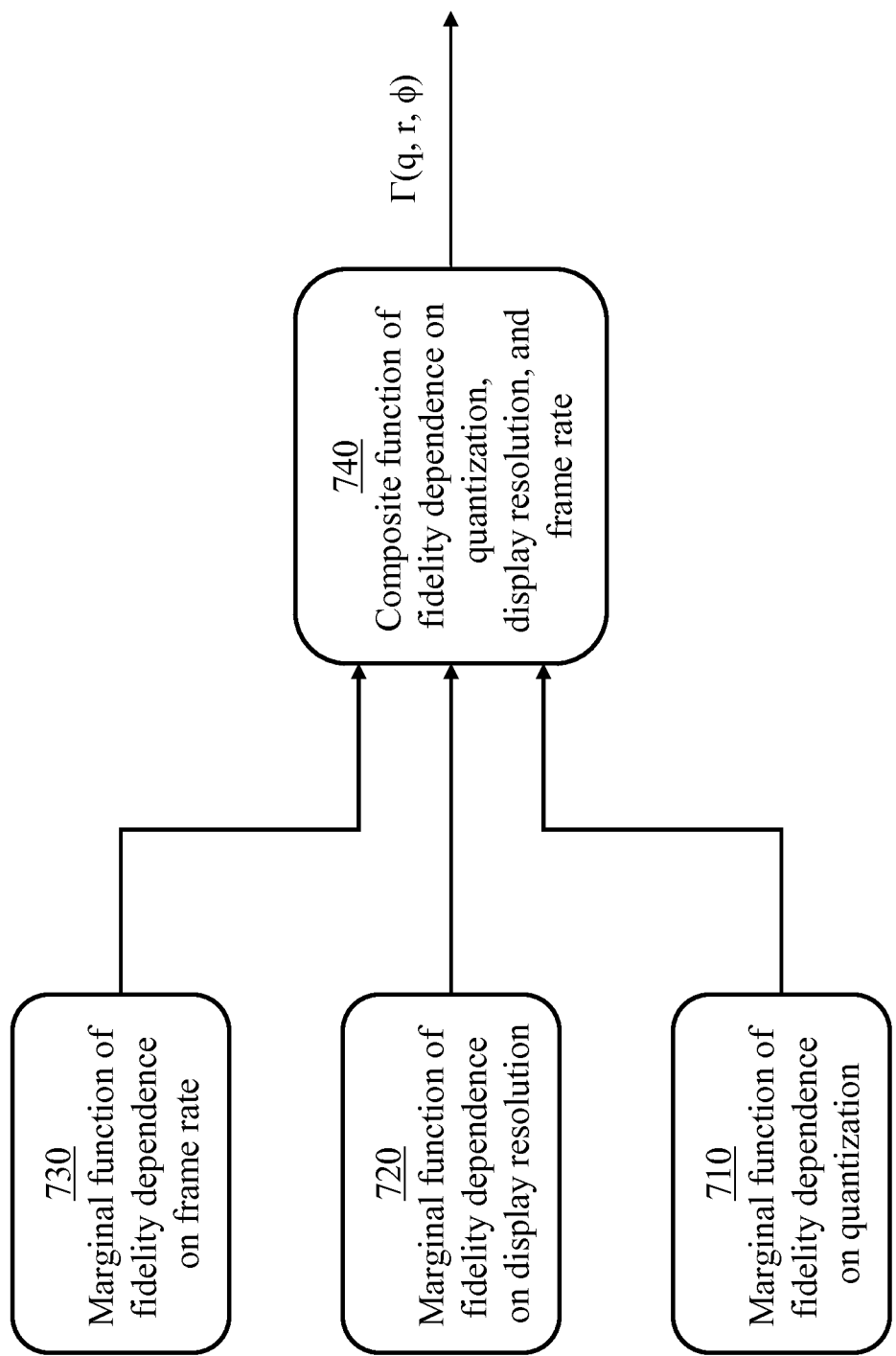
FIG. 7 illustrates a first analytical description of a first encoded-signal property as a function of encoding parameters, in accordance with an embodiment of the present invention.

FIG. 7 illustrates forming a first analytical function 740 including: a marginal function relating the fidelity index to quantization only; a marginal function relating the fidelity index to display resolution only; and a marginal function relating the fidelity index to frame rate only.

Figure 8:
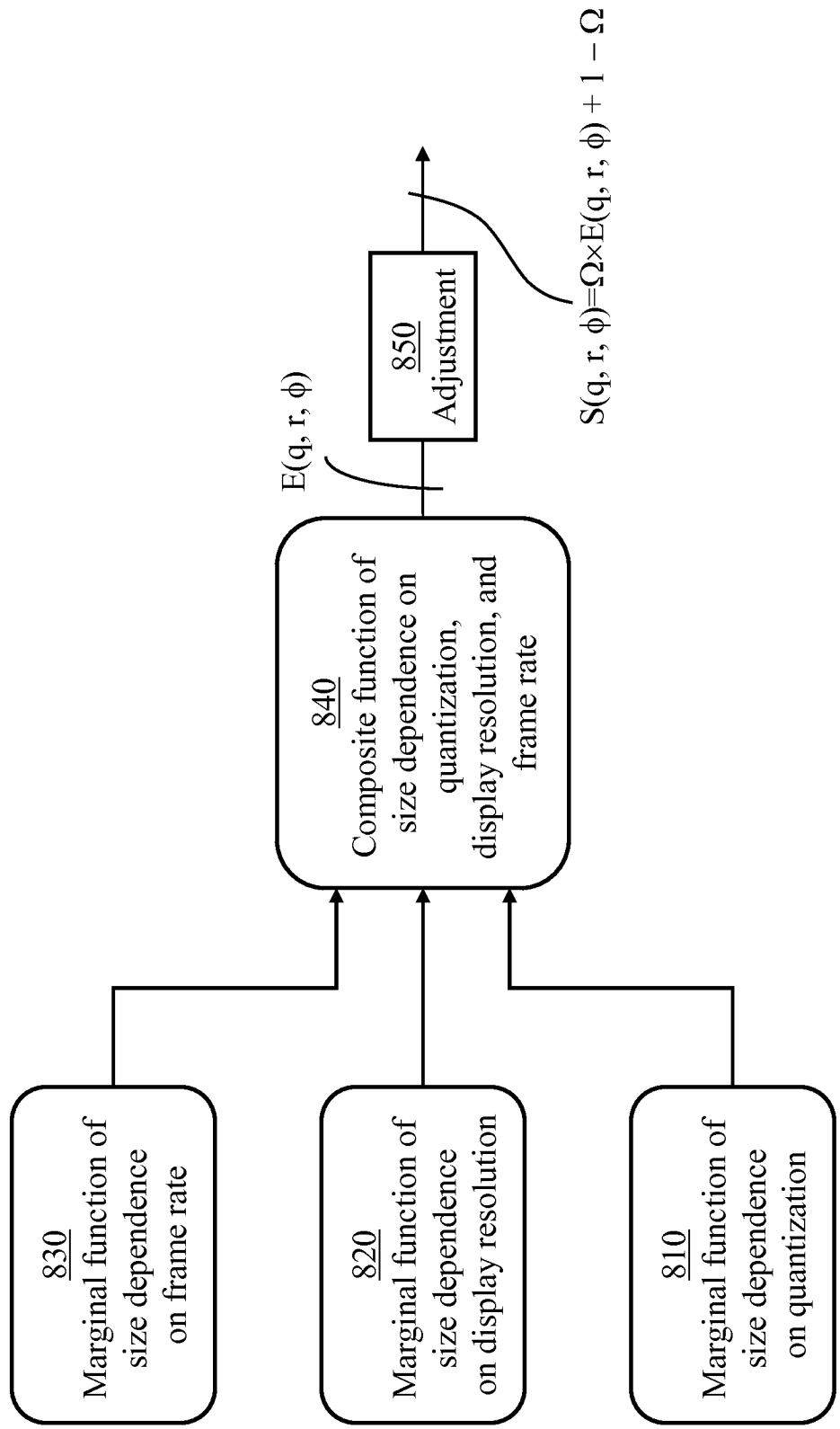
FIG. 8 illustrates a second analytical description of a second encoded-signal property as a function of encoding parameters, in accordance with an embodiment of the present invention.

FIG. 8 illustrates forming a second analytical function 840 including: a marginal function relating the relative size of an encoded signal to quantization only; a marginal function relating the relative size to display resolution only; and a marginal function relating the relative size to frame rate only.

Figure 9:
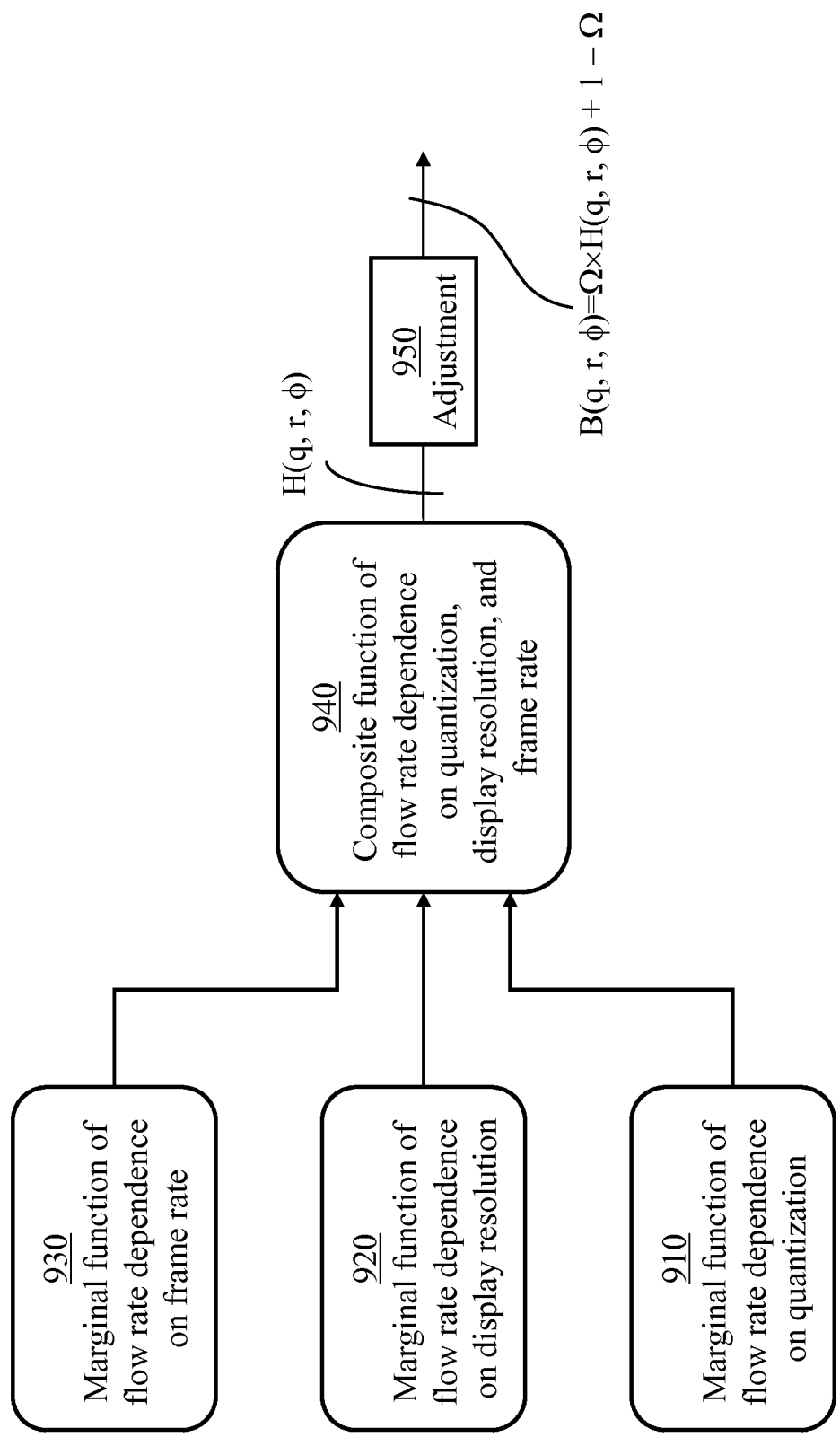
FIG. 9 illustrates a third analytical description of a third encoded-signal property as a function of encoding parameters, in accordance with an embodiment of the present invention.

FIG. 9 illustrates forming a third analytical function 940 including: a marginal function relating the relative flow rate of an encoded signal to quantization only; a marginal function relating the relative flow rate to display resolution only; and a marginal function relating the relative flow rate to frame rate only.

Table I and Table II, below, are exemplary tables produced according to the method of FIG. 6 indicating fidelity indices and files sizes corresponding to 48 preselected experimental sets of encoding parameters.

Table I is based on the first analytical function 740 quantifying dependence of a fidelity index on encoding parameters q, r, and $\phi$. The marginal functions 710, 720, and 730 are respectively formulated as:

$$\Gamma_1(q) = (1 + e^{(\alpha - \beta \times q)})^{-1};$$

$$\Gamma_2(r) = (1 + e^{(\gamma - \delta \times r)})^{-1}; \text{ and}$$

$$\Gamma_3(\phi) = (\eta \times \ln(\phi) + 1).$$

So that the first analytical function is expressed as:

$$\Gamma(q,r,\phi) = (1 + e^{(\alpha - \beta \times q)})^{-1} \times (1 + e^{(\gamma - \delta \times r)})^{-1} \times (\eta \times \ln(\phi) + 1).$$

Module 630 (FIG. 6) executes a first regression-analysis process to determine constants $\alpha$, $\beta$, $\gamma$, $\delta$, and $\eta$ defining the first analytical function.

Table II is based on the second analytical function 840 quantifying dependence of a relative signal size on encoding parameters q, r, and $\phi$.

The marginal functions 810, 820, and 830 are respectively formulated as:

$$S_1(q) = q^\theta;$$

$$S_2(r) = (1 + e^{(\sigma - \epsilon \times r)})^{-1}; \text{ and}$$

$$S_3(\phi) = \phi^\omega.$$

So that the second analytical function may be expressed as:

$$S'(q,r,\phi) = (\lambda \times q^\theta) \times (1 + e^{(\sigma - \epsilon \times r)})^{-1} \times \phi^\omega.$$

Module 630 (FIG. 6) executes a second regression-analysis process to determine constants $\lambda$, $\theta$, $\sigma$, $\epsilon$, and $\omega$ defining the second analytical function.

The second analytical function may be further augmented to reduce deviation from reference data using a parameter $\Omega$, determined by numerical experimentation to be very close to unity, so that $0 < (1 - \Omega) << 1.0$. A preferred value of $\Omega$ is 0.999.

Thus, the augmented second analytical function is expressed as:

$$S(q,r,\phi) = 1 - \Omega + \Omega \times S'(q,r,\phi) = 1 - \Omega + \Omega \times \lambda \times q^\theta \times (1 + e^{(\sigma - \epsilon \times r)})^{-1} \times \phi^\omega.$$

The marginal functions 910, 920, and 930 are respectively formulated as:

$$B_1(q) = q^\theta;$$

$$B_2(r) = (1+e^{(\sigma-\epsilon \times r)})^{-1}; \text{ and}$$

$$B_3(q) = \phi^\omega.$$

So that the third analytical function may be expressed as:

$$B'(q,r,\phi) = (\lambda \times q^\theta) \times (1+e^{(\sigma-\epsilon \times r)})^{-1} \times \phi^\omega.$$

Module 630 (FIG. 6) executes a third regression-analysis process to determine constants $\lambda$, $\theta$, $\sigma$, $\epsilon$, and $\omega$ defining the second analytical function.

It is of paramount importance to note that while the functions S'(q, r, $\phi$) and B'(q, r, $\phi$) have the same form with the same parametric definitions, the numerical values of the parameters (constants) $\lambda$, $\theta$, $\sigma$, $\epsilon$, and $\omega$ of B'(q, r, $\phi$) need not bear any specific relationship to corresponding values of S'(q, r, $\phi$).

As in the case of the second analytical function, the third analytical function B'(q, r, $\phi$) may be further augmented to reduce deviation from reference data using a parameter $\Omega$, determined by numerical experimentation to be very close to unity, so that $0 < (1-\Omega) \ll 1.0$. A preferred value of $\Omega$ is 0.999.

Thus, the augmented second analytical function is expressed as:

$$B(q,r,\phi) = 1-\Omega+\Omega \times B'(q,r,\phi) = 1-\Omega+\Omega \times \lambda \times q^\theta \times (1+e^{(\sigma-\epsilon \times r)})^{-1} \times \phi^\omega.$$

Table I and Table II may be used to select a preferred set of encoding parameters yielding fidelity index at least equal to a specified lower bound while minimizing the size of the encoded signal. A straightforward method is to examine each entry of Table I to identify each candidate set of encoding parameters compatible with characteristics of a target receiving node and corresponding to an acceptable value of the fidelity index. If more than one candidate set is found, which is likely to be the case, then corresponding entries of Table II are examined to select a set of encoding parameters corresponding to a least relative size of an encoded signal.

For example, if the fidelity index to be observed in encoding or transcoding a specific video signal is 0.52, and a target receiver operates at a relative quantization not exceeding 0.6, then the number of candidate sets of encoding parameters is 10. The number of candidate sets is the number of entries in Table I corresponding to values of q not exceeding 0.6 and fidelity indices each at least equal to 0.52. The candidate sets and corresponding relative file sizes of encoded signals are listed in Table III below which indicates a fidelity index determined from the first analytical function and listed in Table I and a relative file size determined from the second analytical function and listed in Table II. The fidelity index corresponding to each of the 10 sets of encoding parameters is larger than the requisite value of 0.52. The least relative file size is 0.04899 which corresponds to the set of encoding parameters q=0.25, r=0.25, and $\phi$=1.0. It is seen that the set of encoding parameters q=0.1575, r=1.0, and $\phi$=1.0 corresponds to a lower fidelity index 0.52877 (yet meeting the requirement) yet a higher relative file size of 0.13151. Also, the set of encoding parameters q=0.3970, r=1.0, and $\phi$=0.125 corresponds to a slightly lower fidelity index 0.53437 yet a higher relative file size of 0.10319 (compared to 0.04899).

Table IV below, derived from Table I and Table II, lists 12 sets of encoding parameters corresponding to relative file sizes less than 0.1 with the encoding parameters selected so that q≤0.6, r≤0.5, and $\phi$≤0.4. The set {0.397, 0.25, 0.25} of encoding parameters yields the highest fidelity index of 0.50215.

The parameters (constants) defining each of the analytical functions are specific to a set of reference data records which may be acquired for video streams of a specific classification. Video streams may be classified according to categories such as peak flow rates, mean flow rates, rate of variation of content of successive images caused by spatial variation and/or temporal variation of captured scenes.

As described above, analytical functions are devised to model an encoding or transcoding process for each video-stream classification. Thus, while the forms of the first, second, and third analytical functions Γ(q, r, $\phi$), S(q, r, $\phi$), and B(q, r, $\phi$) may be applicable to several video-stream classifications, the respective parameters (constants) defining the functions may differ significantly from one video-stream classification to another.

The analytical functions, discussed above, relating properties of encoded signals to encoding parameters, apply to encoding parameters relevant to three independent variables q, r, and $\phi$ representing a relative quantization step, a relative display resolution, and a relative frame rate. A process of direct examinations of granular tables relating properties of encoded signals to encoding parameters may be computationally intensive when the number of sets of encoding parameters is large.

TABLE I

Fidelity index as a function of normalized quantization (q), display resolution (r), and frame rate ($\phi$). The independent variables q, r, and $\phi$ are normalized values, each being greater than 0 and less than or equal 1.

| | | q | | | |
|---|---|---|---|---|---|
| $\phi$ | r | 0.15750 | 0.25000 | 0.3970 | 1.000 |
| 0.125 | 0.0625 | 0.13494 | 0.17539 | 0.22064 | 0.25458 |
| | 0.2500 | 0.25464 | 0.33098 | 0.41638 | 0.48043 |
| | 1.0000 | 0.32680 | 0.42478 | 0.53437 | 0.61657 |
| 0.250 | 0.0625 | 0.16273 | 0.21152 | 0.26609 | 0.30702 |
| | 0.2500 | 0.30710 | 0.39916 | 0.50215 | 0.57939 |
| | 1.0000 | 0.39412 | 0.51228 | 0.64445 | 0.74359 |
| 0.500 | 0.0625 | 0.19053 | 0.24765 | 0.31154 | 0.35947 |
| | 0.2500 | 0.35955 | 0.46735 | 0.58792 | 0.67836 |
| | 1.0000 | 0.46145 | 0.59979 | 0.75453 | 0.87060 |
| 1.000 | 0.0625 | 0.21833 | 0.28378 | 0.35700 | 0.41191 |
| | 0.2500 | 0.41201 | 0.53553 | 0.67370 | 0.77733 |
| | 1.0000 | 0.52877 | 0.68729 | 0.86461 | 0.99761 |

Table I is generated using the function Γ(q, r, $\phi$), defined above.

TABLE II

Size of encoded video recording as a function of normalized quantization (q), display resolution (r), and frame rate ($\phi$). The independent variables q, r, and $\phi$ are normalized values, each being greater than 0 and less than or equal 1.

| | | q | | | |
|---|---|---|---|---|---|
| $\phi$ | r | 0.15750 | 0.25000 | 0.3970 | 1.000 |
| 0.125 | 0.0625 | 0.00244 | 0.00339 | 0.00498 | 0.01200 |
| | 0.2500 | 0.00918 | 0.01460 | 0.02361 | 0.06346 |
| | 1.0000 | 0.03798 | 0.06247 | 0.10319 | 0.28328 |

TABLE II-continued

Size of encoded video recording
as a function of normalized quantization (q), display resolution (r),
and frame rate (φ). The independent variables q, r, and φ
are normalized values, each being greater than 0
and less than or equal 1.

| | | q | | | |
|---|---|---|---|---|---|
| φ | r | 0.15750 | 0.25000 | 0.3970 | 1.000 |
| 0.250 | 0.0625 | 0.00319 | 0.00465 | 0.00706 | 0.01774 |
| | 0.2500 | 0.01346 | 0.02171 | 0.03542 | 0.09609 |
| | 1.0000 | 0.05730 | 0.09458 | 0.15658 | 0.43076 |
| 0.500 | 0.0625 | 0.00434 | 0.00655 | 0.01023 | 0.02649 |
| | 0.2500 | 0.01997 | 0.03252 | 0.05341 | 0.14576 |
| | 1.0000 | 0.08672 | 0.14348 | 0.23787 | 0.65528 |
| 1.000 | 0.0625 | 0.00608 | 0.00945 | 0.01505 | 0.03981 |
| | 0.2500 | 0.02987 | 0.04899 | 0.08079 | 0.22140 |
| | 1.0000 | 0.13151 | 0.21791 | 0.36162 | 0.99721 |

Table II is generated using the function $S(q, r, \phi)$, defined above.

TABLE III

Fidelity indices and relative file sizes corresponding to
12 candidate sets of encoding parameters - the
constraints are: $q \leq 0.6$, and a fidelity index $\geq 0.52$

| Encoding parameters $\{q, r, \phi\}$ | Fidelity index | Relative file size | Encoding parameters $\{q, r, \phi\}$ | Fidelity index | Relative file size |
|---|---|---|---|---|---|
| {0.1575, 1.0, 1.0} | 0.52877 | 0.13151 | {0.397, 1.0, 0.25} | 0.64445 | 0.15658 |
| {0.25, 1.0, 0.50} | 0.59979 | 0.14348 | {0.397, 0.25, 0.50} | 0.58792 | 0.05341 |
| {0.25, 0.25, 1.0} | 0.53553 | 0.04899 | {0.397, 1.0, 0.50} | 0.75453 | 0.23787 |
| {0.25, 1.0, 1.0} | 0.68729 | 0.21791 | {0.397, 0.25, 1.0} | 0.67370 | 0.08079 |
| {0.397, 1.0, 0.125} | 0.53437 | 0.10319 | {0.397, 1.0, 1.0} | 0.86461 | 0.36162 |

TABLE IV

Relative file sizes and Fidelity indices corresponding to 12 candidate
sets of encoding parameters - the constraints are: $q \leq 0.6$, $r \leq 0.5$,
$\phi \leq 0.4$, and a relative file size $\leq 0.10$

| Encoding parameters $\{q, r, \phi\}$ | Relative file size | Fidelity index | Encoding parameters $\{q, r, \phi\}$ | Relative file size | Fidelity index |
|---|---|---|---|---|---|
| {0.1575, .0625, .125} | 0.00244 | 0.13494 | {0.25, 0.0625, 0.25} | 0.00465 | 0.21152 |
| {0.1575, 0.25, 0.125} | 0.00918 | 0.25464 | {0.25, 0.25, 0.25} | 0.02171 | 0.39916 |
| {.1575, .0625, 0.25} | 0.00319 | 0.16273 | {0.397, .0625, 0.125} | 0.00498 | 0.22064 |
| {.1575, 0.25, 0.25} | 0.01346 | 0.30710 | {0.397, 0.25, 0.125} | 0.02361 | 0.41638 |
| {0.25, 0.0625, 0.125} | 0.00339 | 0.17539 | {0.397, .0625, 0.25} | 0.00706 | 0.26609 |
| {0.25, 0.25, 0.125} | 0.01460 | 0.33098 | {0.397, 0.25, 0.25} | 0.03542 | 0.50215 |

Figure 10:
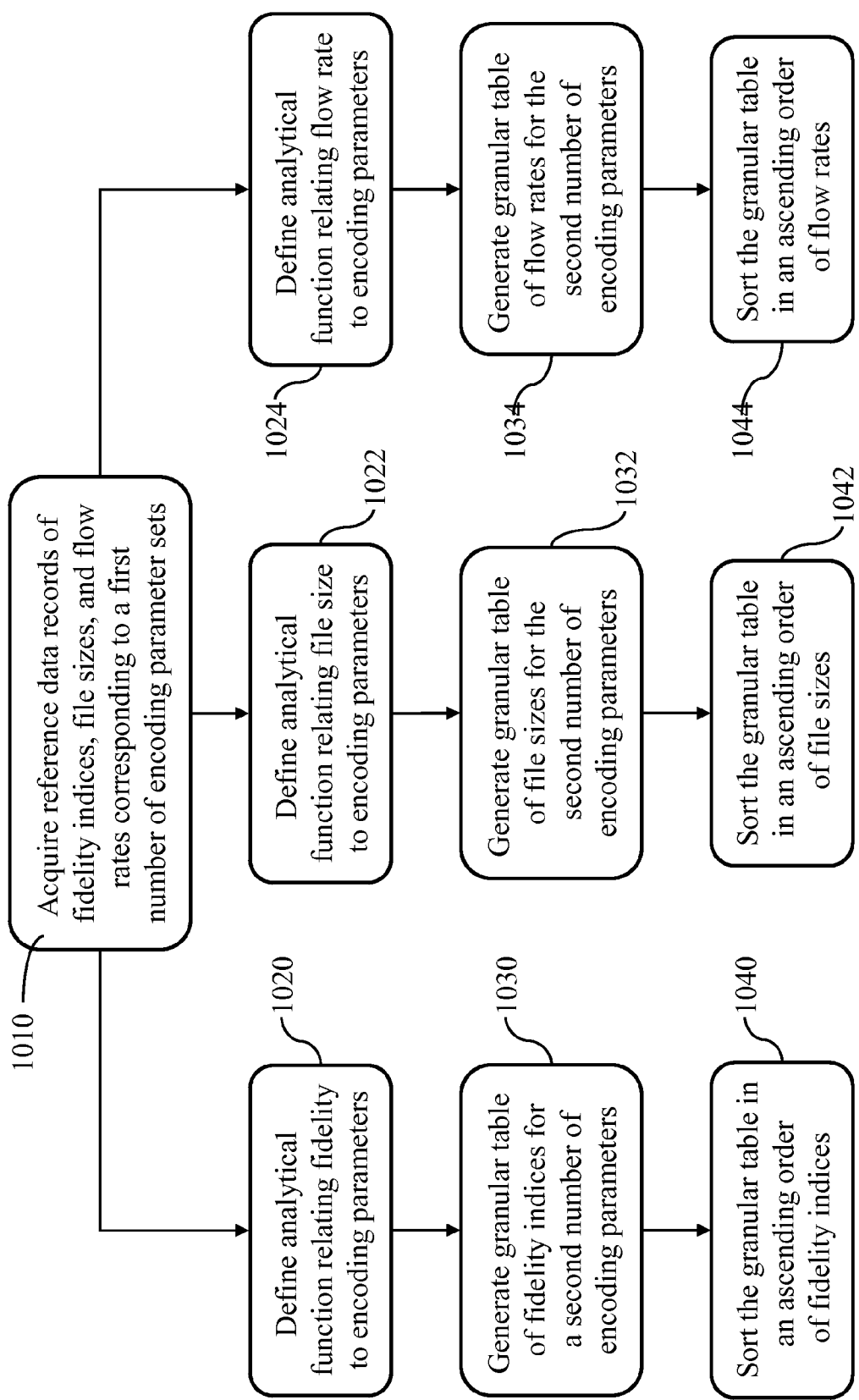
FIG. 10 illustrates generating granular tables of fidelity indices, files sizes, and flow rates for a predefined set of encoding parameters, for use in an embodiment of the present invention.

FIG. 10 illustrates generating sorted granular tables of relative fidelity indices, relative files sizes, and relative flow rates for a predefined set of encoding parameters.

To expedite the process of selecting encoding parameters to realize a specified property objective under constraints relevant to other properties, the content of the granular tables may be presented in data structures which facilitate fast search. Denoting the numbers of discrete values for the variables q, r, and φ, as $m_1$, $m_2$, and $m_3$, respectively, the number of M of reference sets of encoding parameters would be $M = m_1 \times m_2 \times m_3$. The M sets are preferably indexed as 0 to (M−1) and a reference data structure of M records, such as a 3×M matrix, may be used to indicate a fidelity index, a relative file size, and a relative flow rate for each of the M reference sets of encoding parameters.

The entries of the reference data structure corresponding to the fidelity indices may be sorted in an ascending order to produce a first data structure of M records, such as a 2×M matrix, with each record indicating an index of a set of encoding parameters and a corresponding fidelity index.

The entries of the reference data structure corresponding to the relative sizes of encoded signals may also be sorted in an ascending order to produce a second data structure of M records, such as a 2×M matrix, with each record indicating an index of a set of encoding parameters and a corresponding relative file size.

Likewise, the entries of the reference data structure corresponding to the relative flow rates may also be sorted in an ascending order to produce a second data structure of M records, such as a 2×M matrix, with each record indicating an index of a set of encoding parameters and a corresponding relative flow rate.

The process of FIG. 10 starts with acquiring reference data records (step 1010) of fidelity indices, relative file sizes, and relative flow rates for a number of sets of encoding parameters. The reference data records may be acquired from a data base which may be collocated with an encoding or transcoding apparatus or accessible through a communications path.

In step 1020, a first analytical function relating a fidelity index to a set of encoding parameters is devised. The parameters may be determined according to a predictive regression procedure as described above with reference to FIG. 6. In step 1030, a granular first table of fidelity indices corresponding to the M reference sets of encoding parameters is generated using the first analytical function. The number M is preferably much larger than the number of reference data records in order to realize fidelity indices of decoded signals close to envisaged optimum objectives. The M generated fidelity indices are sorted (step 1040) in either an ascending order or descending order to produce sorted records each indicating a fidelity index and a corresponding index of a set of encoding parameters.

In step 1022, a second analytical function relating a normalized file size to a set of encoding parameters is devised. The parameters may be determined according to a predictive regression procedure as described above with reference to FIG. 6. In step 1032, a granular second table of normalized file sizes corresponding to the M reference sets of encoding parameters is generated using the second analytical function. The number M is preferably much larger than the number of reference data records in order to realize file sizes of decoded signals close to envisaged optimum objectives. The M generated fidelity indices are sorted (step 1042) in either an ascending order or descending order to produce sorted records each indicating a normalized file size and a corresponding index of a set of encoding parameters.

In step 1024, a third analytical function relating a normalized flow rate to a set of encoding parameters is devised. The parameters may be determined according to a predictive regression procedure as described above with reference to FIG. 6. In step 1034, a granular third table of normalized file sizes corresponding to the M reference sets of encoding parameters is generated using the third analytical function. The number M is preferably much larger than the number of reference data records in order to realize flow rates of decoded signals close to envisaged optimum objectives. The M generated fidelity indices are sorted (step 1044) in either an ascending order or descending order to produce sorted records each indicating a normalized flow rate and a corresponding index of a set of encoding parameters.

Figure 11:
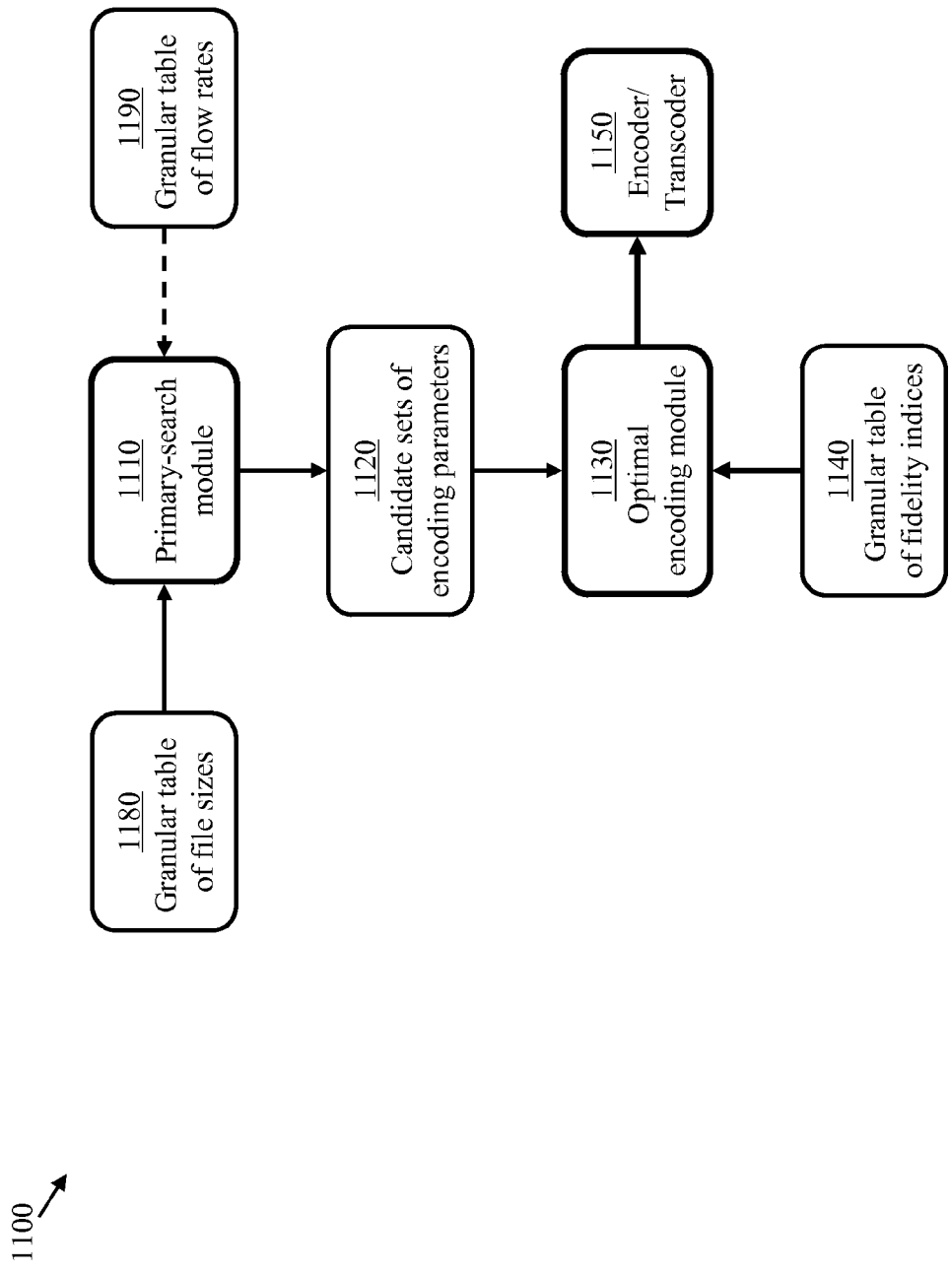
FIG. 11 illustrates a process of determining a set of encoding parameters yielding a maximum fidelity index constrained by an upper bound of encoded-signal size and/or an upper bound of flow rate of an encoded signal, in accordance with an embodiment of the present invention.

FIG. 11 illustrates a process of determining a set of encoding parameters yielding a maximum fidelity index constrained by an upper bound of encoded-signal size and/or an upper bound of flow rate of an encoded signal. The process is implemented in apparatus 500 where the processor-executable instructions stored in memory device 560 are structured in modules which include a primary-search module 1110 relying on a granular table 1180 of file sizes and/or a granular table 1190 of flow rates. Granular table 1180 represents the table produced in step 1032 or the sorted table produced in step 1042. Granular table 1190 represents the table produced in step 1034 or the sorted table produced in step 1044. The primary-search module causes processor 570 to perform either or both of two processes of:
  (i) searching the granular table 1180 of file sizes to identify a first group of candidate sets of encoding parameters corresponding to a requisite upper bound of file sizes; and
  (ii) searching the granular table 1190 to identify a second group of candidate sets of encoding parameters corresponding to a requisite upper bound of flow rates.

If both the upper bound of file sizes and upper bound of flow rates are to be observed, then group 1120 of candidate set of encoding parameters to be considered is the intersection of the first group and the second group. If only the upper bound of file sizes is to be observed, then group 1120 of candidate set of encoding parameters to be considered is the first group. If only the upper bound of flow rates is to be observed, then group 1120 of candidate set of encoding parameters to be considered is the second group.

The processor-executable instructions stored in memory device 560 include an optimal encoding module 1130 which accesses a granular table 1140 of fidelity indices to determine a fidelity index corresponding to each candidate set of encoding parameters. Granular table 1140 lists fidelity indices corresponding to indices of sets of encoding parameters and is produced in step 1030. The set of encoding parameters yielding the highest fidelity index is considered the preferred set and is submitted to an encoder or transcoder 1150.

Figure 12:
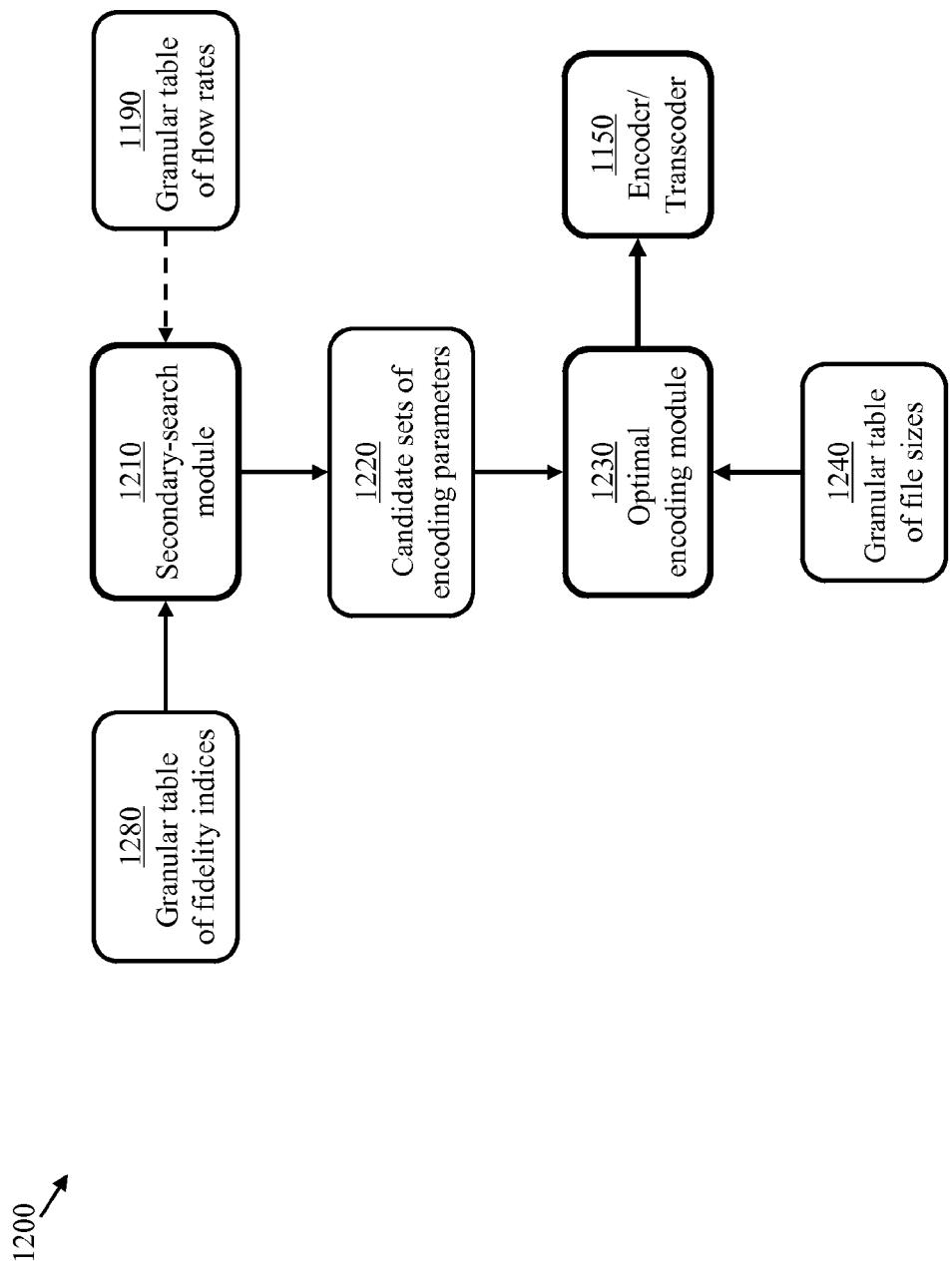
FIG. 12 illustrates a process of determining a set of encoding parameters yielding a minimum file size constrained by a lower bound of encoded-signal fidelity index and/or an upper bound of flow rate of an encoded signal, in accordance with an embodiment of the present invention.

FIG. 12 illustrates a process of determining a set of encoding parameters yielding a minimum file size constrained by a lower bound of encoded-signal fidelity index and/or an upper bound of flow rate of an encoded signal. The process is implemented in apparatus 500 where the processor-executable instructions stored in memory device 560 are structured in modules which include a secondary-search module 1210 relying on a granular table 1280 of fidelity indices and/or a granular table 1190 of flow rates. Granular table 1280 represents the table produced in step 1030 or the sorted table produced in step 1040. Granular table 1190 represents the table produced in step 1034 or the sorted table produced in step 1044. The secondary-search module causes processor 570 to perform either or both of two processes of:
  (iii) searching the granular table 1280 of fidelity indices to identify a third group of candidate sets of encoding parameters corresponding to a requisite lower bound of fidelity indices; and
  (iv) searching the granular table 1190 to identify a fourth group of candidate sets of encoding parameters corresponding to a requisite upper bound of flow rates.

If both the lower bound of fidelity indices and upper bound of flow rates are to be observed, then group 1220 of candidate set of encoding parameters to be considered is the intersection of the third group and the fourth group. If only the lower bound of fidelity indices is to be observed, then group 1220 of candidate set of encoding parameters to be considered is the third group. If only the upper bound of flow rates is to be observed, then group 1120 of candidate set of encoding parameters to be considered is the fourth group.

The processor-executable instructions stored in memory device 560 include an optimal encoding module 1230 which accesses a granular table 1240 of normalized file sizes to determine a file size corresponding to each candidate set of encoding parameters. Granular table 1240 lists normalized file sizes corresponding to indices of sets of encoding parameters and is produced in step 1032. The set of encoding parameters yielding the lowest file size is considered the preferred set and is submitted to an encoder or transcoder 1150.

Figure 13:
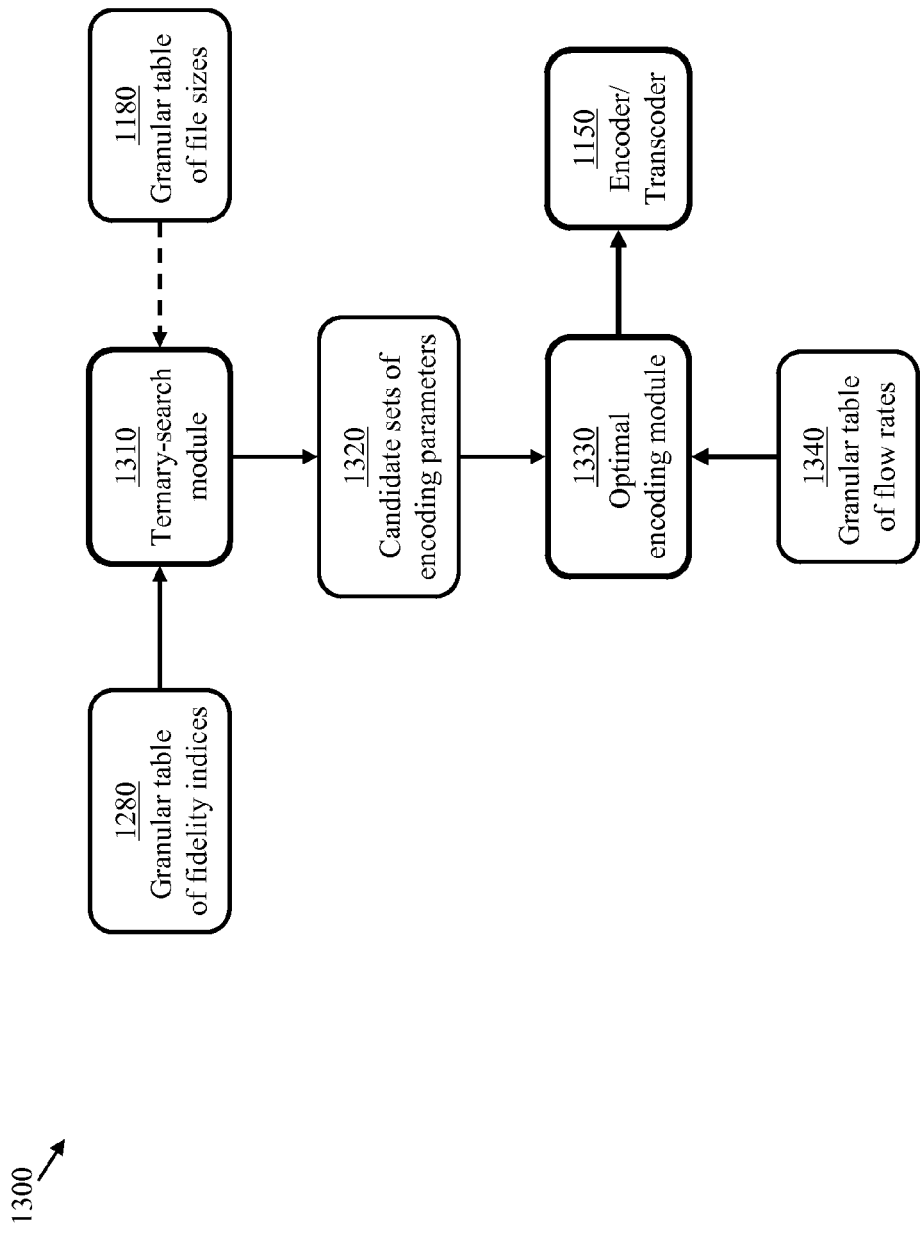
FIG. 13 illustrates a process of determining a set of encoding parameters yielding a minimum flow rate constrained by a lower bound of encoded-signal fidelity index and/or an upper bound of size of an encoded signal, in accordance with an embodiment of the present invention.

FIG. 13 illustrates a process of determining a set of encoding parameters yielding a minimum flow rate constrained by a lower bound of encoded-signal fidelity index and/or an upper bound of size of an encoded signal. The process is implemented in apparatus 500 where the processor-executable instructions stored in memory device 560 are structured in modules which include a ternary-search module 1310 relying on a granular table 1280 of file sizes and/or a granular table 1180 of file sizes. Granular table 1280 represents the table produced in step 1030 or the sorted table produced in step 1040. Granular table 1180 represents the table produced in step 1032 or the sorted table produced in step 1034. The ternary-search module causes processor 570 to perform either or both of two processes of:
  (v) searching the granular table 1280 of fidelity indices to identify a fifth group of candidate sets of encoding parameters corresponding to a requisite lower bound of fidelity indices; and
  (vi) searching the granular table 1180 to identify a sixth group of candidate sets of encoding parameters corresponding to a requisite upper bound of file sizes.

If both the lower bound of fidelity and upper bound of file sizes are to be observed, then group 1320 of candidate set of encoding parameters to be considered is the intersection of the fifth group and the sixth group. If only the lower bound of fidelity indices is to be observed, then group 1320 of candidate set of encoding parameters to be considered is the fifth group. If only the upper bound of file sizes is to be observed, then group 1320 of candidate set of encoding parameters to be considered is the sixth group.

The processor-executable instructions stored in memory device 560 include an optimal encoding module 1330 which accesses a granular table 1340 of flow rates to determine a flow corresponding to each candidate set of encoding parameters. Granular table 1340 lists normalized flow rates corresponding to indices of sets of encoding parameters and is produced in step 1034. The set of encoding parameters yielding the highest fidelity index is considered the preferred set and is submitted to an encoder or transcoder 1150.

Figure 14:
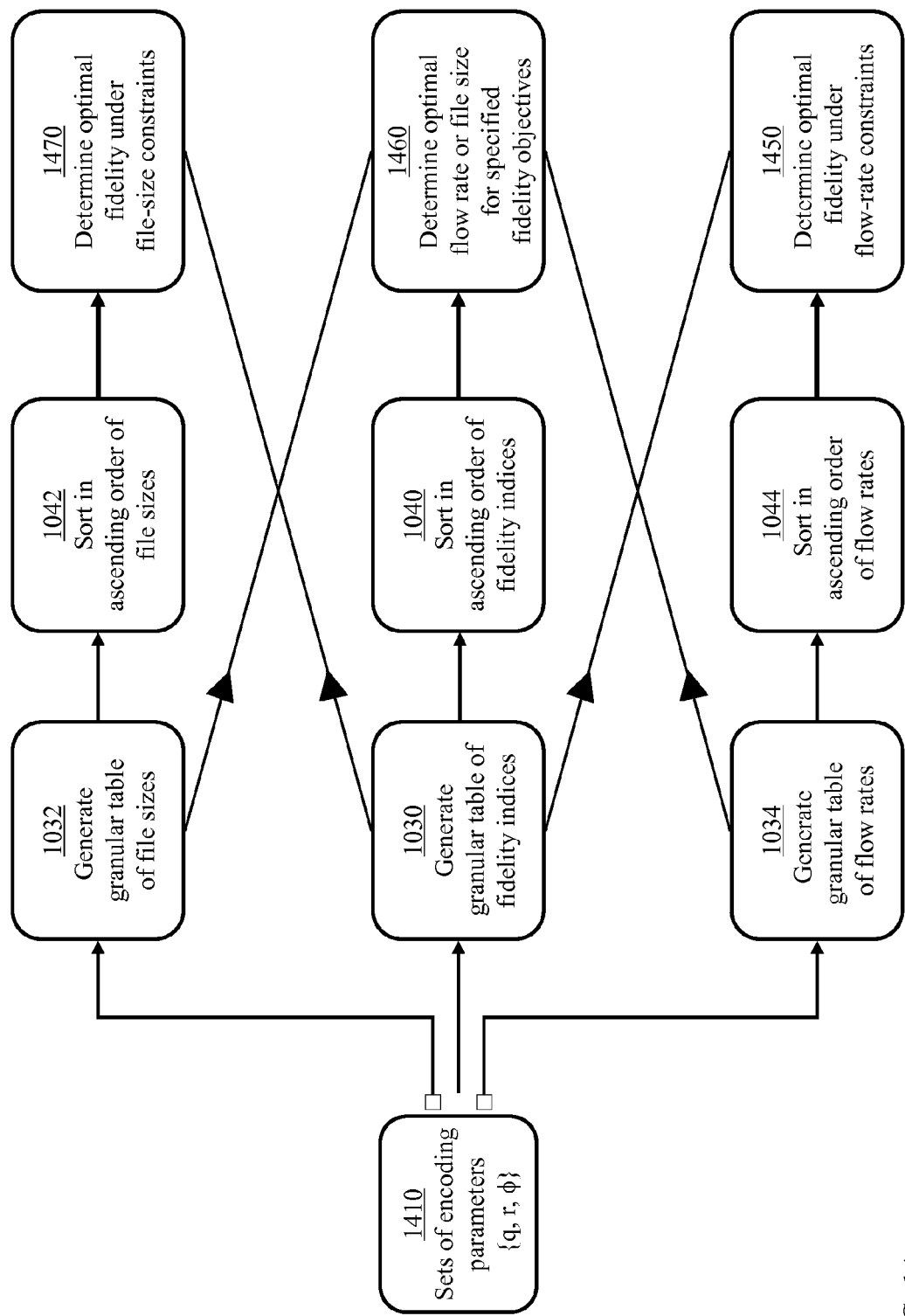
FIG. 14 illustrates schemes for determining encoding parameters for different objectives under corresponding constraints, in accordance with an embodiment of the present invention.

FIG. 14 illustrates processes for determining encoding parameters for different objectives under corresponding constraints as described above with reference to FIG. 11, FIG. 12, and FIG. 13. The set of M sets of encoding parameters {q, r, ϕ} is generated (step 1410) in the pre-processing apparatus 300 as described with reference to FIG. 10. Process 1030 of generating a granular table of fidelity indices for the M sets of encoding parameters has been described above with reference to FIG. 10. Processes 1032 of generating a granular table of file sizes, and 1034 of generating a granular table of flow rates for the M sets of encoding parameters have been described above with reference to FIG. 10. Processes 1040, 1042, and 1044 of sorting respective granular tables have been described above.

Process 1450 uses the sorted granular table of indices of sets of encoding parameters corresponding to normalized flow rates (determined in process 1044) to determine candidate sets of encoding parameters. Each candidate set need be compatible with characteristics of a target receiving node 160 and yielding an encoded signal of a flow rate not exceeding a specified upper bound. Process 1450 further uses the granular table of fidelity indices corresponding to indices of sets of encoding parameters (determined in process 1030) to identify a preferred set of encoding parameters yielding an encoded signal of highest fidelity index.

Process 1460 uses the sorted granular table of indices of sets of encoding parameters corresponding to fidelity indices (determined in process 1040) to determine candidate sets of encoding parameters. Each candidate set need be compatible with characteristics of a target receiving node 160 and yielding an encoded signal of a fidelity index at least equal to a specified lower bound. Process 1460 further uses the granular table of normalized file sizes corresponding to indices of sets of encoding parameters (determined in process 1032) to identify a preferred set of encoding parameters yielding an encoded signal of least file size. Process 1460 may also use the granular table of normalized flow rates corresponding to indices of sets of encoding parameters (determined in process 1034) to identify a preferred set of encoding parameters yielding an encoded signal of least flow rate.

Process 1470 uses the sorted granular table of indices of sets of encoding parameters corresponding to normalized file sizes (determined in process 1042) to determine candidate sets of encoding parameters. Each candidate set need be compatible with characteristics of a target receiving node 160 and yielding an encoded signal of a normalized file size not exceeding a specified upper bound. Process 1470 further uses the granular table of fidelity indices corresponding to indices of sets of encoding parameters (determined in process 1030) to identify a preferred set of encoding parameters yielding an encoded signal of highest fidelity index.

Figure 15:
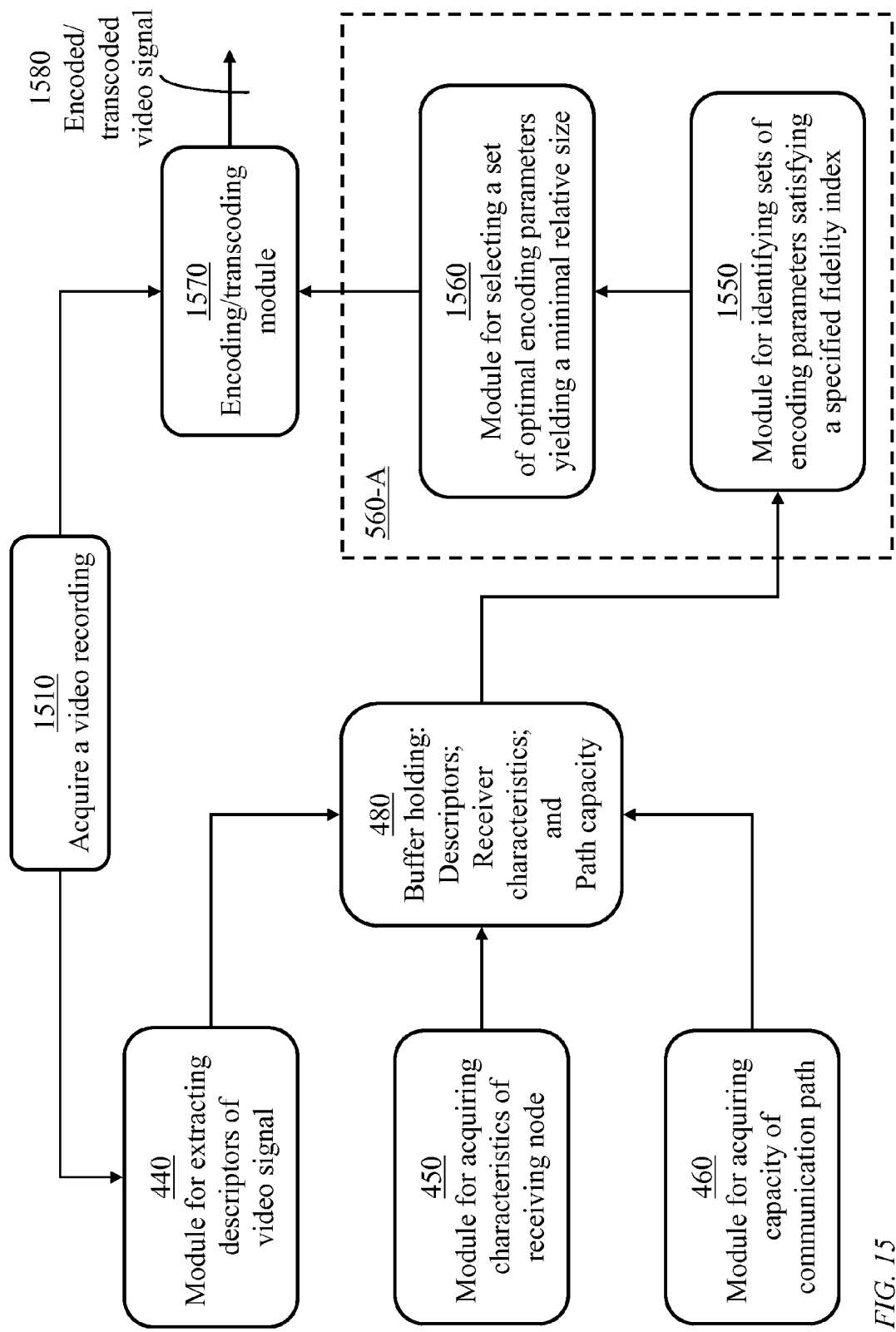
FIG. 15 illustrates a method of determining encoding parameters yielding a minimal file size at a specified minimum fidelity index, in accordance with an embodiment of the present invention.

FIG. 15 presents the main processes described above of determining encoding parameters yielding a minimal file size at a specified lower bound of the fidelity index. In process 1510, a video signal is acquired through a network interface of an encoder or a transcoder. The video signal is supplied to the encoder or transcoder and to the apparatus 400 of FIG. 4 which has memory devices storing processor-executable instructions organized into a module 440 for extracting or acquiring descriptors of the video signal, a module 450 for acquiring characteristics of a target receiving node 160, and a module 460 for determining or acquiring an estimate of the capacity (in bits-per-second, for example) of a path from the encoder or transcoder to the target receiving node 160. The outputs of apparatus 400, held in a buffer 480, together with the outputs of apparatus 300, are supplied to apparatus 500 to be processed using processor-executable instructions, stored in memory device 560, identified as 560-A, which may be structured as a module 1550 for identifying candidate sets of encoding parameters each corresponding to a fidelity index not less than a specified lower bound and a module 1560 for selecting a candidate set of encoding parameters compatible with characteristics of the target receiving node 160 and having the minimum attainable relative file size.

Figure 16:
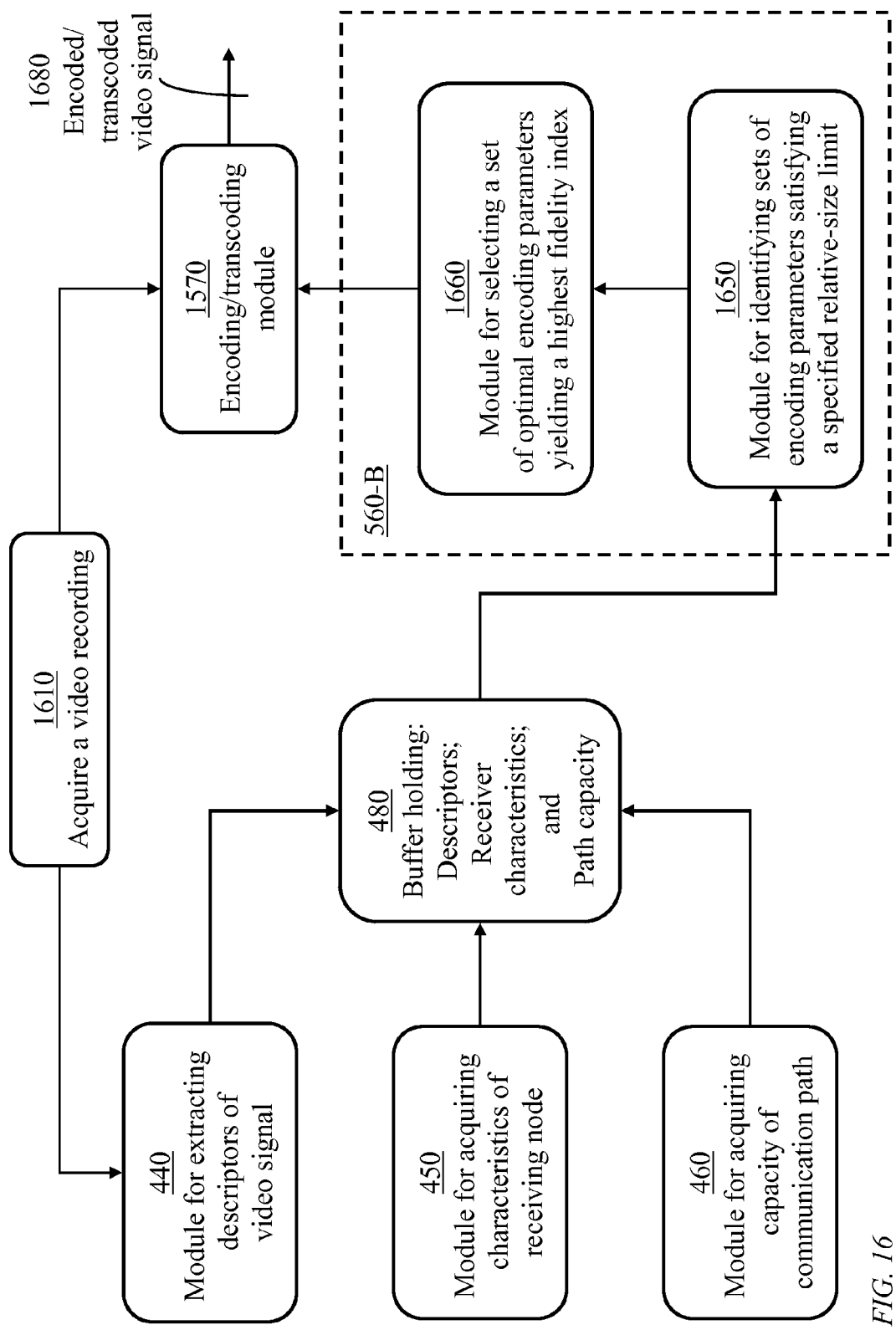
FIG. 16 illustrates a method of determining encoding parameters yielding a highest fidelity index at a specified maximum file size, in accordance with an embodiment of the present invention.

FIG. 16 presents the main processes described above of determining encoding parameters yielding highest fidelity index at a specified upper bound of file size. In process 1610, a video signal is acquired through a network interface of an encoder or a transcoder. The video signal is supplied to the encoder or transcoder and to the apparatus 400 of FIG. 4 as described above with reference to FIG. 15. The outputs of apparatus 400, held in a buffer 480, together with the outputs of apparatus 300, are supplied to apparatus 500 to be processed using processor-executable instructions, stored in memory device 560, identified as 560-B, which may be structured as a module 1650 for identifying candidate sets of encoding parameters each corresponding to a relative file size not exceeding a specified upper bound and a module 1660 for selecting a candidate set of encoding parameters compatible with characteristics of the target receiving node 160 and having the maximum attainable fidelity index.

Figure 17:
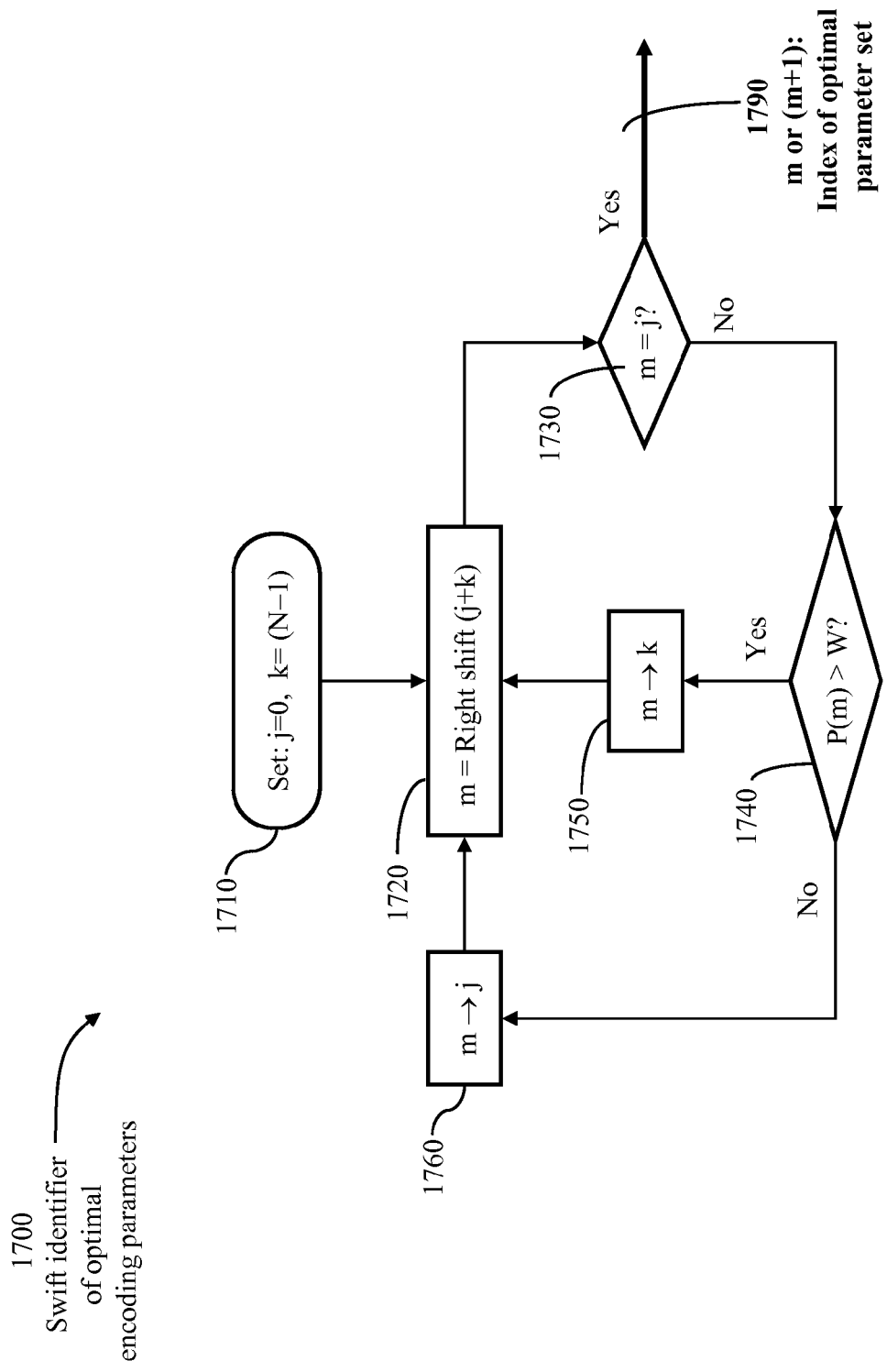
FIG. 17 illustrates a bisection process for locating optimal encoding parameters within data structures generated by the pre-processing apparatus of FIG. 3.

FIG. 17 illustrates a conventional bisection process for locating optimal encoding parameters using data structures generated by the pre-processing apparatus of FIG. 3. Consider an array P having N entries sorted in ascending order, N>1. To determine the index of P corresponding to the nearest value greater than or equal to a number W, the process illustrated in FIG. 17 is implemented to yield an index m of an entry P(m) which is less than or equal to W. If array P stores fidelity indices sorted in an ascending order, with an associated array indicating corresponding indices of the sets of encoding parameters (table 2050 of FIG. 30), then P(m)≤W, and P(m+1)>W. A similar process may be used if the entries of array P is sorted in a descending order and it is desired to determine the index of P corresponding to the nearest value less than or equal to a number W. the number of steps is limited to $\lceil \log_2 N \rceil$.

FIGS. 18 to 21 present exemplary schemes of encoding a received signal to produce an encoded signal having optimal quantified properties under a variety of constraints.

Figure 18:
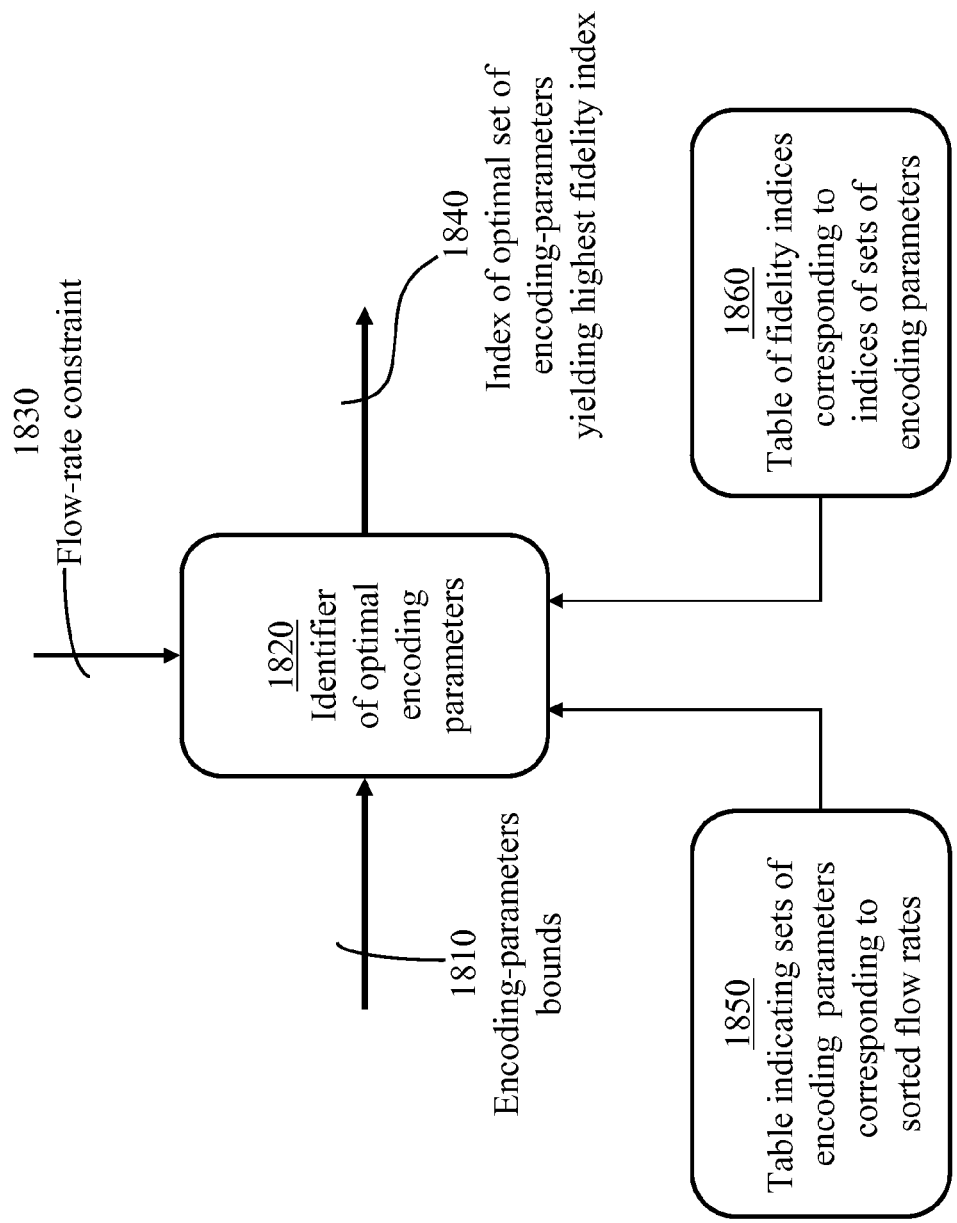
FIG. 18 illustrates a first objective of encoding a received signal to produce an encoded signal having a highest fidelity index at a specified maximum flow rate, in accordance with an embodiment of the present invention.

FIG. 18 illustrates a first scheme of encoding a received signal to produce an encoded signal having a highest fidelity index constrained by an upper bound of flow rate of the encoded signal. A module 1820, devised as processor-executable instructions stored—for example—in memory device 560 of FIG. 5, causes a processor to use content of a table 1850 of indices of encoding parameters corresponding to sorted flow rates and content of a table 1860 of fidelity indices corresponding to sets of encoding parameters to determine an optimal set of encoding parameters {q, r, φ}, defined above, yielding the highest attainable fidelity index under constraints 1810 relevant to encoding parameters and constraint 1830 of an upper bound of flow rates.

Figure 19:
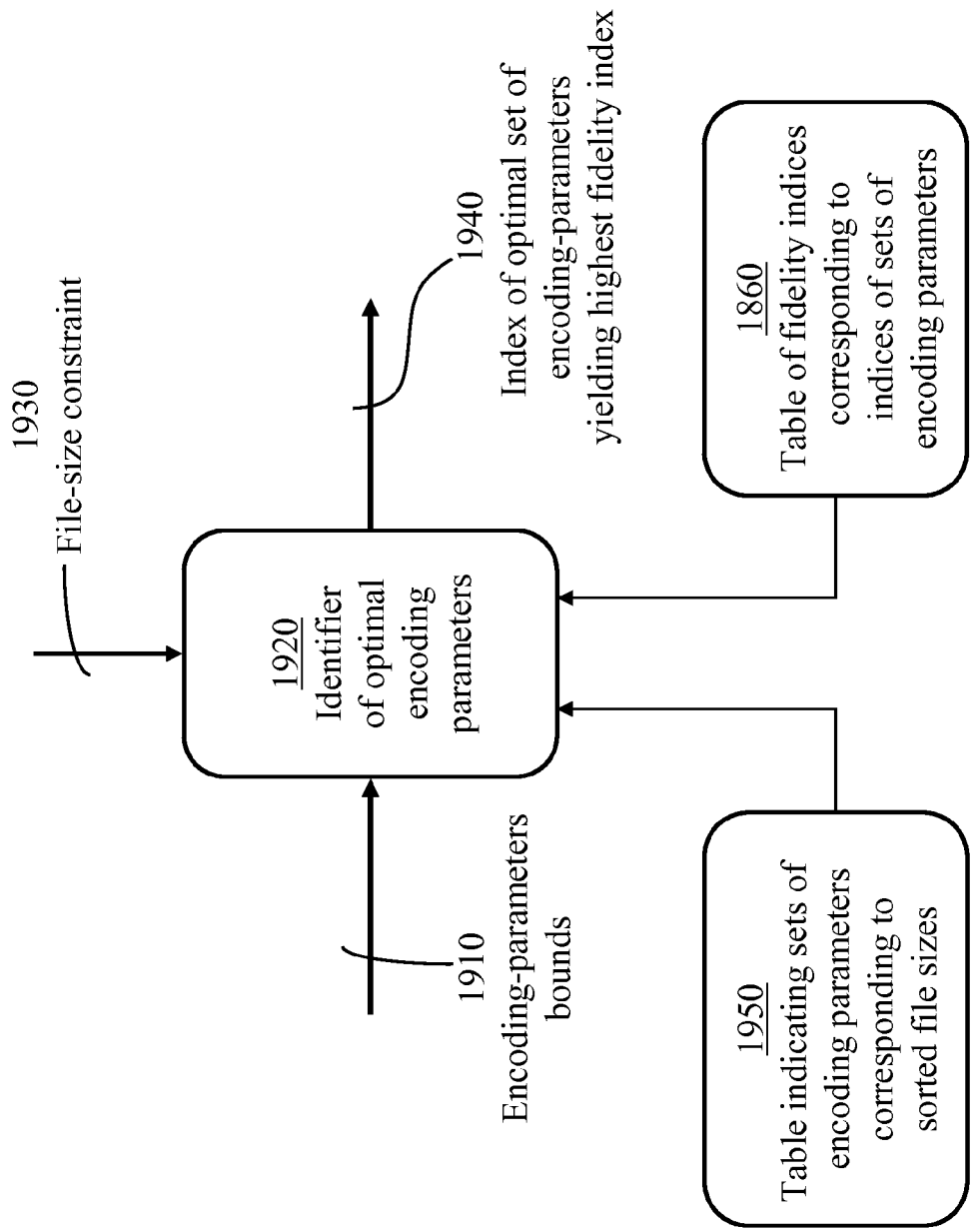
FIG. 19 illustrates a second objective of encoding a received signal to produce an encoded signal having a highest fidelity index at a specified maximum file size, in accordance with an embodiment of the present invention.

FIG. 19 illustrates a second scheme of encoding a received signal to produce an encoded signal having a highest fidelity index constrained by an upper bound of file size of the encoded signal. A module 1920, devised as processor-executable instructions stored—for example—in memory device 560 of FIG. 5, causes a processor to use content of a table 1950 of indices of encoding parameters corresponding to sorted file sizes and content of table 1860 of fidelity indices corresponding to sets of encoding parameters to determine an optimal set of encoding parameters {q, r, φ}, defined above, yielding the highest attainable fidelity index under constraints 1910 relevant to encoding parameters and constraint 1930 of an upper bound of file sizes.

Figure 20:
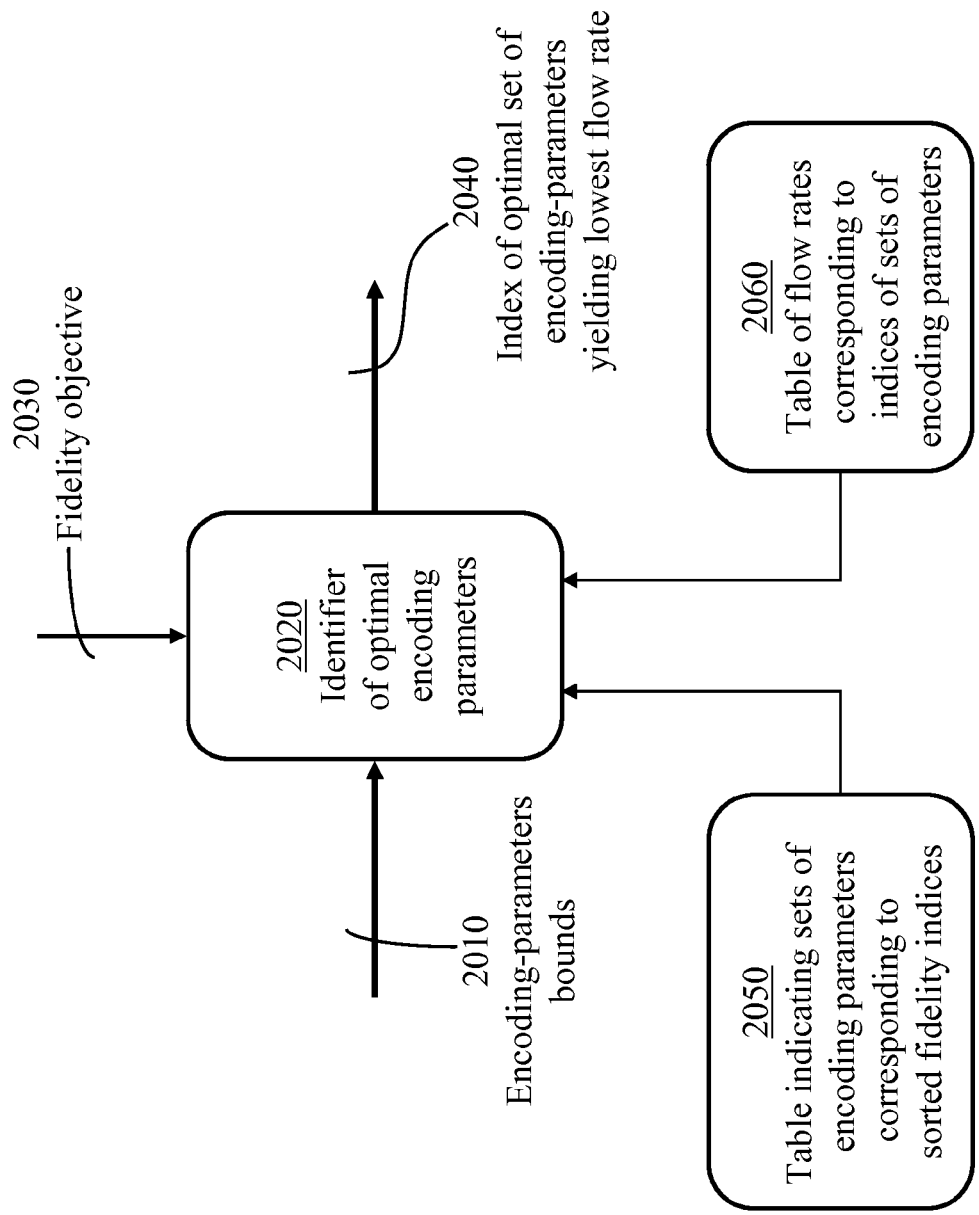
FIG. 20 illustrates a third objective of encoding a received signal to produce an encoded signal having a minimal flow rate at a specified minimum fidelity index, in accordance with an embodiment of the present invention.

FIG. 20 illustrates a third scheme of encoding a received signal to produce an encoded signal having a minimal flow rate constrained by a lower bound of fidelity index of the encoded signal. A module 2020, devised as processor-executable instructions stored—for example—in memory device 560 of FIG. 5, causes a processor to use content of a table 2050 of indices of encoding parameters corresponding to sorted fidelity indices and content of a table 2060 of flow rates corresponding to sets of encoding parameters to determine an optimal set of encoding parameters {q, r, ϕ}, defined above, yielding the least realizable flow rate under constraints 2010 relevant to encoding parameters and constraint 2030 of a lower bound of the fidelity index of the encoded signal.

Figure 21:
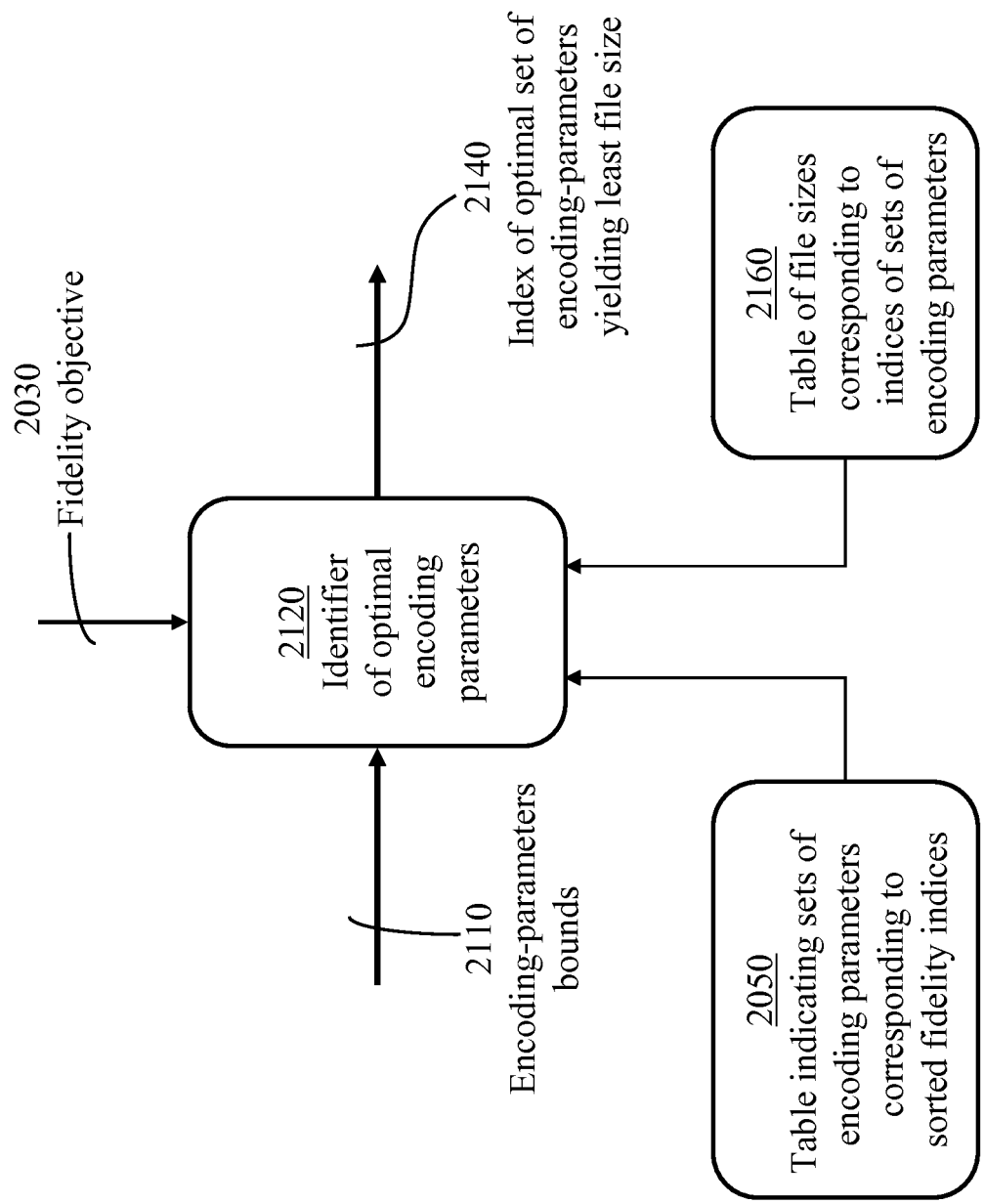
FIG. 21 illustrates a fourth objective of encoding a received signal to produce an encoded signal having a minimal file size at a specified minimum fidelity index, in accordance with an embodiment of the present invention.

FIG. 21 illustrates a fourth scheme of encoding a received signal to produce an encoded signal having a minimal file size constrained by a lower bound of fidelity index of the encoded signal. A module 2120, devised as processor-executable instructions stored—for example—in memory device 560 of FIG. 5, causes a processor to use content of table 2050 of indices of encoding parameters corresponding to sorted fidelity indices and content of a table 2160 of file sizes corresponding to sets of encoding parameters to determine an optimal set of encoding parameters {q, r, ϕ}, defined above, yielding the least realizable file size under constraints 2110 relevant to encoding parameters and constraint 2030 of a lower bound of the fidelity index of the encoded signal.

Figure 22:
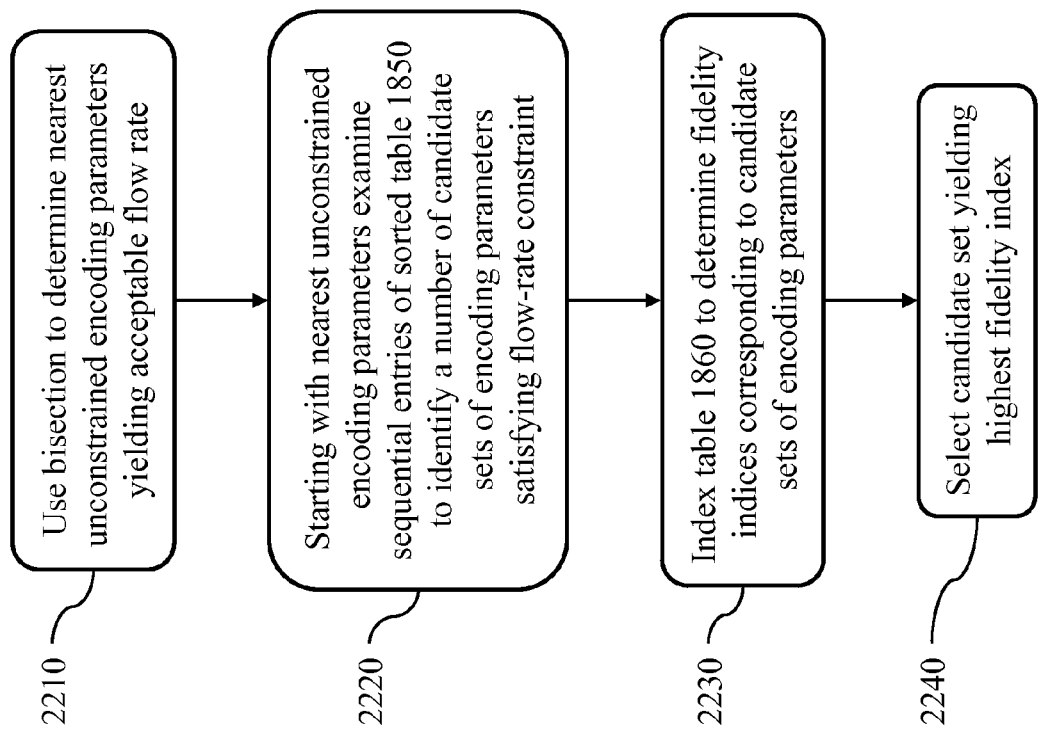
FIG. 22 illustrates a method of determining a set of encoding parameters for encoding a specific signal to yield an encoded signal having a flow rate not exceeding a specified limit with a highest fidelity of the encoded signal while observing limitations of a receiving node, in accordance with an embodiment of the present invention.

FIG. 22 illustrates details of a method of determining a set of encoding parameters for encoding a specific signal to yield an encoded signal of the highest attainable fidelity index and having a flow rate not exceeding a specified limit while observing limitations of a target receiving node 160. Using sorted table 1850 (FIG. 18), bisection search may be performed to determine the nearest set of encoding parameters yielding a flow rate not exceeding a maximum value (process 2210). Staring with the nearest set of encoding parameters, indices of candidate sets of encoding parameters corresponding to sequential values of flow rates satisfying the flow rate constraint are identified (process 2220). Table 1860 (FIG. 18) is then indexed to determine fidelity indices corresponding to the candidate sets of encoding parameters (process 2230). The candidate set of encoding parameters yielding the highest attainable fidelity index is selected as a preferred set (process 2240).

Figure 23:
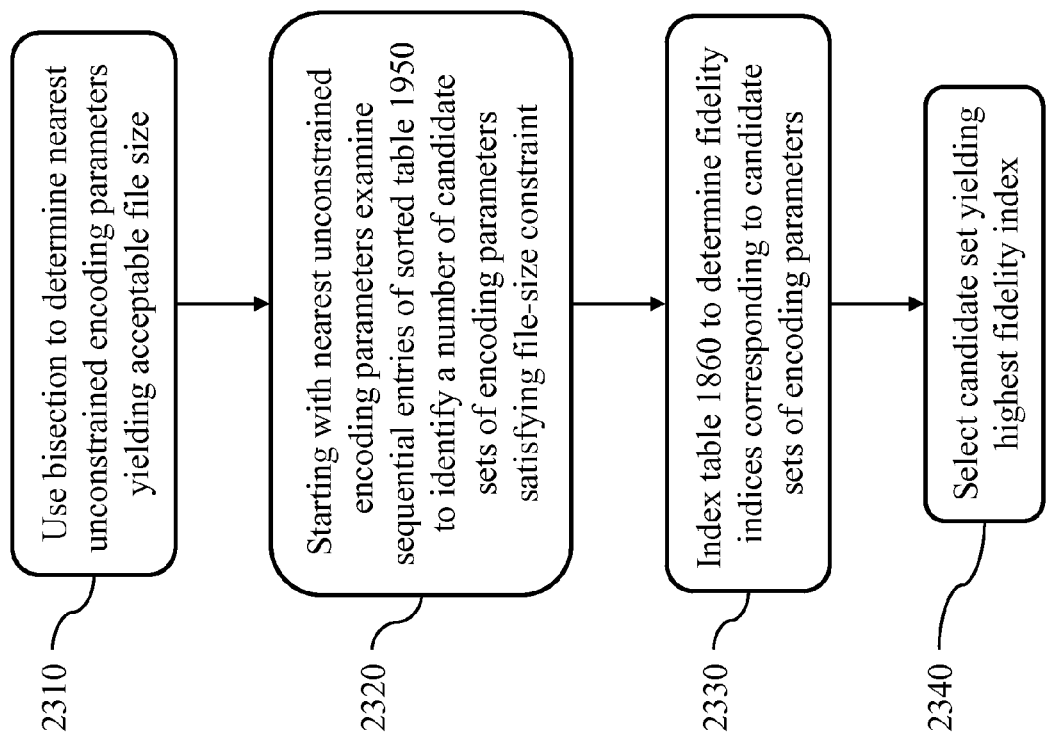
FIG. 23 illustrates a method of determining a set of encoding parameters for encoding a specific signal to yield an encoded signal having a file size not exceeding a specified limit with a highest fidelity of the encoded signal while observing limitations of a receiving node, in accordance with an embodiment of the present invention.

FIG. 23 illustrates details of a method of determining a set of encoding parameters for encoding a specific signal to yield an encoded signal of the highest attainable fidelity index and having a file size not exceeding a specified limit while observing limitations of a target receiving node 160. Using sorted table 1950 (FIG. 19), bisection search may be performed to determine the nearest set of encoding parameters yielding a file size not exceeding a maximum value (process 2310). Staring with the nearest set of encoding parameters, indices of candidate sets of encoding parameters corresponding to sequential values of file sizes satisfying the file-size constraint are identified (process 2320). Table 1860 (FIG. 19) is then indexed to determine fidelity indices corresponding to the candidate sets of encoding parameters (process 2330). The candidate set of encoding parameters yielding the highest attainable fidelity index is selected as a preferred set (process 2340).

Figure 24:
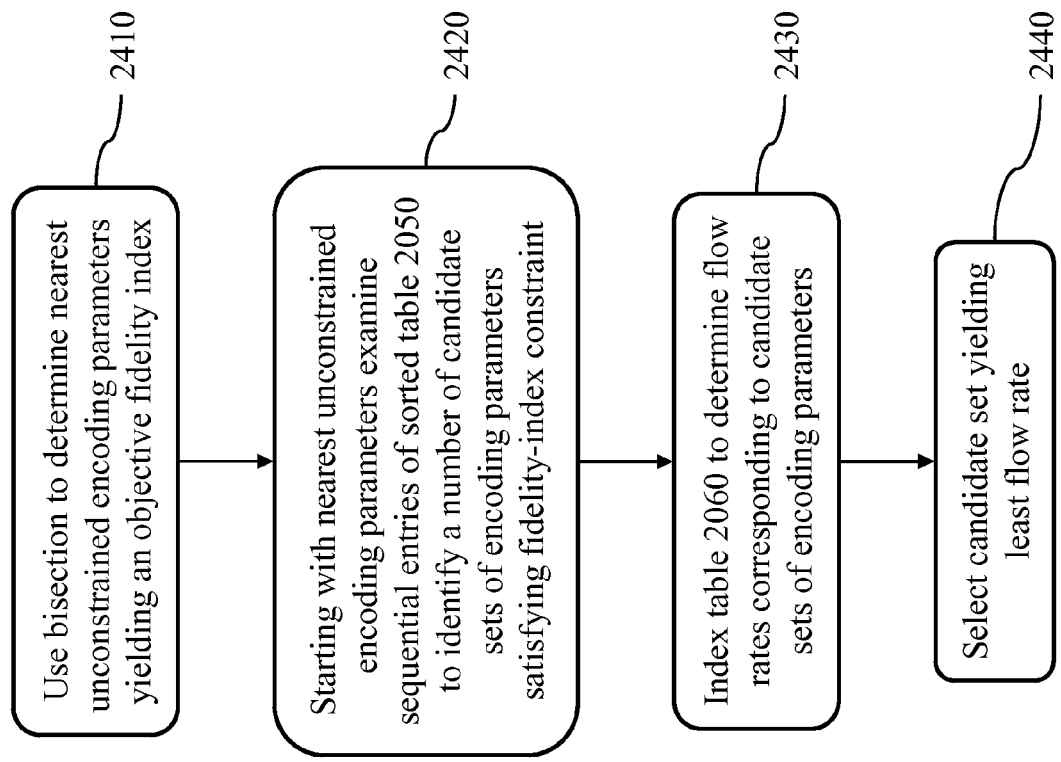
FIG. 24 illustrates a method of determining a set of encoding parameters for encoding a specific signal to yield an encoded signal having a fidelity index of a specified lower bound with a minimum flow rate of the encoded signal while observing limitations of a receiving node, in accordance with an embodiment of the present invention.

FIG. 24 illustrates details of a method of determining a set of encoding parameters for encoding a specific signal to yield an encoded signal of the least flow rate and having a fidelity index at least equal to a specified lower bound while observing limitations of a target receiving node 160. Using sorted table 2050 (FIG. 20), bisection search may be performed to determine the nearest set of encoding parameters yielding a fidelity index at least equal to a specified lower bound (process 2410). Staring with the nearest set of encoding parameters, indices of candidate sets of encoding parameters corresponding to sequential values of fidelity indices satisfying the fidelity-index constraint are identified (process 2420). Table 2060 (FIG. 20) is then indexed to determine flow rates corresponding to the candidate sets of encoding parameters (process 2430). The candidate set of encoding parameters yielding the least flow rate is selected as a preferred set (process 2440).

Figure 25:
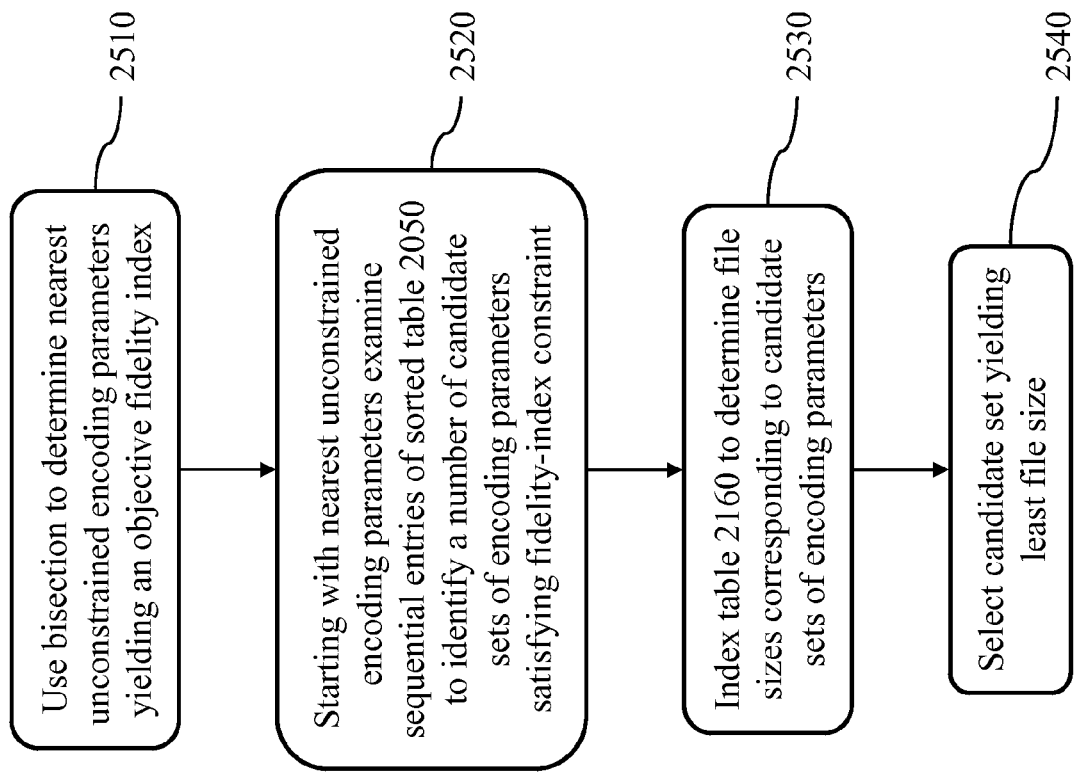
FIG. 25 illustrates a method of determining a set of encoding parameters for encoding a specific signal to yield an encoded signal having a fidelity index of a specified lower bound with a minimum size of the encoded signal while observing limitations of a receiving node, in accordance with an embodiment of the present invention.

FIG. 25 illustrates details of a method of determining a set of encoding parameters for encoding a specific signal to yield an encoded signal of the least file size and having a fidelity index at least equal to a specified lower bound while observing limitations of a target receiving node 160. Using sorted table 2150 (FIG. 21), bisection search may be performed to determine the nearest set of encoding parameters yielding a fidelity index at least equal to a specified lower bound (process 2510). Staring with the nearest set of encoding parameters, indices of candidate sets of encoding parameters corresponding to sequential values of fidelity indices satisfying the fidelity-index constraint are identified (process 2520). Table 2160 (FIG. 21) is then indexed to determine file sizes corresponding to the candidate sets of encoding parameters (process 2530). The candidate set of encoding parameters yielding the least flow rate is selected as a preferred set (process 2540) to be supplied to an encoder or transcoder.

FIG. 26 illustrates exemplary sets of encoding parameters {q, r, ϕ} for which fidelity indices and normalized file sizes are determined using analytical functions derived from a number of reference data records acquired from a database. As defined earlier, the encoding parameters are normalized with q being a ratio of a minimum quantization step to a candidate quantization step, r being a ratio of a candidate display resolution to a maximum display resolution, and ϕ being a ratio of a candidate frame rate to a maximum frame rate.

The sets of encoding parameters of FIG. 26 correspond to only two values of q, three values of r, and 3 values of ϕ to a total number, M, of 18. It is an objective, however, that the granular tables cover a large number of encoding parameters in order to enable determining encoding parameters yielding near-optimal properties of encoded signals. For example, 64 discrete values of each of q, r, and ϕ may be used resulting in a number, M, of sets of encoding parameters of 262144.

The fidelity indices are determined from a first analytical function:

$$\Gamma(q,r,\phi)=(1+e^{(\alpha-\beta\times q)})^{-1}\times(1+e^{(\gamma-\delta\times r)})^{-1}\times(\eta\times\ln(\phi)+1);$$

The constants α, β, γ, δ, and η are determined from the reference data records according to a regression-analysis process.

The fidelity indices are determined from a second analytical function:

$$S(q,r,\phi)=1-\Omega+\Omega\times\lambda\times q^{\theta}\times(1+e^{(\sigma-\epsilon\times r)})^{-1}\times\phi^{\omega}.$$

The constants Ω, λ, θ, σ, ϵ, and ω are determined from the reference data records according to a regression-analysis process.

Figure 27:
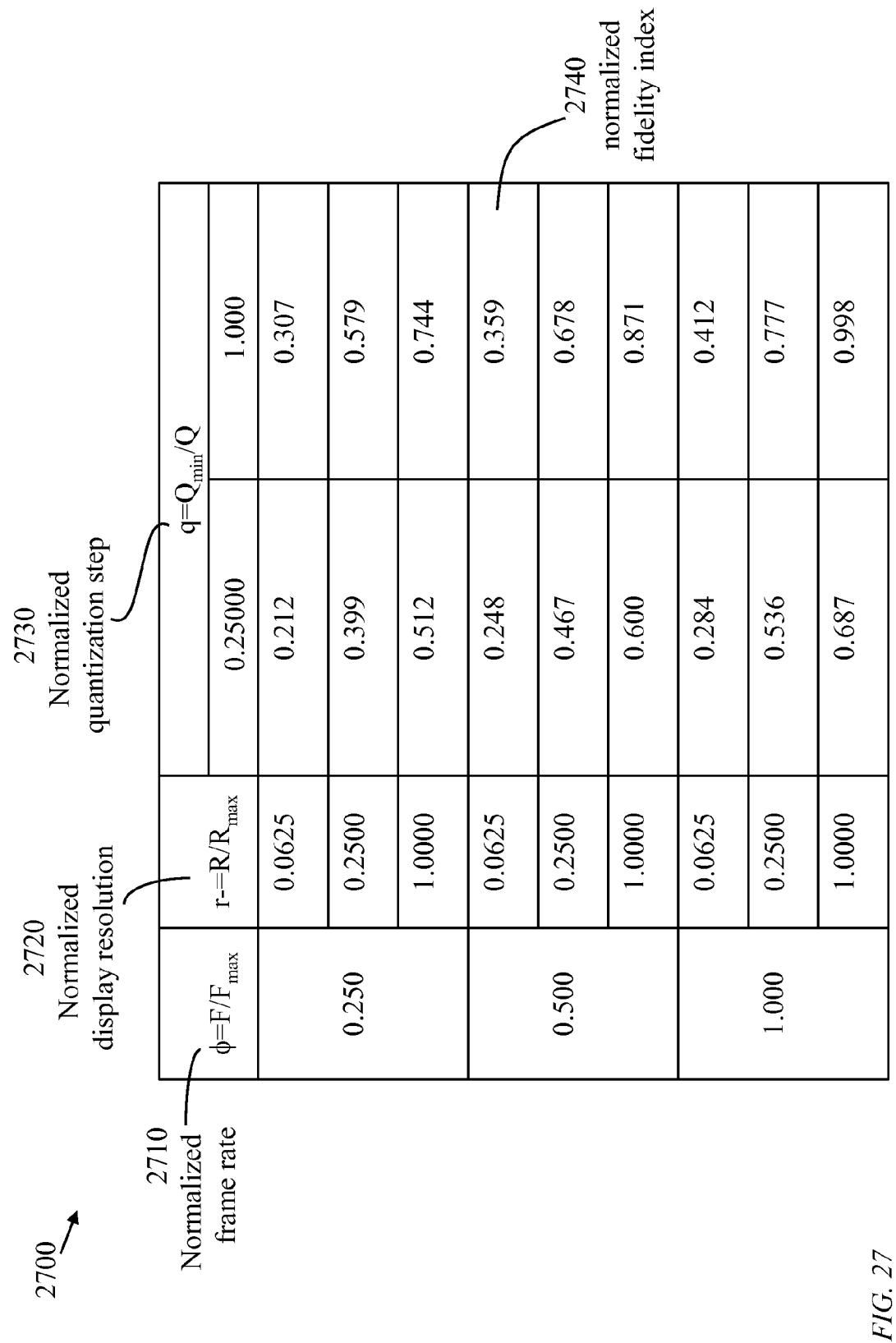
FIG. 27 illustrates a table indicating fidelity indices for each of the parameter sets of FIG. 26, for use in an embodiment of the present invention.

FIG. 27 illustrates a first table 2700 indicating fidelity indices 2740 for each of the parameter sets of FIG. 26. The encoding parameter q (reference 2730) has two values of 0.25 and 1.0. The encoding parameter r (reference 2720) has three values 0.0625, 0.250, and 1.0. The encoding parameter ϕ has three values 0.25, 0.5, and 1.0. The fidelity indices 2740 are determined from the above expression of Γ(q, r, ϕ).

Figure 28:
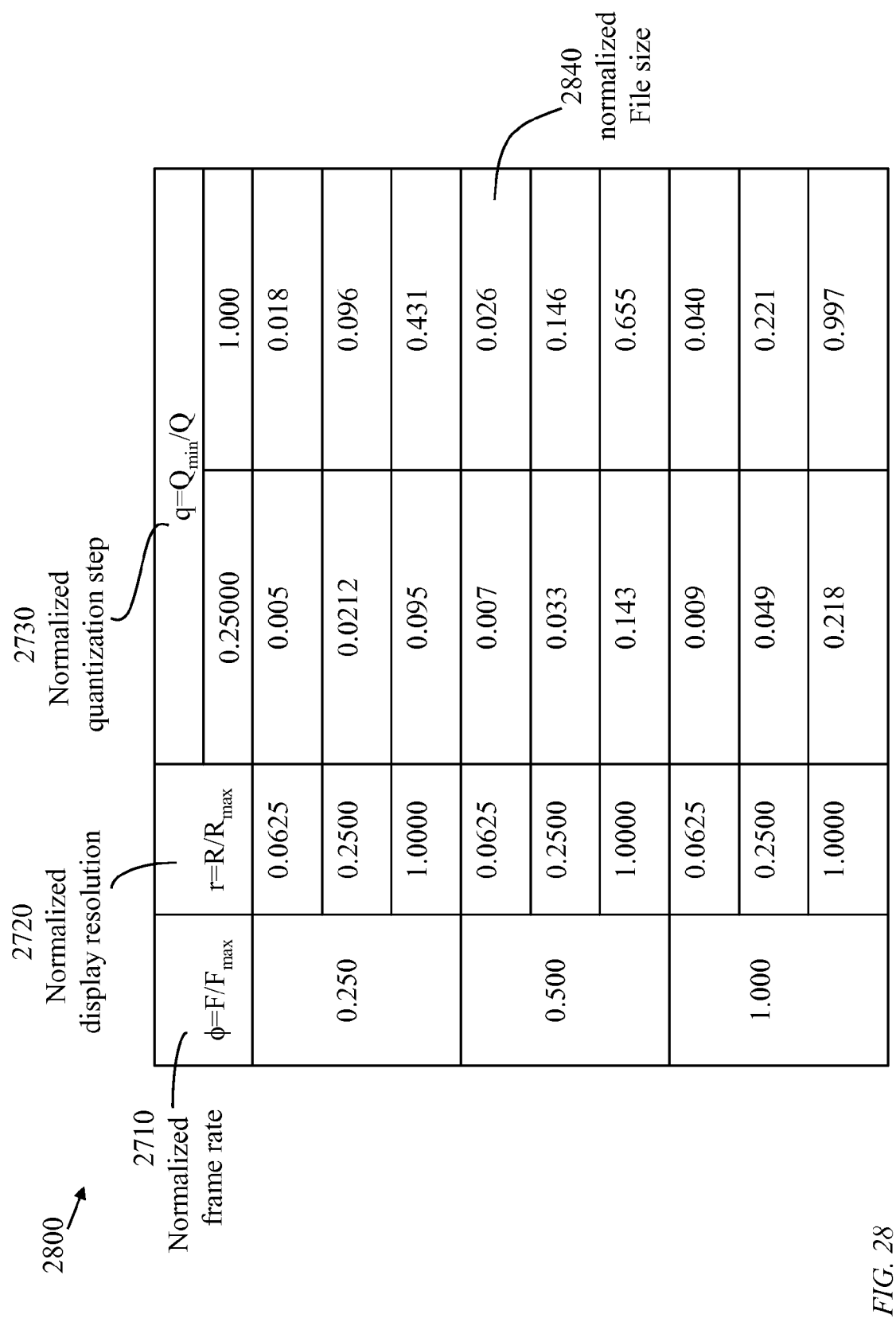
FIG. 28 illustrates a table indicating file sizes for each of the parameter sets of FIG. 26, for use in an embodiment of the present invention.

FIG. 28 illustrates a second table 2800 indicating normalized file sizes 2840, determined from the above expression of S(q, r, ϕ), for each of the parameter sets of FIG. 26.

Figure 29:
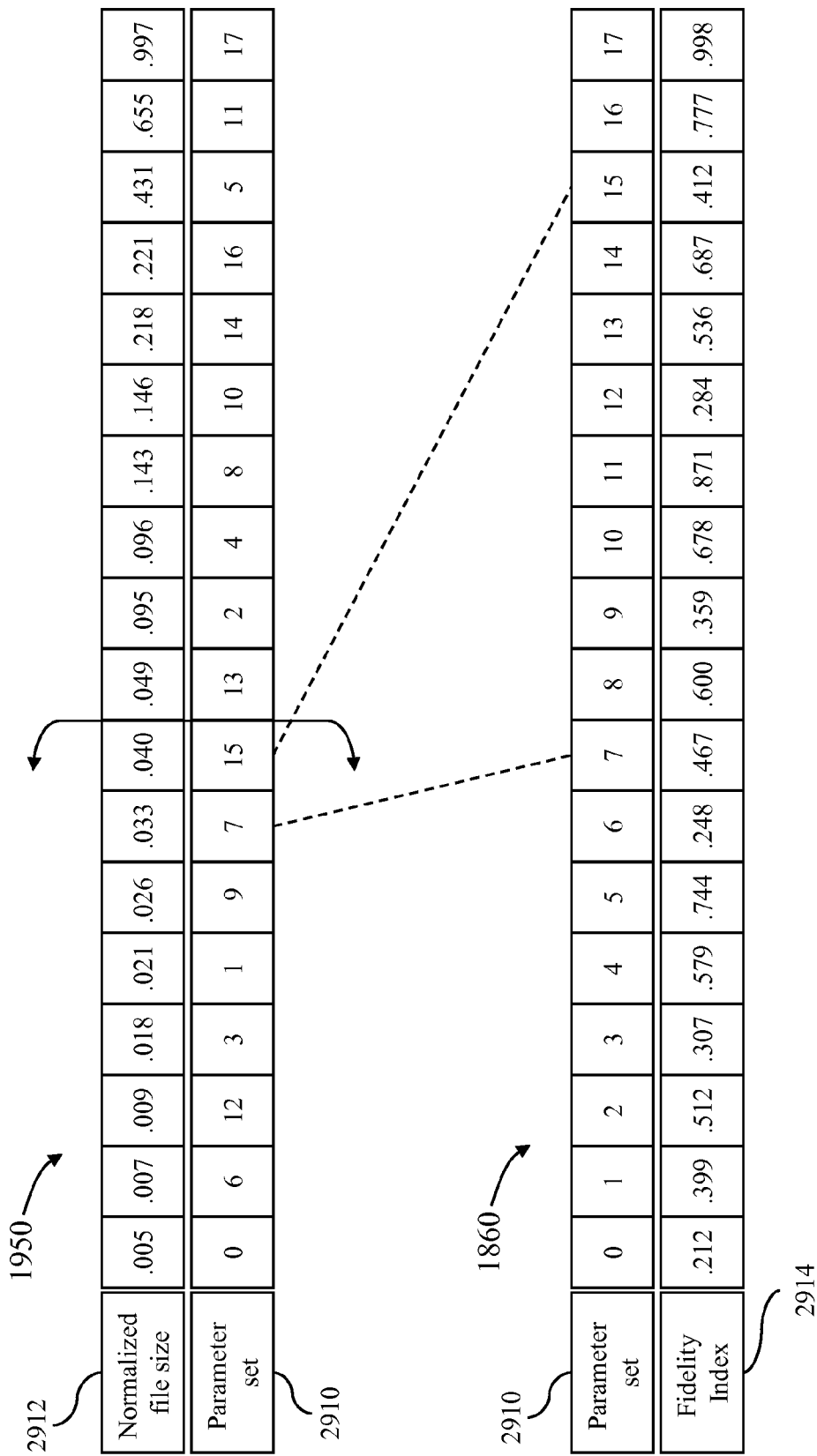
FIG. 29 illustrates an implementation of the encoding scheme of FIG. 19 and FIG. 23.

FIG. 29 illustrates an implementation of the scheme of encoding of FIG. 19 and FIG. 23 where sorted table 1950 is derived from table 2800 of FIG. 28 and table 1860 is formulated from table 2700 of FIG. 27. If, for example, the normalized file size is constrained to an upper bound of 0.043, sorted table 1950 indicates that parameter sets 0, 6, 12, 3, 1, 9, 7, and 15 correspond to file sizes less than 0.043. The corresponding fidelity indices determined from table 1860 are 0.212, 0.248, 0.284, 0.307, 0.399, 0.359, 0.467, and 0.412, respectively. The highest fidelity index of 0.467 corresponds to parameter set 7 which may be selected as the preferred set of encoding parameters.

Figure 30:
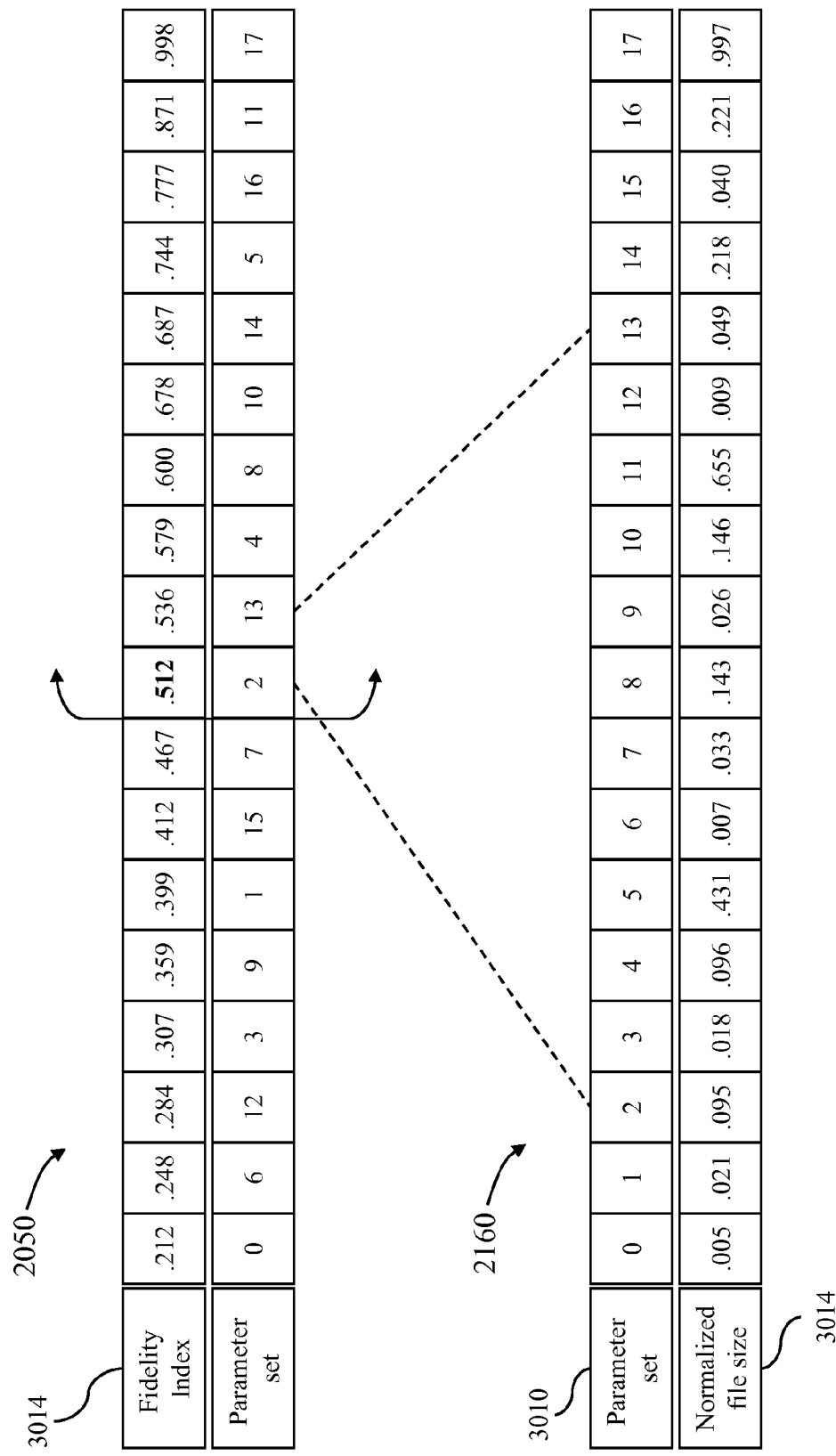
FIG. 30 illustrates an implementation of the encoding scheme of FIG. 21 and FIG. 25.

FIG. 30 illustrates an implementation of the scheme of encoding of FIG. 21 and FIG. 25 where sorted table 2050 is derived from table 2700 of FIG. 27 and table 2160 is formulated from table 2800 of FIG. 28. If, for example, the fidelity index is required to be at least 0.5, sorted table 2050 indicates that parameter 2, 13, 4, 8, 10, 14, 5, 16, 11, and 17 correspond to fidelity indices greater than 0.5. The corresponding file sizes determined from table 2160 are 0.095, 0.049, 0.096, 0.143, 0.146, 0.218, 0.431, 0.221, 0.655, and 0.997, respectively. The least file size of 0.049 corresponds to parameter set 13 which may be selected as the preferred set of encoding parameters.

Figure 31:
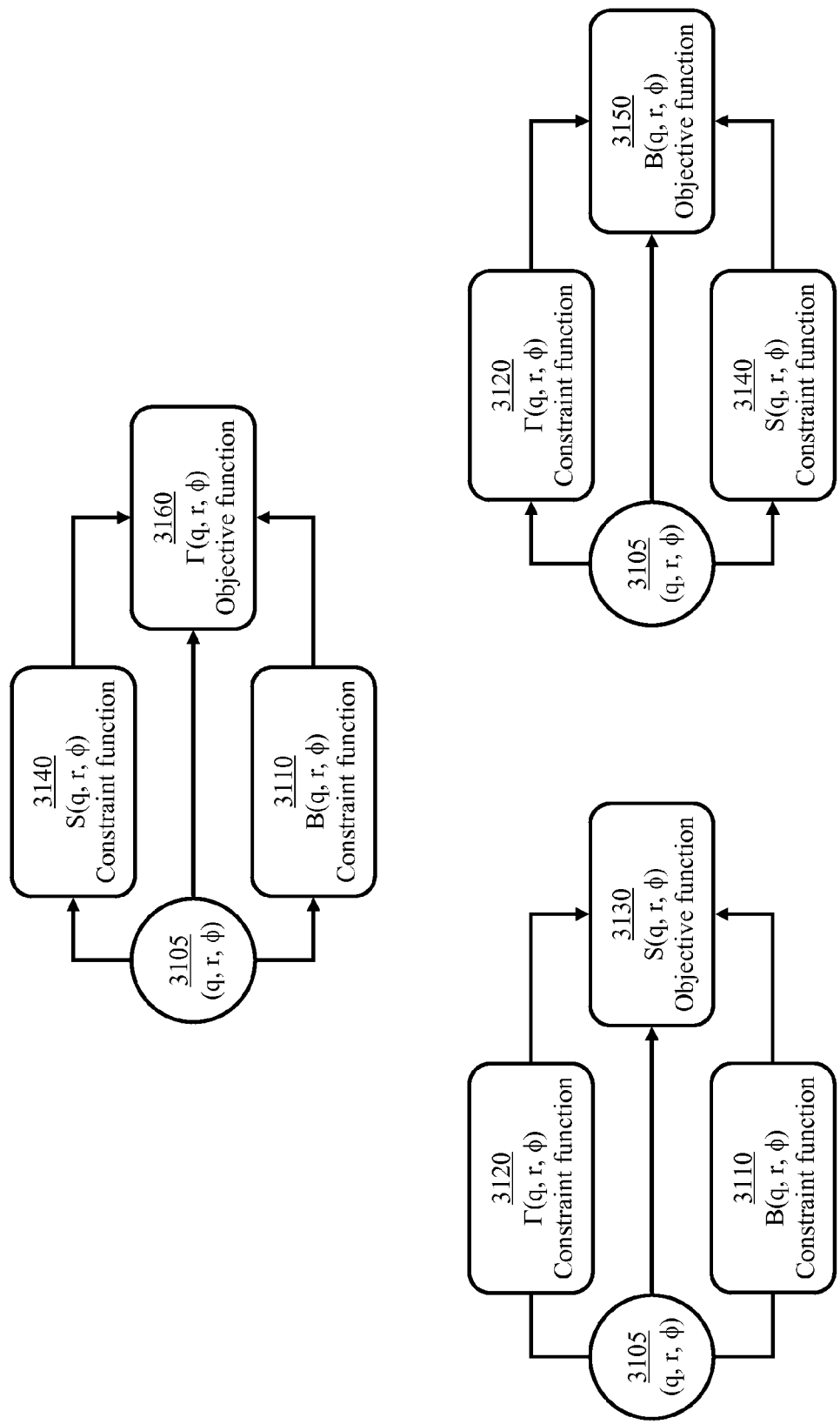
FIG. 31 illustrates optimal encoding schemes based on the methods of the present invention.

FIG. 31 illustrates optimal encoding schemes based on the methods of the present invention. As described above, the properties of an encoded signal are modelled using the parametric functions $\Gamma(q, r, \phi)$, $S(q, r, \phi)$, and $B(q, r, \phi)$. The values of q, r, and $\phi$ may be constrained to decoder-specific values which may vary from one decoder to another. In addition to parametric constraints, other constraints relevant to the file size of or flow rate of an encoded signal may be imposed. It may also be desirable to impose a constraint regarding a lower bound of an acceptable fidelity index.

In accordance with one embodiment, the objective is to select a set of encoding parameters $(q, r, \phi)$ which yields an encoded signal of least file size while satisfying at least one of two conditions: having a fidelity index higher than, or equal to, a specified lower bound; and having a flow rate not exceeding a specified upper bound. The function $S(q, r, \phi)$ would then be an objective function (3130) while at least one of the two functions $\Gamma(q, r, \phi)$, $B(q, r, \phi)$, would be a constraint function (3120, 3110).

In accordance with another embodiment, the objective is to select a set of encoding parameters $(q, r, \phi)$ which yields an encoded signal of least flow rate while satisfying at least one of two conditions: having a fidelity index higher than, or equal to, a specified lower bound; and having a file size not exceeding a specified upper bound. The function $B(q, r, \phi)$ would then be an objective function (3150) while at least one of the two functions $\Gamma(q, r, \phi)$, $S(q, r, \phi)$, would be a constraint function (3120, 3140).

In accordance with a further embodiment, the objective is to select a set of encoding parameters $(q, r, \phi)$ which yields an encoded signal of highest fidelity index while satisfying at least one of two conditions: having a file size not exceeding a specified upper bound; and having a flow rate not exceeding a specified upper bound. The function $\Gamma(q, r, \phi)$ would then be an objective function (3160) while at least one of the two functions $S(q, r, \phi)$ and $B(q, r, \phi)$, would be a constraint function (3140, 3110).

What is claimed is:

1. A method, implemented in an encoder having a processor, comprising:
   acquiring a video signal;
   determining descriptors of said video signal;
   acquiring characteristics of a receiver;
   selecting a preferred set of encoding parameters compatible with said descriptors and said characteristics for encoding said video signal to produce an encoded signal of a requisite fidelity index, said set of encoding parameters comprising a quantization step, a display resolution, and a frame rate;
   encoding said video signal according to said set of encoding parameters;
   formulating:
   a first analytical function quantifying dependence of a fidelity index of said encoded signal on said quantization step, said display resolution, and said frame rate; and
   a second analytical function quantifying dependence of a relative size of said encoded signal on said quantization step, said display resolution, and said frame rate;
   acquiring a first number of reference data records, each reference data record indicating a fidelity index and a relative signal size corresponding to a respective set of encoding parameters;
   and
   executing a regression-analysis process to define said first analytical function and said second analytical function.

2. The method of claim 1 wherein said descriptors include at least one of: a rate of temporal variation; and a quantifier of spectral content.

3. The method of claim 1 wherein said descriptors include an indicator of scene variation rate.

4. The method of claim 1 wherein said characteristics include an upper bound of resolution and an upper bound of a frame rate.

5. The method of claim 1 wherein said selecting comprises:
   acquiring predetermined data records, each indicating a fidelity index and a file size corresponding to one of a collection of sets of encoding parameters;
   identifying candidate data records each corresponding to:
   a fidelity index at least equal to said requisite fidelity index; and
   a set of encoding parameters compatible with said descriptors and said characteristics;
   and
   identifying one of said candidate data records corresponding to a least file size.

6. The method of claim 1 further comprising applying a method of separation of variables to express each of said first analytical function and said second analytical function as a multiplication of:
   a respective one-dimensional function of quantization step;
   a respective one-dimensional function of display resolution; and
   a respective one-dimensional function of frame rate.

7. The method of claim 1 further comprising generating a table, based on said first analytical function, indicating fidelity indices corresponding to a second number of sets of encoding parameters, said second number exceeding said first number.

8. The method of claim 7 further comprising examining said table to identify at least one set of encoding parameters compatible with said receiver characteristics and corresponding to a fidelity index at least equal to said requisite fidelity index.

9. The method of claim 1 further comprising generating:
   a first table, based on said first analytical function, indicating fidelity indices corresponding to a second number of sets of encoding parameters, said second number exceeding said first number; and a second table, based on said second analytical function, indicating relative signal sizes corresponding to said second number of sets of encoding parameters.

10. The method of claim 9 further comprising:
examining said first table to identify at least one set of encoding parameters compatible with said receiver characteristics and corresponding to a fidelity index at least equal to a requisite fidelity index;
examining said second table to determine relative signal sizes corresponding to said at least one set of encoding parameters; and
determining said preferred encoding parameter set as a set of encoding parameters corresponding to a least relative signal size.

11. The method of claim 9 further comprising:
sorting said first table in an ascending order of fidelity indices to produce a sorted table;
using bisecting search to determine a first entry of said sorted table corresponding to a fidelity index nearest to and not less than a requisite fidelity index;
examining at least two entries of said sorted table, adjacent to said first entry, corresponding to candidate sets of encoding parameters compatible with said receiver characteristics;
examining said second table to determine relative signal sizes corresponding to said candidate set of encoding parameters; and
determining said preferred encoding parameter set as one of said candidate set of encoding parameters corresponding to a least relative signal size.

12. The method of claim 1 wherein said selecting comprises:
acquiring predetermined data records, each indicating a fidelity index and a flow rate corresponding to one of a collection of sets of encoding parameters;
identifying candidate data records each corresponding to:
   a fidelity index at least equal to said requisite fidelity index; and
   a set of encoding parameters compatible with said descriptors and said characteristics;
and
identifying one of said candidate data records corresponding to a least flow rate.

13. The method of claim 1 wherein said selecting comprises:
acquiring a first number of reference data records, each reference data record indicating a fidelity index corresponding to a respective set of encoding parameters; and
executing a regression-analysis process to determine constants $\alpha, \beta, \gamma, \delta$, and $\eta$ defining a first analytical function quantifying dependence of a fidelity index on encoding parameters q, r, and $\phi$, said function being of the form $\Gamma(q, r, \phi)=(1+e^{(\alpha-\beta \times q)})^{-1} \times (1+e^{(\gamma-\delta \times r)})^{-1} \times (\eta \times \ln(\phi)+1)$;
where q is a ratio of a minimum quantization step to a candidate quantization step, r is a ratio of a candidate display resolution to a maximum display resolution, and $\phi$ is a ratio of a candidate frame rate to a maximum frame rate.

14. The method of claim 1 wherein said selecting comprises:
acquiring a first number of reference data records, each reference data record indicating a fidelity index and a relative signal size corresponding to a respective set of encoding parameters;
executing a first regression-analysis process to determine constants $\alpha, \beta, \gamma, \delta$, and $\eta$ defining a first analytical function quantifying dependence of a fidelity index on encoding parameters q, r, and $\phi$, said first analytical function being of the form $\Gamma(q, r, \phi)=(1+e^{(\alpha-\beta \times q)})^{-1} \times (1+e^{(\gamma-\delta \times r)})^{-1} \times (\eta \times \ln(\phi)+1)$; and
executing a second regression-analysis process to determine constants $\Omega, \lambda, \theta, \sigma, \epsilon$, and $\omega$ defining a second analytical function quantifying dependence of a relative signal size on encoding parameters q, r, and $\phi$, said second analytical function being of the form $S(q, r, \phi)=1-\Omega+\Omega \times \lambda \times q^{\theta} \times (1+e^{(\sigma-\epsilon \times r)})^{-1} \times \phi^{\omega}$;
where q is a ratio of a minimum quantization step to a candidate quantization step, r is a ratio of a candidate display resolution to a maximum display resolution, and $\phi$ is a ratio of a candidate frame rate to a maximum frame rate.

15. The method of claim 1 wherein said selecting comprises:
acquiring a first number of reference data records, each reference data record indicating a fidelity index and a relative flow rate corresponding to a respective set of encoding parameters; and
executing a first regression-analysis process to determine constants $\alpha, \beta, \gamma, \delta$, and $\eta$ defining a first analytical function quantifying dependence of a fidelity index on encoding parameters q, r, and $\phi$, said first analytical function being of the form $\Gamma(q, r, \phi)=(1+e^{(\alpha-\beta \times q)})^{-1} \times (1+e^{(\gamma-\delta \times r)})^{-1} \times (\eta \times \ln(\phi)+1)$;
executing a second regression-analysis process to determine constants $\Omega, \lambda, \theta, \sigma, \epsilon$, and $\omega$ defining a second analytical function quantifying dependence of a relative bit rate on encoding parameters q, r, and $\phi$, said second analytical function being of the form $B(q, r, \phi)=1-\Omega+\Omega \times \lambda \times q^{\theta} \times (1+e^{(\sigma-\epsilon \times r)})^{-1} \times \phi^{\omega}$;
where q is a ratio of a minimum quantization step to a candidate quantization step, r is a ratio of a candidate display resolution to a maximum display resolution, and $\phi$ is a ratio of a candidate frame rate to a maximum frame rate.

16. A method, implemented in an encoder having a processor, comprising:
acquiring a video signal;
determining descriptors of said video signal;
acquiring characteristics of a receiver;
selecting a preferred set of encoding parameters compatible with said descriptors and said characteristics for encoding said video signal to produce an encoded signal of a requisite fidelity index, said set of encoding parameters comprising a quantization step, a display resolution, and a frame rate;
encoding said video signal according to said set of encoding parameters;
formulating:
   a first analytical function quantifying dependence of a fidelity index of said encoded signal on said quantization step, said display resolution, and said frame rate; and
   a second analytical function quantifying dependence of a relative flow rate of said encoded signal on said quantization step, said display resolution, and said frame rate;
acquiring a first number of reference data records, each reference data record indicating a fidelity index and a relative flow rate corresponding to a respective set of encoding parameters; and
executing a regression-analysis process to define said first analytical function and said second analytical function.

17. The method of claim 16 further comprising generating:
a first table, based on said first analytical function, indicating fidelity indices corresponding to a second number of sets of encoding parameters, said second number exceeding said first number; and
a second table, based on said second analytical function, indicating relative flow rates corresponding to said second number of sets of encoding parameters.

18. The method of claim 17 further comprising:
examining said first table to identify candidate sets of encoding parameters compatible with said receiver characteristics and corresponding to a fidelity index at least equal to a requisite fidelity index;
examining said second table to determine relative flow rates corresponding to said candidate sets of encoding parameters; and
determining said preferred encoding parameter set as one of said candidate sets encoding parameters having a least relative flow rate.

19. The method of claim 16 further comprising:
sorting said first table in an ascending order of fidelity indices to produce a sorted table;
using bisecting search to determine a first entry of said sorted table corresponding to a fidelity index nearest to and not less than a requisite fidelity index;
examining at least two entries of said sorted table, adjacent to said first entry, corresponding to candidate sets of encoding parameters compatible with said receiver characteristics;
examining said second table to determine relative flow rates corresponding to said candidate set of encoding parameters; and
determining said preferred encoding parameter set as one of said candidate set of encoding parameters corresponding to a least relative flow rate.

20. An apparatus for signal encoding comprising:
a processor;
at least one memory device storing:
    reference data records, each reference data record indicating a fidelity index and a relative signal size corresponding to one of a collection of sets of encoding parameters;
    processor-executable instructions devised to:
        define a first analytical model for determining fidelity indices and a second analytical model for determining relative signal sizes based on said reference data records; and
        generate two tables of fidelity indices and relative signal sizes corresponding to a number of sets of encoding parameters exceeding a number of said reference data records;
    processor-executable instructions for determining characteristics of a target receiver of a video recording; and
    processor-executable instructions causing said processor to examine said tables to identify a set of encoding parameters compatible with said characteristics and corresponding to a least relative signal size at a fidelity index at least equal to a specified lower bound; and
a memory device storing processor-executable instructions for sorting content of said two tables and implementing bisecting search to identify entries of requisite values.

21. The apparatus of claim 20 further comprising a memory device storing processor-executable instructions for:
determining descriptors of received signals; and
acquiring characteristics of a target receiver.

22. The apparatus of claim 20 further comprising a memory device storing processor-executable instructions for determining a permissible flow rate over a path from said apparatus to said receiver.

23. An apparatus for signal encoding comprising:
a processor;
a network interface devised to:
    acquire reference data records, each reference data record indicating a fidelity index and a relative signal size corresponding to one of a collection of sets of encoding parameters; and
    receive signals to be transcoded;
and
at least one memory device storing:
    said reference data records;
    processor-executable instructions devised to:
        define a first analytical model for determining fidelity indices and a second analytical model for determining relative signal sizes based on said reference data records; and
        generate two tables of fidelity indices and relative signal sizes corresponding to a number of sets of encoding parameters exceeding a number of said reference data records;
    processor-executable instructions for determining characteristics of a target receiver of a video recording; and
    processor-executable instructions causing said processor to examine said tables to identify a set of encoding parameters compatible with said characteristics and corresponding to a least relative signal size at a fidelity index at least equal to a specified lower bound.

24. An apparatus for signal encoding comprising:
a processor;
at least one memory device storing:
    reference data records, each reference data record indicating a fidelity index and a relative signal size corresponding to one of a collection of sets of encoding parameters;
    processor-executable instructions devised to:
        define a first analytical model for determining fidelity indices and a second analytical model for determining relative signal sizes based on said reference data records; and
        generate two tables of fidelity indices and relative signal sizes corresponding to a number of sets of encoding parameters exceeding a number of said reference data records;
    processor-executable instructions for determining characteristics of a target receiver of a video recording;
    processor-executable instructions causing said processor to examine said tables to identify a set of encoding parameters compatible with said characteristics and corresponding to a least relative signal size at a fidelity index at least equal to a specified lower bound;
and
a memory device storing processor-executable instructions implementing a predictive regression method for determining parameters defining said first analytical model and said second analytical model.

* * * * *